(12) United States Patent
Brown et al.

(10) Patent No.: US 6,366,622 B1
(45) Date of Patent: Apr. 2, 2002

(54) APPARATUS AND METHOD FOR WIRELESS COMMUNICATIONS

(75) Inventors: Stephen Joseph Brown; Andrew Xavier Estrada, both of San Diego; Terrance R. Bourk, La Jolla; Steven R. Norsworthy, Solana Beach; Patrick J. Murphy; Christopher Dennis Hull, both of San Diego; Glenn Chang, Laguna Niguel; Mark Vernon Lane, San Diego; Jorge A. Grilo, Foothill Ranch, all of CA (US)

(73) Assignee: Silicon Wave, Inc., San Diego, CA (US)

( * ) Notice: Subject to any disclaimer, the term of this patent is extended or adjusted under 35 U.S.C. 154(b) by 0 days.

(21) Appl. No.: 09/305,330

(22) Filed: May 4, 1999

Related U.S. Application Data

(63) Continuation-in-part of application No. 09/216,040, filed on Dec. 18, 1998, now abandoned.

(51) Int. Cl.[7] .............................. H04B 1/30; H04L 27/18
(52) U.S. Cl. ........................ 375/322; 375/133; 375/222; 375/281; 375/345; 329/304
(58) Field of Search ................................. 375/132, 133, 375/136, 219, 222, 259, 279, 281, 316, 326, 327, 329, 332, 345; 329/304, 306, 307, 308; 455/234.1, 257, 276.1

(56) References Cited

U.S. PATENT DOCUMENTS 5,144,308 A  9/1992 Norsworthy ................ 341/131

(List continued on next page.)

FOREIGN PATENT DOCUMENTS

JP   6053422 A   2/1994   ............ H01I/27/06

(List continued on next page.)

OTHER PUBLICATIONS

Bluetooth Special Interest Group website http://www.bluetooth.com; "Bluetooth—Document Page", including "Technology Overview", "Radio", "Baseband", "Link Management", "Software Framework", "PC General", "Telephone", "Others"; Date Unknown; pp. 1–10.

(List continued on next page.)

*Primary Examiner*—Young T. Tse
(74) *Attorney, Agent, or Firm*—Martin J. Jaquez, Esq.; Jaquez & Associates

(57) ABSTRACT

An apparatus for receiving signals includes a low noise amplifier (LNA) configured to receive a radio frequency (RF) signal. An I/Q direct down converter is coupled to the LNA. The I/Q direct down converter is configured to split the RF signal into real and imaginary components and to down convert the real and imaginary components directly to baseband signals. A local oscillator (LO) is coupled to the I/Q direct down converter and is configured to drive the I/Q direct down converter. First and second filters are coupled to the I/Q direct down converter. The first and second filters are configured to filter the down converted real and imaginary components, respectively. First and second analog-to-digital converters (ADCs) are coupled to the first and second filters, respectively. The first and second ADCs are configured to convert the real and imaginary components into digital signals. The first and second ADCs have a dynamic range that is wide enough to convert the filtered, down converted real and imaginary components to digital signals without using variable gain on the filtered and down converted real and imaginary components. An apparatus for use in wireless communications includes a radio, a modem and a controller integrated onto a single integrated circuit (IC). The radio includes a receiver for receiving data and a transmitter for transmitting data. The modem is coupled to the radio and is configured to demodulate received data and modulate data for transmission. The controller is coupled to the modem and includes a digital interface for external communications through which received data and data for transmission is sent, a connection state machine configured to accept commands through the digital interface and to respond to the commands by initiating a sequence, and a receive/transmit state machine configured to perform state control of the radio in response to the initiated sequence.

38 Claims, 45 Drawing Sheets

U.S. PATENT DOCUMENTS

| | | | |
|---|---|---|---|
| 5,279,978 A | 1/1994 | See et al. ...................... | 437/34 |
| 5,294,823 A | 3/1994 | Eklund et al. ............... | 257/370 |
| 5,339,040 A | 8/1994 | Loper .......................... | 329/358 |
| 5,424,739 A | 6/1995 | Norsworthy et al. ........ | 341/143 |
| 5,430,317 A | 7/1995 | Onai et al. .................. | 257/347 |
| 5,449,953 A | 9/1995 | Nathanson et al. ......... | 257/728 |
| 5,498,885 A | 3/1996 | Deen et al. ................. | 257/139 |
| 5,578,970 A | 11/1996 | Nguyen et al. ............... | 331/75 |
| 5,619,069 A | 4/1997 | Ohta et al. ................... | 257/692 |
| 5,643,805 A | 7/1997 | Ohta et al. .................... | 437/31 |
| 5,661,329 A | 8/1997 | Hiramoto et al. ........... | 257/510 |
| 5,684,482 A | 11/1997 | Galton ........................ | 341/144 |
| 5,708,971 A * | 1/1998 | Dent .......................... | 455/38.3 |
| 5,724,653 A * | 3/1998 | Baker et al. ................. | 455/296 |
| 5,745,061 A | 4/1998 | Norsworthy et al. ........ | 341/131 |
| 5,757,921 A | 5/1998 | Okanobu et al. ............. | 380/38 |
| 5,773,340 A | 6/1998 | Kumauchi et al. .......... | 438/234 |
| 5,799,010 A * | 8/1998 | Lomp et al. ................. | 370/335 |
| 5,825,887 A * | 10/1998 | Lennen ........................ | 380/34 |
| 5,930,286 A * | 7/1999 | Walley ........................ | 375/140 |

FOREIGN PATENT DOCUMENTS

| | | | |
|---|---|---|---|
| JP | 8241999 | 9/1996 | ......... H01L/29/786 |
| WO | WO 9625790 | 8/1996 | |
| WO | WO 97/02602 | 1/1997 | ........... H01L/27/12 |
| WO | WO 98/49779 | 11/1998 | ............ H04B/1/38 |

OTHER PUBLICATIONS

Durec, Jeff, "An Integrated Silicon Bipolar Receiver Subsystem for 900–Mhz ISM Band Applications" *IEEE Journal of Solid State Circuits* 33(9):1352–1372 (Sep. 1998).

Hashimoto et al., "A 6–$\mu$ m$^2$ biplolar transistor using 0.25–$\mu$ m process technology for high–speed applications" *IEEE Proceedings of the Bipolar BiCMOS Circuits and Technology Meeting*: 152–155 (Sep. 1998).

IEEE Personal Communications, "Figure 3. A Wireless–enhanced scenario for PCCAs", Dec. 1998, p. 1.

Kikuchi et al., "A 0.35$\mu$m ECL–CMOS Process Technology on SOI for Ins Mega–bits SRAM's with 40ps Gate Array" *International Electronic Devices Meeting Technical Digest* 95:923–926 (Dec. 1995).

Sze, S.M., *Semiconductor Devices, Physics and Technology*, New Jersey, John Wiley & Sons, 1985., p. 468–472. ISBN 0–471–87424–8.

* cited by examiner

| | PERFORMANCE | HARDWARE IMPACT | SOFTWARE IMPACT | BENEFITS |
|---|---|---|---|---|
| RS232C | <115kbps | UART, Level translators, higher current | Minimal - RFCOMM | Broad Compatibility |
| Compact Flash | 1Mbps | Slightly Higher pin count | Minimal - RFCOMM Proxy | Migration path |
| Improved Compact Flash | 1 Mbps | Eliminate BC | Host CPU must run LM and respond faster | Lower cost and power, adaptable to PCMCIA |

FIG. 17

| | PERFORMANCE | HARDWARE IMPACT | SOFTWARE IMPACT | BENEFITS |
|---|---|---|---|---|
| Serial | 1 Mbps (with 2-4 MHz Serial clk) | Serial port on host CPU | Serial driver, host runs LM and higher | Lower pin count |
| 8-bit Parallel | 1 Mbps | Memory mapped I/O | Host runs LM and higher | simple register addressing, DMA, lower power |

FIG. 21

APPARATUS AND METHOD FOR WIRELESS COMMUNICATIONS

CROSS-REFERENCE TO RELATED APPLICATION

The present application is a Continuation-In-Part (CIP) of U.S. patent application Ser. No. 09/216,040, filed Dec. 18, 1998, and entitled "Apparatus and Method For Wireless Communications", now abandoned.

BACKGROUND OF THE INVENTION

1. Field of the Invention

The present invention relates to wireless communications, and more particularly, to a radio for use in wireless communications and an apparatus and method which uses a radio, modem and controller for implementing wireless communications.

2. Description of the Related Art

Conventional radios used in wireless communications, such as radios used in conventional cellular telephones, typically include several discrete RF circuit components. This results in such radios having a large size and footprint, being expensive and power consuming. In order to illustrate this, it is useful to analyze a conventional implementation of circuitry that could be used, for example, as the receiver portion of a conventional radio. Specifically, a traditional receiver architecture may employ superheterodyne techniques as shown in FIG. 1. In a superheterodyne architecture an incoming signal is frequency translated from its radio frequency (RF) to a lower intermediate frequency (IF). The signal at IF is subsequently translated to baseband where further digital signal processing or demodulation may take place. Receiver designs may have multiple IF stages. The reason for using such a frequency translation scheme is that circuit design at the lower IF frequency is much more manageable for signal processing. It is at these IF frequencies that the selectivity of the receiver is implemented, automatic gain control (AGC) is introduced, etc.

In addition to more manageable circuit design, high Q (i.e., high "quality factor") filters are also easier to implement at IF. High Q filters are used to meet the selectivity and spurious rejection requirements dictated by wireless systems. Surface acoustic wave (SAW) and ceramic technology are typically used for the filtering depending on the frequency of operation. Although these respective technologies have improved in terms of size and performance they are still relatively large. Moreover, due to the relatively high frequency of the most IFs, it is not realistic, yet, to implement this filter using integrated circuit (IC) techniques.

As an alternative to the superheterodyne techniques, a direct conversion receiver architecture may be used. This is shown in FIG. 2. This scheme translates the incoming RF signal directly to baseband. The direct conversion architecture has several advantages. First, there is no need for the high-Q filters required for traditional superheterodyne architecture. Generally, all that is needed is a broadband RF filter which is used to reduce the dynamic range requirements of the RF down-converter. Second, there are a limited number of RF circuit blocks. Third, oscillators may be reduced to one. Fourth, it offers the smallest size solution since bulky off-chip filters are no longer required. Finally, because the low-pass channel filters are readily integrated, a fully integrated solution is achievable.

Although the direct conversion receiver architecture has several advantages, there are several practical implementation problems. In general, wireless communications devices use high-frequency signals: 900 MHz to 1900 MHz for cellular phones and higher (up to 6 GHz) for other systems, such as wireless LANs. Radios for the so called "Bluetooth standard" (discussed below) operate in the unlicensed ISM band at 2.4 GHz. Signals at such frequencies are difficult to generate and control. They also have a tendency to interfere with each other, as they are easily coupled by parasitic properties present in all electronic components, including integrated circuits. In ICs, many of the undesirable parasitic effects result from the conductive silicon substrate on which the circuits are fabricated.

Specifically, in the direct conversion receiver of FIG. 2, due to limited local oscillator (LO) to RF isolation in the down-converter, and limited reverse isolation in the low noise amplifier (LNA) 10, an amount of LO signal can appear at the output of the receiver and effectively be transmitted at the antenna. Wireless regulatory authorities limit the amount of spurious signal that can be radiated by the receiver, so limiting the amount of LO radiation is necessary to meet these specifications. In addition, LO leakage causes particular problems for direct conversion receivers. The lack of LO isolation causes self mixing in the direct down converter that manifests as a DC offset at baseband.

Specifically, there are several mechanisms through which LO leakage may occur. For example, there may be conducted paths between components. This occurs because there is limited isolation from the LO port of the mixers 12 to the RF port of the mixers 12. There is also limited reverse isolation through the low-noise amplifying stages preceding the mixers 12. A parasitic signal path for signals through the substrate, as well as a lateral signal path through the substrate, can also occur. In addition to the conducted path, there may also be radiated paths via the bond wires used to interconnect the circuit blocks to the outside world. The bond wires act as antennas and couple RF energy, such as that of the LO, to adjacent pins.

The traditional solution for reducing the amount of signal that appears at the antenna port is to have the LO, i.e., the voltage controlled oscillator (VCO) 14, at a different frequency than the incoming RF signal, as is indicated in FIG. 2. This utilizes the filtering effects of matching, etc., to reduce the amount of LO leakage. This solution, however, requires the use of dividers or multipliers 16, as shown in FIG. 2, which adds additional circuitry. Furthermore, this solution does not solve all of the problems of LO leakage associated with direct conversion receivers.

The market requirements for today's mobile communication terminals are such that wireless product manufacturers have gone to smaller and smaller form factors with improved performance and lower cost. This has resulted in radio designers, for both circuits and systems, looking for ways of accommodating these requirements. Therefore, it follows that it would be highly desirable to have an improved radio design that is a low cost, low power and small size solution, and that overcomes the disadvantages discussed above. Such an improved radio design would have many uses in wireless communications, including for example, use in cellular telephones, cordless telephones, personal computer (PC) interconnections, etc.

With respect to PC interconnections, at present, standard wire interconnects are used to link together PC based products, such as laptop and notebook computers and personal digital assistants (PDAs). For example, RS232and Universal Serial Bus (USB) are commonly used standards that are offered as connections on many devices. Some wireless interconnects are also being used, such as infrared (IR). IR suffers from the disadvantage of being somewhat directional in its ability to communicate with other IR devices. It has been predicted that in the near future there will be a convergence of traditional wireless and computer technologies, such as cellular phones, and PC based products. One key to a successful implementation of a standard that facilitates this convergence is to make it almost effortless for the user to use.

There are several wireless communications standards either in existence or being proposed, such as for example, Home RF, IEEE 802.11, etc. One wireless communications standard that is currently being proposed is the "Bluetooth" standard. Bluetooth is a global specification for wireless connectivity. It is based on a low-cost, short-range radio link that enables wireless communication of data and voice and facilitates protected ad hoc wireless connections for stationary and mobile communication environments. The proposal of Bluetooth is to offer a solution that yields rugged wireless connectivity. The Bluetooth standard will be discussed herein as an example of a wireless communications standard, but it should be understood that the teachings of the present invention may be applied to any type of wireless communications and is not limited to the Bluetooth standard.

The Bluetooth Specification

The Bluetooth standard is being developed through the contributions of the members of the Bluetooth Special Interest Group (SIG). The Bluetooth specification, the contents of which are hereby incorporated by reference, is available from the Bluetooth Special Interest Group. Information regarding the Bluetooth standard, as well as procedures for obtaining the latest version of the Bluetooth specification, is available at the Internet web site http://www.bluetooth.com. As set forth therein, Bluetooth technology allows for the replacement of the many proprietary cables that connect one device to another with one universal short-range radio link. For instance, Bluetooth radio technology built into both the cellular telephone and the laptop would replace the cumbersome cable used today to connect a laptop to a cellular telephone. Printers, PDA's, desktops, fax machines, keyboards, joysticks and virtually any other digital device can be part of the Bluetooth system. But beyond untethering devices by replacing the cables, Bluetooth radio technology provides a universal bridge to existing data networks, a peripheral interface, and a mechanism to form small private ad hoc groupings of connected devices away from fixed network infrastructures. Designed to operate in a noisy radio frequency environment, the Bluetooth radio uses a fast acknowledgment and frequency hopping scheme to make the link robust. Bluetooth radio modules avoid interference from other signals by hopping to a new frequency after transmitting or receiving a packet. Compared with other systems operating in the same frequency band, the Bluetooth radio typically hops faster and uses shorter packets. This makes the Bluetooth radio more robust than other systems. Short packages and fast hopping also limit the impact of domestic and professional microwave ovens. Use of Forward Error Correction (FEC) limits the impact of random noise on long-distance links. The encoding is optimized for an uncoordinated environment.

Bluetooth radios operate in the unlicensed ISM band at 2.4 GHz. A frequency hop transceiver is applied to combat interference and fading. A shaped, binary FM modulation is applied to minimize transceiver complexity. The gross data rate is 1 Mb/s. A Time-Division Duplex scheme is used for full-duplex transmission.

The Bluetooth baseband protocol is a combination of circuit and packet switching. Slots can be reserved for synchronous packets. Each packet is transmitted in a different hop frequency. A packet nominally covers a single slot, but can be extended to cover up to five slots. Bluetooth can support an asynchronous data channel, up to three simultaneous synchronous voice channels, or a channel which simultaneously supports asynchronous data and synchronous voice. Each voice channel supports 64 kb/s synchronous (voice) link. The asynchronous channel can support an asymmetric link of maximally 721 kb/s in either direction while permitting 57.6 kb/s in the return direction, or a 432.6 kb/s symmetric link.

A piconet is a collection of devices connected via Bluetooth technology in an ad hoc fashion. A piconet starts with two connected devices, such as a portable PC and cellular phone, and may grow to eight connected devices. All Bluetooth devices are peer units and have identical implementations. Each unit has its own unique 48-bit address referred to as the Bluetooth device address. However, when establishing a piconet, one unit will act as a master and the other(s) as slave(s) for the duration of the piconet connection. Multiple independent and non-synchronized piconets form a scatternet. A master unit is the device in a piconet whose clock and hopping sequence are used to synchronize all other devices in the piconet. All devices in a piconet that are not the master are slave units. An Active Member address is a 3-bit address to distinguish between units participating in the piconet. The master unit receives the all zero Active Member for itself and thus there can be only seven active slaves in a piconet at any given time. Parked units are devices in a piconet which are synchronized but do not have Active Member addresses but can have 8-bit Passive Member addresses or be addressed with the full Bluetooth address. Active Member devices in a piconet can enter power-saving modes in which device activity is lowered. This called a sniff and hold mode.

The Bluetooth system supports both point-to-point and point-to-multi-point connections. Several piconets can be established and linked together ad hoc, where each piconet is identified by a different frequency hopping sequence. All users participating on the same piconet are synchronized to this hopping sequence and the master's Bluetooth device address. The topology can best be described as a multiple piconet structure. The full-duplex data rate within a multiple piconet structure with 10 fully-loaded, independent piconets is more than 6 Mb/s. This is due to a data throughput reduction rate of less than 10% according to system simulations based on 0 dBm transmitting power (at the antenna).

Voice channels use the Continuous Variable Slope Delta Modulation (CVSD) voice coding scheme, and never retransmit voice packets. The CVSD method was chosen for its robustness in handling dropped and damaged voice samples. Rising interference levels are experienced as increased background noise: even at bit error rates up 4%, the CVSD coded voice is quite audible.

Referring to FIG. 3, there is illustrated the different functional blocks in the Bluetooth system. The different functions in the Bluetooth system are: a radio 20, a link baseband controller (LC) 24, a link manager (LM) 26, software functions 28, and a host processor or controller 30. The radio 20 is hardware that translates between binary bits and radio signals received and transmitted from an antenna 22. The LC 24 is hardware and/or software for performing the baseband processing and basic protocols close to the physical layer. The LM 26 is software that carries out protocols such as link setup, authentication, link configuration, control, etc. The software functions 28 may include configuration and diagnosis utility, device discovery, cable emulation, peripheral communication, audio communication and call control, object exchange for business cards and phone books, and networking protocol.

With respect to the radio 20, the Bluetooth air interface is based on a nominal antenna power of 0 dBm. The air interface complies with the FCC rules for the ISM band at power levels up to 0 dBm. Spectrum spreading has been added to facilitate optional operation at power levels up to 100 mW worldwide. Spectrum spreading is accomplished by frequency hopping in 79 hops displaced by 1 MHz, starting at 2.402 GHz and stopping at 2.480 GHz. Due to local regulations the bandwidth is reduced in Japan (2.471–2.497 GHz), France and Spain. This is handled by an internal software switch. For most functions, the maximum frequency hopping rate is 1600 hops/s. For paging functions, the hopping rate is 3200 hops/s. The nominal link range is 10 centimeters to 10 meters, but can be extended to more than 100 meters by increasing the transmit power.

With respect to establishing network connections, before any connections in a piconet are created, all devices are in STANDBY mode. In this mode, an unconnected unit periodically "listens" for messages every 1.28 seconds. Each time a device wakes up, it listens on a set of hop frequencies defined for that unit. The number of hop frequencies varies in different geographic regions; 32 is the number for most countries (except Japan, Spain and France where it is currently limited to 16).

The connection procedure is initiated by any of the devices which then becomes master. A connection is made by a PAGE message if the address is already known, or by an INQUIRY message followed by a subsequent PAGE message if the address is unknown.

In the initial PAGE state, the master unit will send a train of 16 identical page messages on 16 different hop frequencies defined for the device to be paged (slave unit). If there is no response, the master transmits a train on the remaining 16 hop frequencies in the wake-up sequence. If the radio link is reliable, the maximum delay before the master reaches the slave is twice the wakeup period (2.56 seconds) while the average delay is half the wakeup period (0.64 seconds).

The INQUIRY message is typically used for finding Bluetooth devices, including public printers, fax machines and similar devices with an unknown address. The INQUIRY message is very similar to the page message, but may require one additional train period to collect all the responses.

A power saving mode can be used for connected units in a piconet if no data needs to be transmitted. The master unit can put slave units into HOLD mode, where only an internal timer is running. Slave units can also demand to be put into HOLD mode. Data transfer restarts instantly when units transition out of HOLD mode. The HOLD is used when connecting several piconets or managing a low power device such as a temperature sensor.

Two more low power modes are available, the SNIFF mode and the PARK mode. In the SNIFF mode, a slave device listens to the piconet at reduced rate, thus reducing its duty cycle. The SNIFF interval is programmable and depends on the application. In the PARK mode, a device is still synchronized to the piconet but does not participate in the traffic. Parked devices have given up their Active Member address and occasionally listen to the traffic of the master to re-synchronize and check on broadcast messages.

If the modes are listed in increasing order of power efficiency, the SNIFF mode has the higher duty cycle, followed by the HOLD mode with a lower duty cycle, and finishing with the PARK mode with the lowest duty cycle.

The link type defines what type of packets can be used on a particular link. The Bluetooth baseband technology supports two link types: Synchronous Connection Oriented (SCO) type (used primarily for voice), and Asynchronous Connectionless (ACL) type (used primarily for packet data).

Different master-slave pairs of the same piconet can use different link types, and the link type may change arbitrarily during a session. There are sixteen different packet types. Four of these are control packets and are common for both SCO and ACL links. Both link types use a Time Division Duplex (TDD) scheme for full-duplex transmissions. The SCO link is symmetric and typically supports time-bounded voice traffic. SCO packets are transmitted at reserved slots. Once the connection is established, both master and slave units may send SCO packets without being polled. One SCO packet type allows both voice and data transmission—with only the data portion being retransmitted when corrupted. The ACL link is packet oriented and supports both symmetric and asymmetric traffic. The master unit controls the link bandwidth and decides how much piconet bandwidth is given to each slave, and the symmetry of the traffic. Slaves must be polled before they can transmit data. The ACL link also supports broadcast messages from the master to all slaves in the piconet.

There are three error-correction schemes defined for Bluetooth baseband controllers: 1/3 rate forward error correction code (FEC); 2/3 rate forward error correction code FEC; and Automatic repeat request (ARQ) scheme for data.

The purpose of the FEC scheme on the data payload is to reduce the number of retransmissions. However, in a reasonably error-free environment, FEC creates unnecessary overhead that reduces the throughput. Therefore, the packet definitions have been kept flexible as to whether or not to use FEC in the payload. The packet header is always protected by a 1/3 rate FEC; it contains valuable link information and should survive bit errors. An unnumbered ARQ scheme is applied in which data transmitted in one slot is directly acknowledged by the recipient in the next slot. For a data transmission to be acknowledged both the header error check and the cyclic redundancy check must be okay; otherwise a negative acknowledge is returned.

With respect to the authentication and privacy, the Bluetooth baseband provides user protection and information privacy mechanisms at the physical layer. Authentication and encryption are implemented in the same way in each Bluetooth device, appropriate for the ad hoc nature of the network. Connections may require a one-way, two-way, or no authentication. Authentication is based on a challenge-response algorithm. Authentication is a key component of any Bluetooth system, allowing the user to develop a domain of trust between a personal Bluetooth device, such as allowing only the owner's notebook computer to communicate through the owner's cellular telephone. Encryption is used to protect the privacy of the connection. Bluetooth uses a stream cipher well suited for a silicon implementation with secret key lengths of 8 to 128 bits. Key management is left to higher layer software.

The goal of Bluetooth's security mechanisms is to provide an appropriate level of protection for Bluetooth's short-range nature and use in a global environment. Users requiring stalwart protection are encouraged to use stronger security mechanisms available in network transport protocols and application programs.

Conventional Implementations of Bluetooth

In a conventional implementation of the Bluetooth system, the modulator and demodulator are typically implemented in a combination of the radio 20 and LC 24. The hardware for the LC 24 will typically be specific to the radio 20 being used. The LC 24 is specific to the system since it implements system protocol functions. It is also specific to the type of modulation used in the system and it is also dependent upon the type of radio architecture implemented. At least some of this hardware will typically be integrated into a baseband IC performing LC 24 and possibly LM 26 functions as an application specific integrated circuit (ASIC). A demodulator will demodulate the signal that appears at the output of the radio receiver. The output from the demodulator is raw data that is typically passed directly to the LC 24 for further processing to correct any errors and extract the payload. The output from the host processor 30 is passed through Bluetooth Software Functions 28 and LM 26 to the LC 24. The signal is data that has been formatted by the LC 24 into the appropriate structure with the addition of error correction, address bits, etc.

This conventional implementation has several disadvantages. Specifically, it requires a special ASIC with a processor to implement all of the Bluetooth functions, and the processor runs to perform all operations. All received data goes from the radio to the LC 24 over an external interface which will consume power and cause interference. The LC 24 has to perform frequency hopping by sending many commands to the radio. Finally, the LC 24 has to have many I/O lines into the radio for monitor and control. It would be desirable to have a more flexible way to implement the Bluetooth system, as well as a lower cost, lower power solution which conserved the resources of the host controller or microprocessor 30.

With respect to the Bluetooth radio 20, a conventional implementation will typically include several discrete RF circuit components, which as discussed above, will result in the radio 20 having a large size and footprint, being expensive and power consuming.

Therefore, an improved radio design that is a low cost, low power and small size solution could be used not only in cellular telephones, cordless telephones, etc., but also in implementing various wireless communications standards, specifications and/or protocols such as the Bluetooth standard. Furthermore, it would also be highly desirable to have an apparatus and method for wireless communications that could be used to efficiently implement various wireless communications standards, specifications and/or protocols, such as the Bluetooth standard, into a flexible, low cost, low power and small size solution.

BRIEF SUMMARY OF THE INVENTION

The present invention provides an apparatus for receiving signals. The apparatus includes a low noise amplifier (LNA) configured to receive a radio frequency (RF) signal. An I/Q direct down converter is coupled to the LNA. The I/Q direct down converter is configured to split the RF signal into real and imaginary components and to down convert the real and imaginary components directly to baseband signals. A local oscillator (LO) is coupled to the I/Q direct down converter and is configured to drive the I/Q direct down converter. First and second filters are coupled to the I/Q direct down converter. The first and second filters are configured to filter the down converted real and imaginary components, respectively. First and second analog-to-digital converters (ADCs) are coupled to the first and second filters, respectively. The first and second ADCs are configured to convert the real and imaginary components into digital signals. The first and second ADCs have a dynamic range that is wide enough to convert the filtered, down converted real and imaginary components to digital signals without using variable gain on the filtered and down converted real and imaginary components.

The present invention also provides an apparatus for receiving and transmitting signals. The apparatus includes a local oscillator (LO), a direct conversion transmitter coupled to the LO that is configured to up-convert baseband signals directly to radio frequency (RF) for transmission, and a direct conversion receiver coupled to the LO that is configured to down-convert a received RF signal directly to baseband. The direct conversion receiver includes an analog-to-digital converter (ADC) that is configured to convert the down-converted received RF signal into a digital signal. The ADC has a dynamic range that is wide enough to convert the down-converted received RF signal to a digital signal without using variable gain on the down-converted received RF signal.

The present invention provides an apparatus for use in wireless communications. The apparatus includes a radio, a modem and a controller integrated onto a single integrated circuit (IC). The radio has a receiver for receiving data and a transmitter for transmitting data. The modem is coupled to the radio and is configured to demodulate received data and modulate data for transmission. The controller is coupled to the modem and includes a digital interface for external communications through which received data and data for transmission is sent, a connection state machine configured to accept commands through the digital interface and to respond to the commands by initiating a sequence, and a receive/transmit state machine configured to perform state control of the radio in response to the initiated sequence.

The present invention also provides a method of performing wireless communications. The method includes receiving commands from an external processor through a digital interface where the digital interface is integrated onto a single integrated circuit (IC); initiating a sequence in circuitry included on the single IC in response to the received commands; performing state control of a radio that is integrated onto the single IC in response to the initiating sequence; and communicating data with the radio.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIG. 17 is a table illustrating trade-offs for the different external interfaces.

FIG. 21 is a table illustrating trade-offs for the different internal interfaces.

DETAILED DESCRIPTION OF THE INVENTION

Figure 4:
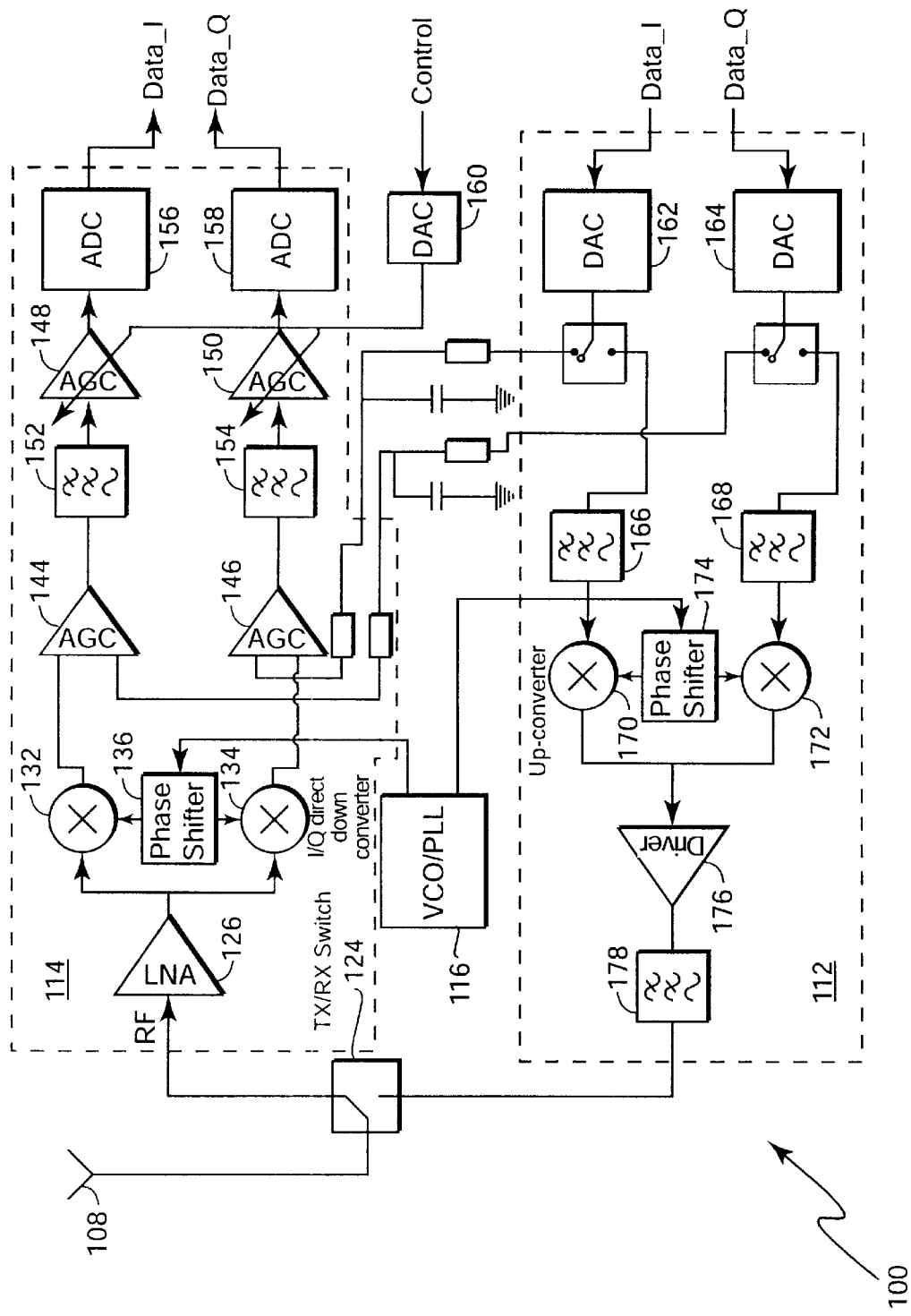
FIG. 4 is a schematic diagram illustrating a direct conversion radio.

Referring to FIG. 4, there is illustrated a direct conversion radio 100. The radio 100 includes a direct down-conversion receiver 114, a direct up-conversion transmitter 112, a transmit/receive switch 124, a VCO/PLL (phase locked loop) 116, and an automatic gain control (AGC) control block 160.

The direct conversion radio 100 has two functions. First, it takes a signal that appears at the output of the antenna 108 and down-converts it so that the signal can be further processed in the digital domain. This processing is done in the direct down-conversion receiver 114 and involves filtering the incoming signal and down-converting the signal to a much lower frequency, i.e. directly to baseband. The second function is a transmit function. This is done in the direct up-conversion transmitter 112 and involves up-converting and amplifying a modulated signal to the final frequency and power for transmission. Demodulation of the received signal, as well as modulation of the signal for transmission, may be provided by a modem which may either be external or on the same IC chip with the radio 100 as will be described below.

The direct down-conversion receiver 114 receives the RF input at the input of a low noise amplifier (LNA) 126. The output of the LNA 126 is fed into the inputs of two mixers 132, 134. The mixers 132, 134 and the phase shifter 136 cause the signal to be split into its complex coordinates. The quadrature (or 90°) phase shifter 136 is driven by the PLL/VCO 116. Automatic gain control by amplifiers 144, 146 is performed on the outputs of the mixers 132, 134, respectively. The outputs of the amplifiers 144, 146 are filtered by filters 152, 154, the outputs of which are amplified by variable gain amplifiers 148, 150. These signals are then converted to digital form by analog-to-digital converters (ADC) 156, 158.

The variable gain amplifiers 148, 150 and the control block 160 form an automatic gain control (AGC) loop. The AGC senses the level of the received signal and feeds it back to the variable gain amplifiers 148, 150 in order to try to stabilize the signal level of the output of the variable gain amplifiers 148, 150.

One problem with the direct conversion radio 100 is cross-talk between the local oscillator VCO 116 and the input to the LNA 126. The leakage from the local oscillator 116 can go into the LNA 126, get amplified, and then come into the mixers 132, 134 and literally mix against a phase shifted version of itself producing a DC offset which is both frequency dependent and VSWR dependent. (VSWR stands for Voltage Standing Wave Ratio and is an impedance measure: a low VSWR means close to 50 ohms, and a high VSWR means not close to 50 ohms, i.e., either a very high impedance or a very low impedance, but not near 50 ohms.). This can produce a time-dependent DC offset, i.e., a very slowly varying signal, which makes it difficult to distinguish between this slowly varying signal and the actual frequency of the received signal itself. This is particularly problematic for certain types of signal modulations that have signal content all the way down to the DC level. In this scenario, the use of a high-pass filter at a corner frequency just above the DC level will not solve the problem. Instead, some type of DC offset cancellation is normally performed.

Performing DC offset cancellation in the radio 100, however, is difficult. This is partly because of the variable gain amplifiers 148, 150 in the AGC. Specifically, when AGC is used, the DC offset actually becomes a function of the gain setting. As a result, the gain control signal actually becomes superimposed on top of the desired signal. Furthermore, the variable gain amplifiers 148, 150 are especially problematic because as the gain varies it will modulate the already small, slowly varying low frequency signal that is supposed to be the DC level.

In the scenario where there is no signal content at the DC level, these problems can be solved by using a mutually exclusive high pass filter on the received signal itself and a low pass filter on the control loop. This solution will work provided the bands do not overlap and have significant separation. This solution does not work, however, in the scenario where there is information content substantially down to DC (zero Hz).

Figure 5:
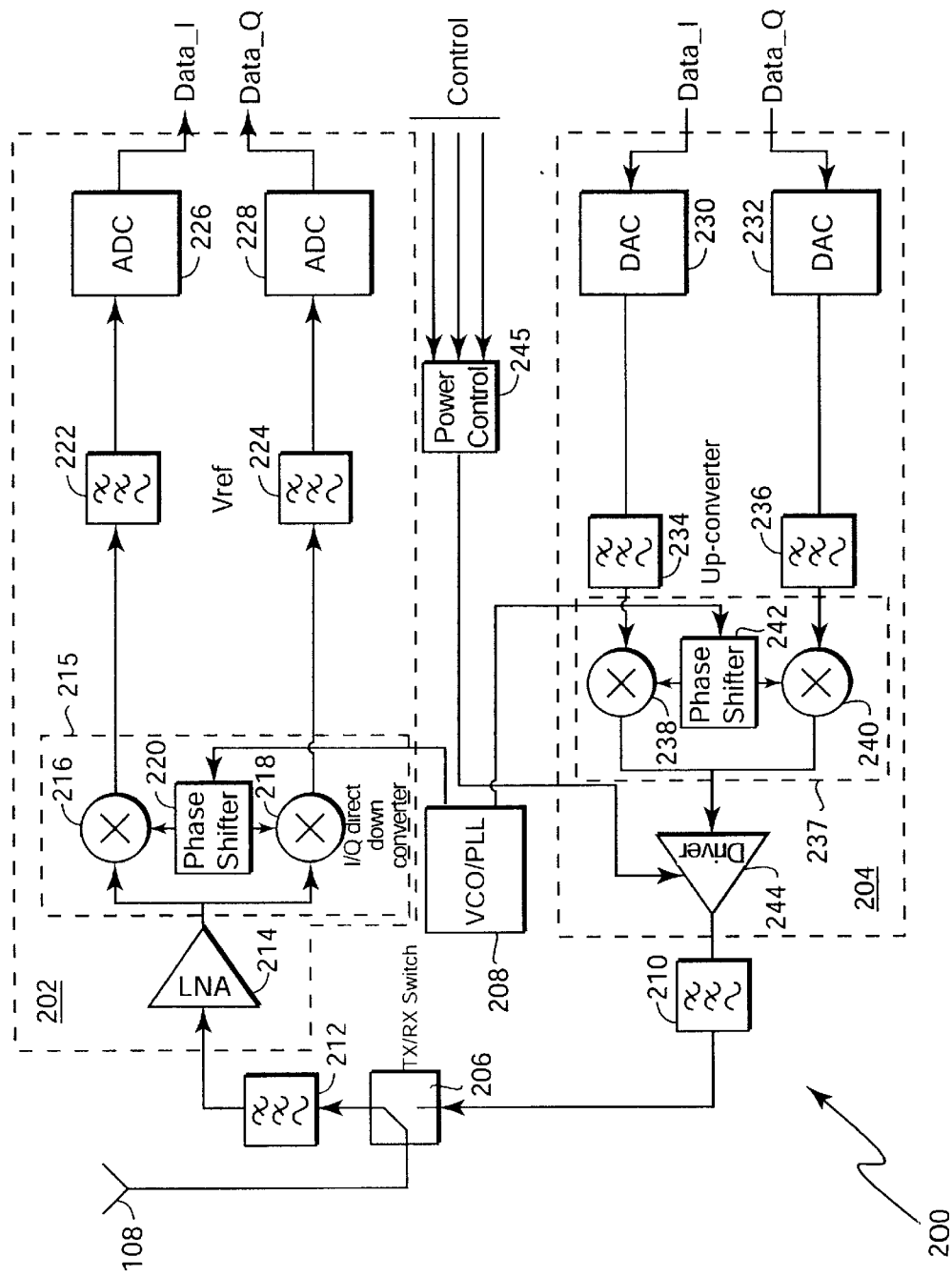
FIG. 5 is a schematic diagram illustrating a direct conversion radio in accordance with the present invention.

Referring to FIG. 5, there is illustrated a direct conversion radio 200 in accordance with the present invention. In general, the radio 200 utilizes very wide dynamic range analog-to-digital converters (ADC) 226, 228 which substantially reduces, or even eliminates, the need for AGC. This has many advantages which will be discussed below.

The direct conversion radio 200 includes a direct down-conversion receiver 202, a direct up-conversion transmitter 204, a transmit/receive switch 206, a VCO/PLL (phase locked loop) 208, a transmit harmonic filter 210, a receive band filter 212, and a power control block 245. During operation, the receiver 202 receives the RF input at the input of a low noise amplifier (LNA) 214, from the filter 212. The output of the LNA 214 is fed into the input of an I/Q direct down converter 215. The I/Q direct down converter 215 is configured to split the RF signal into real and imaginary components and to down convert the real and imaginary components directly to baseband signals. Specifically, the mixers 216, 218 and the quadrature (or 90°) phase shifter 220 cause the signal to be split into its complex coordinates. The phase shifter 220 is driven by the PLL/VCO 208, i.e., the local oscillator 208. The outputs of mixers 216, 218 are filtered by filters 222, 224, which are configured to filter the down converted real and imaginary components. The outputs of the filters 222, 224 are converted to digital form by 115 large dynamic range ADCs 226, 228, respectively.

Figure 6:
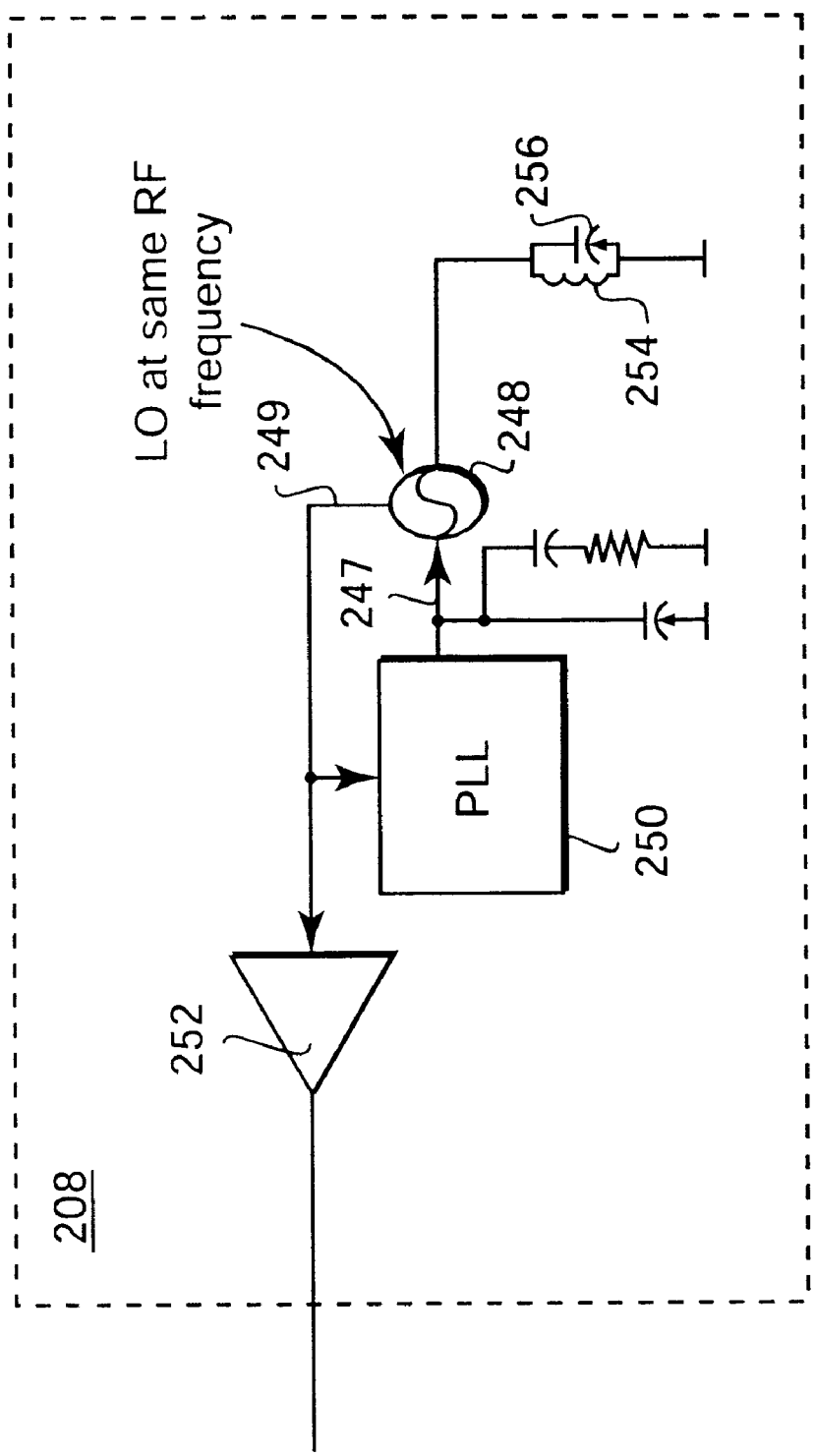
FIG. 6 is a schematic diagram illustrating the VCO/PLL shown in FIG. 5.

The direct up-conversion transmitter 204 receives modulated digital data to be transmitted from a modem (not shown) at the inputs of the digital-to-analog converters (DAC) 230, 232. The outputs of the DACs 230, 232 are filtered by the filters 234, 236, respectively, the outputs of which are fed into the direct up-converter 237. The phase shifter 242 and the mixers 238, 240 up-convert the signal which is then driven by the driver 244. The output of the driver 244 is filtered by the filter 210. Referring to FIG. 6, the PLL/VCO 208 includes a voltage controlled oscillator (VCO) 248, a phase locked loop (PLL) 250, and an amplifier 252. The VCO 248 includes a frequency control port 247 and an output port 249.

The direct conversion radio 200 takes advantage of the larger dynamic range in the ADCs 226, 228. ADCs with wide dynamic range are typically of the delta-sigma or pipelined variety. Either of these varieties of ADCs, such as delta-sigma or sigma-delta converters, or any other ADCs having wide dynamic range or which are considered high resolution, such as those used in audio technologies, may be used in accordance with the present invention. By using, for example, an 86 dB range in the ADCs 226, 228, the overall gain in the receiver 202 can be kept relatively low. Furthermore, there is little or no gain at baseband either in the mixers 216, 218 or the filters 222, 224. Hence, the DC offset from the mixers 216, 218 is not amplified, which means the ADCs 226, 228 will not be overloaded by the DC offset. Hence, analog cancellation of the DC offset from the mixers 216, 218 is either not necessary, or the need for such cancellation is substantially reduced. Thus, by using wide dynamic range ADCs 226, 228, excess gain is eliminated.

Due to the large dynamic range in the ADCs 226, 228, automatic gain control (AGC) is not necessary and can be eliminated or substantially eliminated in the radio 200. This is possible because all or substantially all of the dynamic range can be handled by the ADCs 226, 228, with the possible exception of a switchable gain stage (e.g., a low noise amplifier). In this scenario, there may be no base band in the AGC. Any AGC that is used occurs at RF and is digital AGC, and so it can be controlled by a digital loop. Such digital loop can perform significant interpretation and intelligence before it makes the decision, which cannot be done with a traditional analog or pseudo analog loop. In any event, because the only gain control is in the RF, it has no impact on the DC offset. Therefore, by eliminating AGC, the variable gain amplifiers have been eliminated, which means the DC offset will be almost constant and will not be modulated.

In another scenario, AGC can be reduced to two settings due to the large dynamic range in the ADCs 226, 228. Specifically, because the signal at the ADCs is represented in a complex base-band form, the receiver's base-band stages typically remain linear throughout the dynamic range of the receiver. When signal levels into the receiver get very large, stages 222, 224, 226, 228 will compress. Under such conditions, a gain reduction in the mixers 216, 218 ensures that these stages stay linear. As only one large gain step is typically needed, at very large signal levels into the receiver, this AGC can be readily implemented. A digital control signal forms the closed loop control for the AGC. The digital control sets mixers 216, 218 in either a high or low gain setting depending on the expected signal level.

The use of the large dynamic range ADCs 226, 228 not only allows elimination of variable gain, it also allows most of the filtering to be done in the digital domain, which has a number of advantages. One advantage is that in the digital domain there is much better control of the frequency. The corner frequencies do not vary with process and temperature. Another advantage is that there is potentially more dynamic range. And yet another advantage is that it can be programmable so that the bands can be changed. The ability to do the filtering in the digital domain allows the filtering to be done on-chip with the radio and eliminates the conventional practice of going off-chip to discrete filters. The conventional practice of going off-chip to discrete filters has the disadvantage that it creates opportunities for noise and interference to be picked up off the main board, let alone requires more physical space.

ADCs are considered to have a wide dynamic range or are of high resolution if they have a bit width wider than or equal to approximately twelve (12) bits or have greater than or equal to an approximately 74 dB range. Range is calculated according to the equation:

$$\begin{aligned} \text{Range} &= ((\text{No. of bits}) * 6.02) + 1.76 \\ &= (12 * 6.02) + 1.76 \\ &= 74 \text{ dB} \end{aligned}$$

In contrast, ADCs having a bit width less than ten (10) bits are generally considered to be low resolution. Therefore, the ADCs 226, 228 have a dynamic range that is wide enough to convert the filtered, down converted real and imaginary components of the received RF signal to digital signals without using variable gain control (i.e., AGC).

As mentioned above, ADCs with wide dynamic range may be of the delta-sigma variety. A delta-sigma modulator (or converter), also referred to as sigma-delta modulators, converts a signal amplitude into digital data. An input signal at a given frequency $f_O$ is oversampled, that is, sampled at a rate $f_S$ much higher than the Nyquist rate, $f_S \gg 2f_O$. The delta-sigma modulator is over-sampled, and preferably very highly over-sampled. The sample rate of the delta-sigma modulator may be chosen substantially near the carrier frequency of the incoming RF signal. A delta-sigma modulator employs coarse quantization, filtering and feedback, such that the output is only one (or a few) bits wide, while the amount of quantization energy that lies in the desired frequency band is relatively small (i.e., high resolution). Post filtering is employed after the delta-sigma modulator to remove the out-of-band quantization energy. By way of example, a 32 MHz, second order 4-bit delta-sigma modulator that includes 13-bits of signal resolution in the 0–500 KHz band may be employed in the present invention. Furthermore, the complete disclosure of U.S. Pat. No. 5,684, 482 entitled "Spectral Shaping of Circuit Errors in Digital-to-Analog Converters" is hereby fully incorporated into the present application by reference. The teachings of this patent may be used in the present invention.

The elimination of AGC also has the advantage of eliminating the problem of fading, a classic problem in radios that use AGC. Specifically, when the radio is receiving a strong signal, the AGC turns all of the gain down in order to prevent that signal from overloading the amplifier. The strong signal, however, can quickly drop and becomes very weak, possibly because the radio is moved. In this scenario the AGC may not be able to respond fast enough to turn the gain back up for the weak signal, resulting in the signal actually being lost. With cellular telephones this is known as a "drop-out". By eliminating the AGC in the radio 200, however, this type of fading is eliminated. The total drop-out phenomenon, i.e., where there is just not enough signal at all, is still a problem with all radios.

Figure 7:
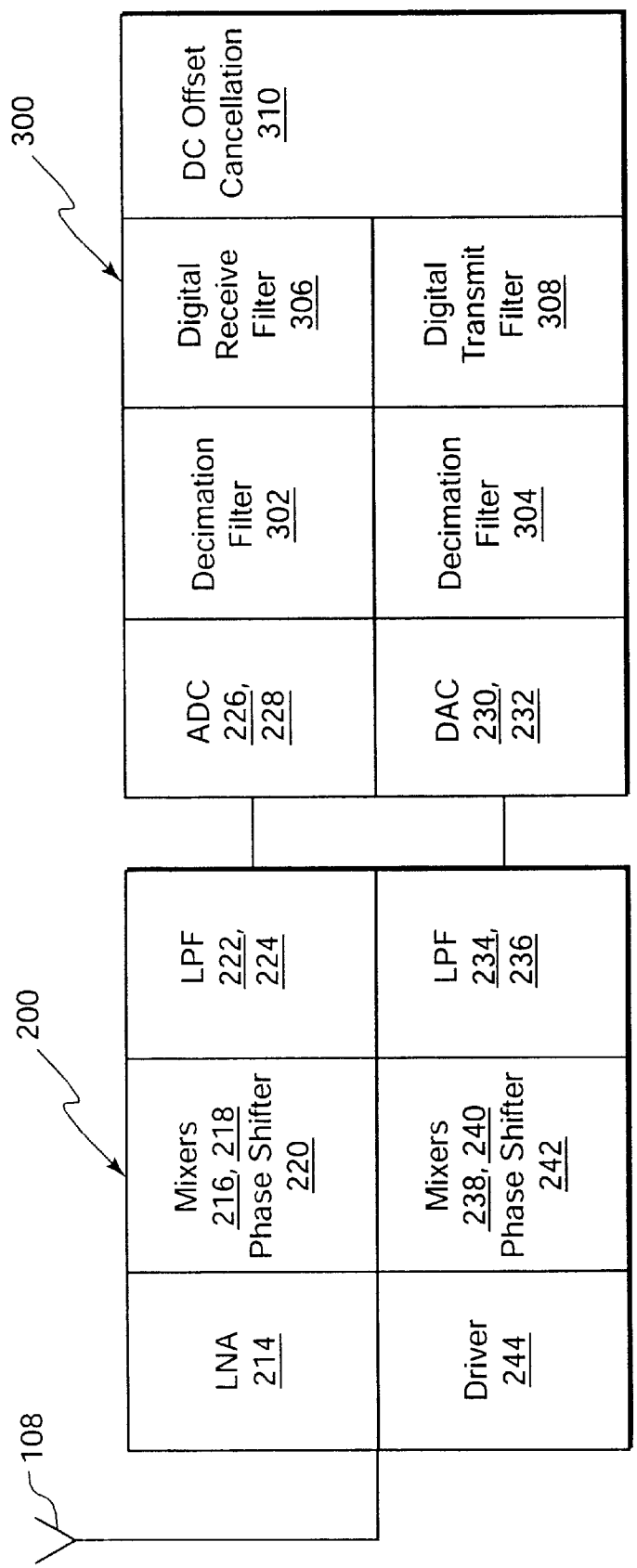
FIG. 7 is a block diagram illustrating a direct conversion radio and digital processing circuitry in accordance with the present invention.

Referring to FIG. 7, there is illustrated a simplified block diagram of the radio 200 along with a digital processing stage 300. The radio 200 may be referred to herein as the "radio front-end" 200. The ADCs 226, 228 and the DACs 230, 232 are shown as part of the digital processing stage 300 rather than the radio 200. It should be understood that the ADCs 226, 228 and the DACs 230, 232 may be considered as part of the radio 200 as described above or as part of the digital processing stage 300 in accordance with the present invention.

As mentioned above, the wide dynamic range ADCs allow both the elimination of AGC in the radio 200 and filtering to be done in the digital domain. Additionally, the oversampling of the ADCs facilitates the filtering to be done in the digital domain. Thus, the digital processing stage 300 includes decimation filters 302, 304, a digital receive filter 306, and a digital transmit filter 308. Furthermore, the digital processing stage 300 includes a DC offset cancellation block 310. As will be discussed below, the decimation filter 302 and the digital receive filter 306 may be combined into one filter, and the decimation filter 304 and the digital transmit filter 308 may be combined into one filter.

The radio 200 and the digital processing stage 300 combine direct RF conversion and delta-sigma data conversion in a unique way that produces a baseband digital receive signal that is further processed in the digital domain. The result is a "software radio" or a "software defined radio" or a "digital radio", i.e., a radio that can be changed or adapted to whatever standard is required simply by changing digital circuits. Furthermore, the approach described herein for such a software radio is a low cost, small size and low power consumption solution. The operation of the digital processing stage 300 will be discussed below.

Figure 8A:
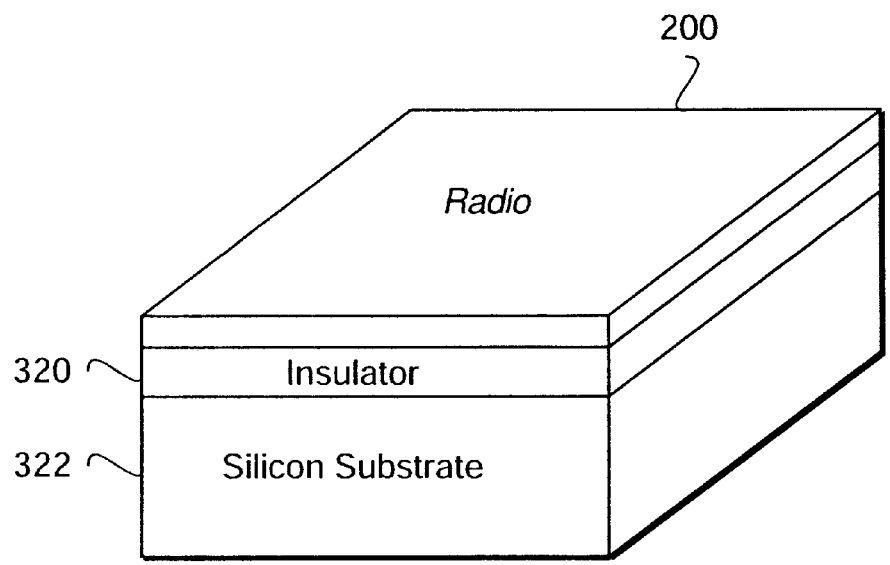
FIGS. 8A and 8B are isometric diagrams illustrating IC integration of the devices shown in FIGS. 5 and 7.
Figure 8B:
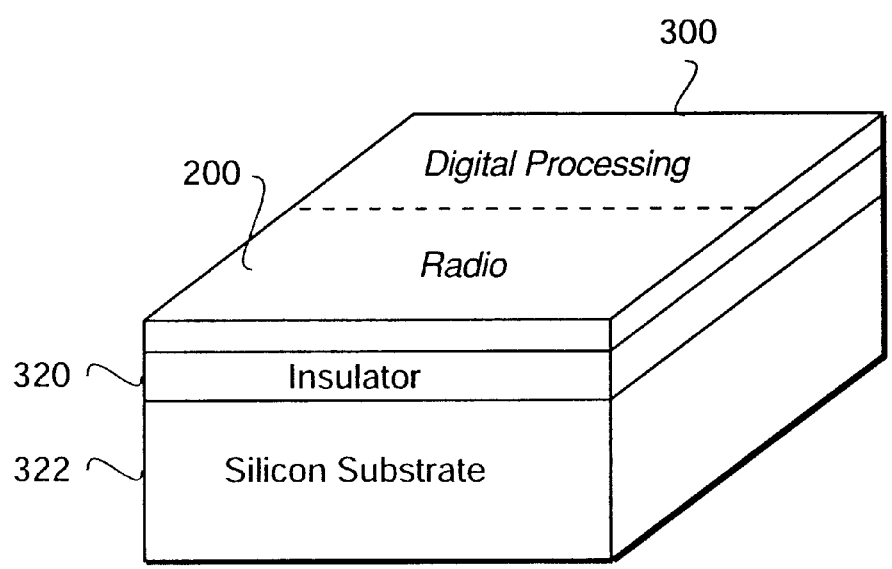

The use of the wide dynamic range ADCs 226, 228 and the elimination of AGC in the radio 200 make it particularly well suited for integration onto a single IC chip. It should be understood that the radio 200 alone may be integrated onto a single IC chip as shown in FIG. 8A, or that the radio 200 along with the digital processing stage 300 may be integrated onto a single IC chip as shown in FIG. 8B, or that the radio 200, digital processing stage 300, and other components may be integrated onto a single IC chip. An example of this later scenario will be discussed below with respect to the integration of a radio, modem and controller onto a single IC chip. It should be understood, however, that such integration is not a requirement of the present invention.

Figure 2:
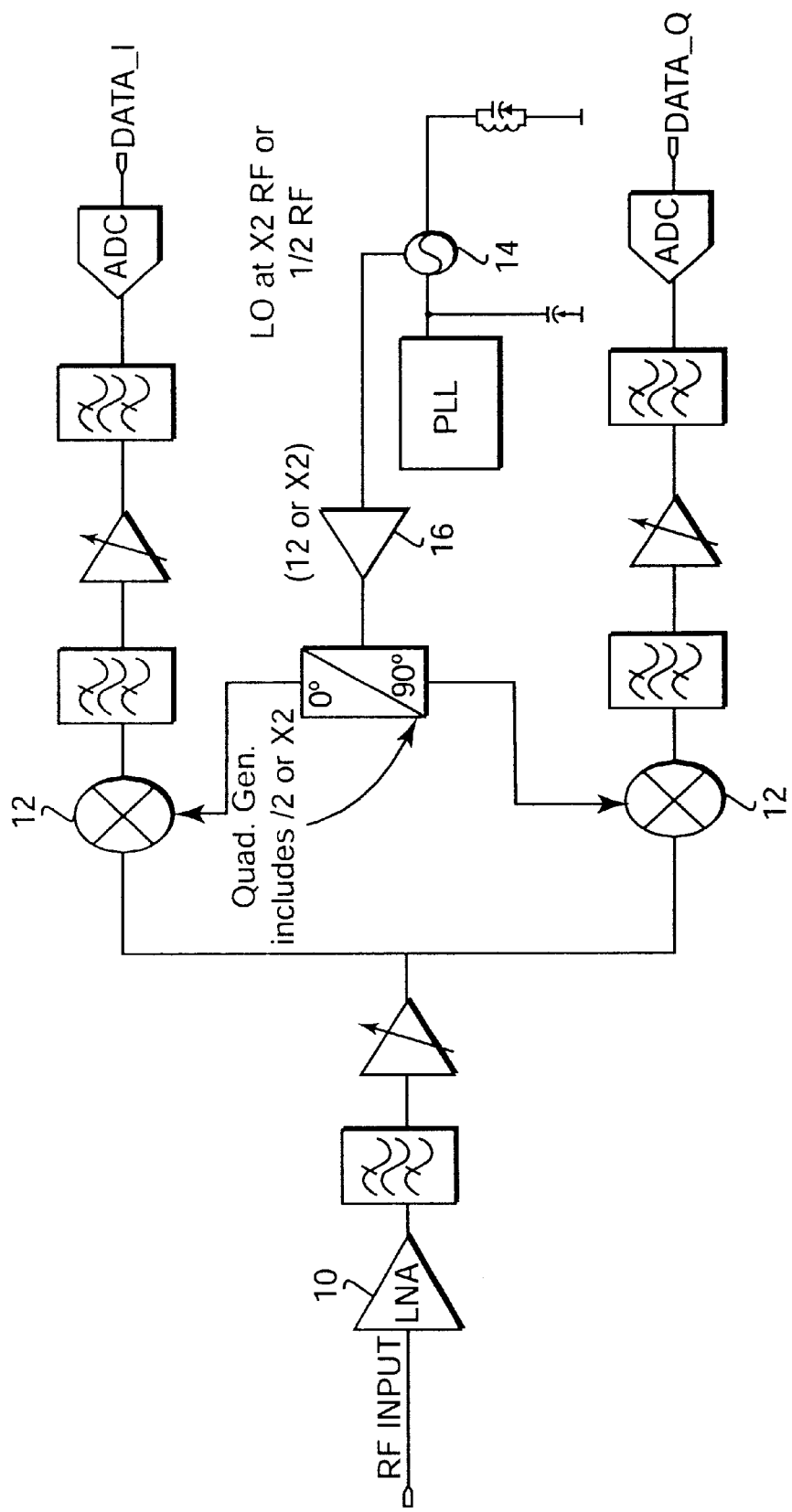
FIG. 2 is a schematic diagram illustrating a conventional direct conversion receiver architecture.
Figure 3:
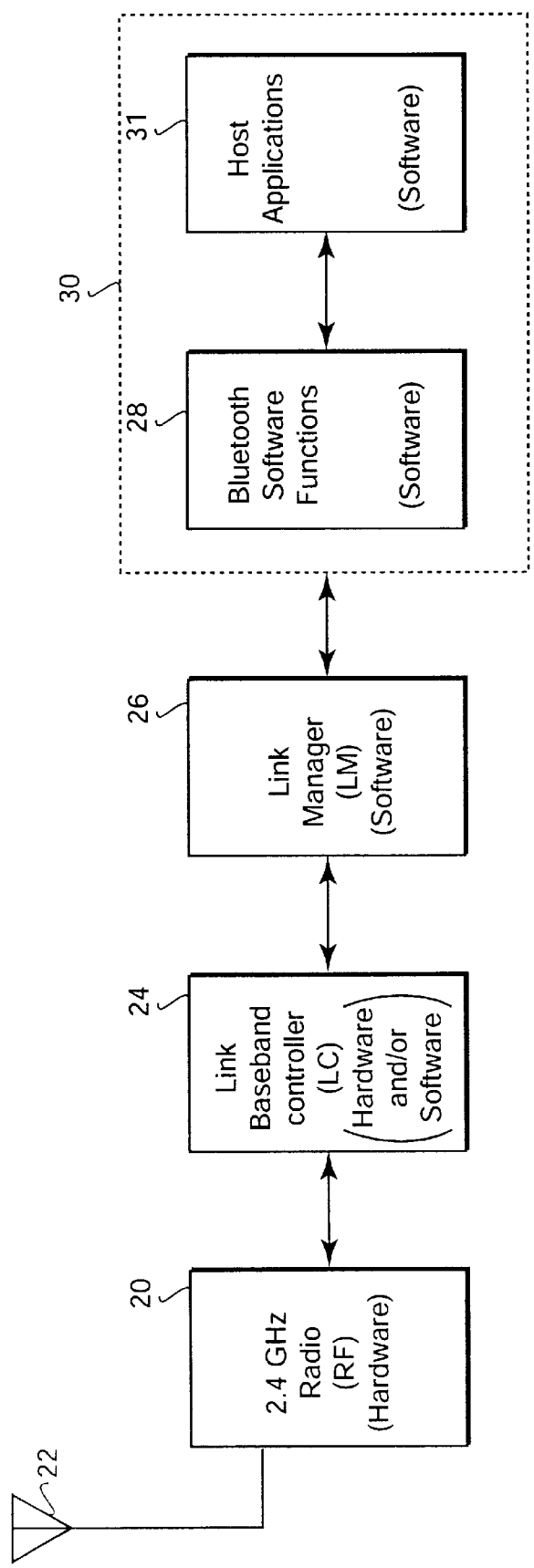
FIG. 3 is a block diagram illustrating the different function blocks in the Bluetooth system.

In the scenario where the radio 200 is integrated onto an IC chip, it has been found herein that the LO leakage problems discussed above with respect to the direct conversion receiver shown in FIG. 2 can be overcome, or at least significantly reduced. One factor that has contributed to the LO leakage problems being overcome is the selection of the fabrication process used to fabricate the transistors and other devices that form the circuit components which make up the radio 200.

Specifically, it has been found that silicon-on-insulator (SOI) BiCMOS technology has many characteristics that are preferable to alternative technologies. There are also several features that make it particularly well-suited to RF applications, such as the radio 200. With SOI, an insulating layer 320 separates circuit devices from the solid silicon substrate 322. A trench isolation structure may also be used which provides a lateral barrier between circuit elements. These features isolate signals and minimize the undesired coupling that would otherwise limit performance. Because parasitic effects also limit the speed at which a circuit can operate, ICs made with SOI offer exceptional high-frequency operation while minimizing power dissipation. Finally, the isolating properties of the SOI technology allow more functions to be packed into a single die. These characteristics translate into advantages in performance, battery life, and size for the end product.

The radio 200 (and the digital processing stage 300) is preferably formed on an SOI substrate, using well-known SOI BiCMOS IC manufacturing processes. An insulating layer separates circuit devices from a solid silicon substrate. The advantages of SOI BiCMOS process technology include greater signal isolation, higher speed devices with lower power consumption, and dense digital CMOS logic. The circuitry of the present invention is preferably implemented in an SOI BiCMOS process technology that uses bonded wafers ("bonded SOI"). Bonded SOI processes are well-known to those of ordinary skill in the art and are believed to be currently available. Exemplary SOI BiCMOS process technologies that may be used to implement the present invention are described in U.S. Pat. No. 5,661,329 entitled "Semiconductor Integrated Circuit Device Including An Improved Separating Groove Arrangement", U.S. Pat. No. 5,773,340 entitled "Method of Manufacturing a BIMIS", and U.S. Pat. No. 5,430,317 entitled "Semiconductor Device", the complete disclosures of which are all hereby fully incorporated into the present application by reference.

When the radio 200 is implemented in SOI, many of the leakage problems described in connection with the direct conversion receiver of FIG. 2 are significantly reduced due to the characteristics of the SOI process. For example, in the receiver 202, if the circuit is fabricated using SOI, the circuitry will be isolated from the bulk substrate by a thin layer of $SiO_2$. With the additional use of a high resistivity substrate, minimal parasitic capacitance will be associated with the circuit elements. This will minimize the parasitic signal paths (conductive paths) that result from the capacitances associated with the various circuit elements, which in turn, will significantly improve isolation from the LO port of the mixers 216, 218 to the RF port of the mixers 216, 218. This means that the amount of LO-RF isolation and reverse isolation of the LNA 214 will be maximized. Therefore, the substrate is preferably formed of a high resistivity (or high Z) material having a high ohm per centimeter rating, such as for example, a 1KΩ per centimeter substrate. While a 1KΩ per centimeter substrate performs very well, it should be understood that a substrate is considered herein to be a high resistivity (or high Z) substrate if it has an ohm per centimeter rating above approximately 100Ω per centimeter.

With respect to lateral signal paths through the substrate, these may be reduced using trench isolation between adjacent blocks. An example of an isolation scheme that has been found to work particularly well in implementing the radio 200 on a single IC chip and which may be used in the present invention is the isolation scheme described in copending U.S. patent application Ser. No. 09/255,747, filed Feb. 23, 1999, entitled "TRENCH ISOLATED GUARD RING REGION FOR PROVIDING RF ISOLATION", invented by James D. Seefeldt, and commonly assigned herewith, the full disclosure of which is hereby incorporated into the present application by reference. For other parasitic signal paths for signals through the substrate, the properties of SOI are such that the circuit blocks are fabricated on top of a high resistance layer of $SiO_2$. If the common substrate is high resistivity, then the path through the substrate is very high impedance. This means there is a high level of isolation between the LNA 214 and the LO port of the mixers 216, 218. By using the low parasitic SOI devices in conjunction with trench isolation and a high resistivity substrate, the amount of LO signal that appears at the output of the receiver 202 can be minimized, thus reducing the problem of LO leakage through conducted and substrate paths.

As discussed above, the bond wires of an IC package can couple RF energy (such as that of the LO) to adjacent I/O pins. In order to minimize this coupling it is important that the LO signal is only present on the chip itself. By fully integrating the VCO the number of I/O pins is substantially reduced. One challenge in fully integrating the LO circuitry is the design of the voltage controlled oscillator (VCO) 248. It is preferable that the LO signal be spectrally clean to meet the requirements of a wireless system. The VCO 248 phase noise is an important part of this noise profile. The spectral purity of the VCO 248 is dependent on the Q of the resonator (or "tank"), i.e., the inductor 254 and the capacitor 256, used in the design. The Q of the inductor used in the resonator generally dominates the Q of the resonator. The challenge therefore becomes the design of integrated inductors with high enough Q. If a spiral inductor is fabricated on a high resistivity substrate (as described above), the Q can be made high enough to implement a spectrally clean VCO 248 and therefore a suitable LO for use in direct conversion applications.

An example of a fully integrated VCO that may be used as the VCO 248 and that has been found to work particularly well in implementing the radio 200 on a single IC chip is described in U.S. Pat. No. 6,268,778, issuing on Jul. 31, 2001, filed May 3, 1999, entitled "METHOD AND APPARATUS FOR FULLY INTEGRATING A VOLTAGE CONTROLLED OSCILLATOR ON AN INTEGRATED CIRCUIT", invented by Lars H. Mucke, Dr. Christopher D. Hull, and Lars G. Jansson, and commonly assigned herewith, the full disclosure of which is hereby incorporated into the present application by reference. An example of a self calibrating or self tuning VCO that has been found to work particularly well in implementing the radio 200 on a single IC chip and that may be used in the present invention is described in U.S. Pat. No. 6,211,745, issuing on Apr. 3, 2001, entitled "METHOD AND APPARATUS FOR DIGITALLY CONTROLLING THE CAPACITANCE OF AN INTEGRATED CIRCUIT DEVICE USING MOS-FIELD EFFECT TRANSISTORS", invented by Lars H. Mucke, Dr. Christopher D. Hull, and Lars G. Jansson, and commonly assigned herewith, the full disclosure of which is hereby incorporated into the present application by reference. An example of a high Q integrated circuit inductor that has been found to work particularly well in implementing the radio 200 on a single IC chip and that may be used in the present invention is described in copending U.S. patent application Ser. No. 09/304,137, filed May 3, 1999, entitled "INTEGRATED CIRCUIT INDUCTOR WITH HIGH SELF-RESONANCE FREQUENCY", invented by James D. Seefeldt and Dr. Christopher D. Hull, and commonly assigned herewith, the full disclosure of which is hereby incorporated into the present application by reference. An example of an integrated circuit varactor that has been found to work particularly well in implementing the radio 200 on a single IC chip and that may be used in the present invention is described in U.S. Pat. No. 6,172,378, issuing Jan. 9, 2001, entitled "INTEGRATED CIRCUIT VARACTOR HAVING A WIDE CAPACITANCE RANGE", invented by Dr. Christopher D. Hull, James D. Seefeldt, and Kishore Seendripu, and commonly assigned herewith, the full disclosure of which is hereby incorporated into the present application by reference.

With respect to full integration of the low pass filters 222, 224, 234, 236, an example of an integrated circuit capacitor that has been found to work particularly well in implementing the radio 200 on a single IC chip and that may be used in the present invention is described in copending U.S. patent application Ser. No. 09/272,822, filed March 19, 1999, entitled "INTEGRATED CIRCUIT CAPACITOR IN A SILICON-ON-INSULATOR INTEGRATED CIRCUIT", invented by James D. Seefeldt, and commonly assigned herewith, the full disclosure of which is hereby incorporated into the present application by reference.

Therefore, SOI with a high resistivity substrate helps to allow the full integration of the LO since it permits high Q inductors to be fabricated in accordance with the above-referenced U.S. patent application. This results in the LO signal being substantially only present on chip and the radiated path for LO-leakage is minimized. Additional detail regarding SOI processes, as well as advantages that result from the use of SOI, will be discussed below.

Because of the improved isolation and reduced LO leakage which can result from the selection of device fabrication processes, such as SOI process technology, it becomes practical to operate the VCO 248 of the receiver 202 at the same or substantially the same frequency as the incoming RF signal received by the LNA 214. As discussed above, the traditional solution for reducing the amount of signal that appears at the antenna port in direct conversion receivers is to have the voltage controlled oscillator (VCO) at a different frequency than the incoming RF signal. The characteristics of an SOI process and the isolation scheme mentioned above, however, provide improved isolation which by itself reduces the amount of signal that appears at the antenna port. Thus, there is no significant advantage in operating the (VCO) at a different frequency than the incoming RF signal. Operating the VCO 248 at the same frequency as the incoming RF signal has the advantage of eliminating the need for multiplier or divider circuitry that would normally be associated with the amplifier 252. Eliminating this additional circuitry that is traditionally used results in a lower current, smaller and lower cost solution.

In the scenario where the radio 200 is integrated onto an IC chip a very small size, low cost and low current solution will result. In this scenario, which is optional, all of the receiver functionality, including the channel filters, may be integrated. To ensure the immunity of the receiver 202 to very large interfering signals, the LNA 214 may have a separate power control. This allows the LNA 214 to be switched off independently.

As mentioned above, the digital processing stage 300 shown in FIG. 7 includes decimation filters 302, 304, a digital receive filter 306, a digital transmit filter 308, and a DC offset cancellation block 310. The decimation filter 302 and the digital receive filter 306 may be left as separate filters or combined into one digital filter. The purpose of the DC offset cancellation block 310 is to remove the DC offset with digital processing directly. This is possible because static DC offsets can be sampled, stored and then canceled relatively easily compared to variable DC offsets. Even variable DC offsets can be canceled. Specifically, this is done by dropping the LO 248's signal to the sensitivity level of the radio 200 which causes the randomness of the DC offset to become smaller than the sensitivity of the radio 200. This means that the signal must be brought down to on the order of −100 dBM. While this has been difficult to do with conventional radios, the fully integrated VCO 248 and the isolation structures used with SOI in the radio 200 makes it possible. This is because of the higher Q inductors which result in low phase noise VCOs with fully integrated tanks (i.e., LC resonators) and the isolation structures that prevent energy from leaking back to the LNA 214.

With respect to variable DC offsets, one of the big problems with conventional direct conversion techniques is leakage, such as from the LO, that turns into a slowly varying DC offset or component. This slowly varying DC component is difficult to remove. The DC offset cancellation block 310 removes the varying DC component by taking advantage of the fact that in some systems, such as TDMA and TDD systems, there are periods of time when the transmitter 204 will not be turned on and when the receiver 202 will not be turned on. During these periods of time the radio 200 is basically inactive and both the transmitter 204 and the receiver 202 are inactive. So, during these inactive periods, the DC offset cancellation block 310 turns off the LNA 214 and measures the true DC offset. Measurement of the true DC offset is possible because the output impedance of the LNA 214 does not significantly change when it is turned off. The output impedance of the LNA 214 does not significantly change because of the SOI process by which the device is made and the high isolation techniques employed. In other words, the semiconductor process and isolation techniques enable the LNA 214 to operate more like a "perfect" device. This means that while the LNA 214 is turned off, it is possible to get a nearly true reading of the actual DC offset generated by the internal effective circuit. This allows the DC offset cancellation block 310 to make a refined correction to the DC offset or component that is leaking through, thus eliminating the DC component.

Figure 9:
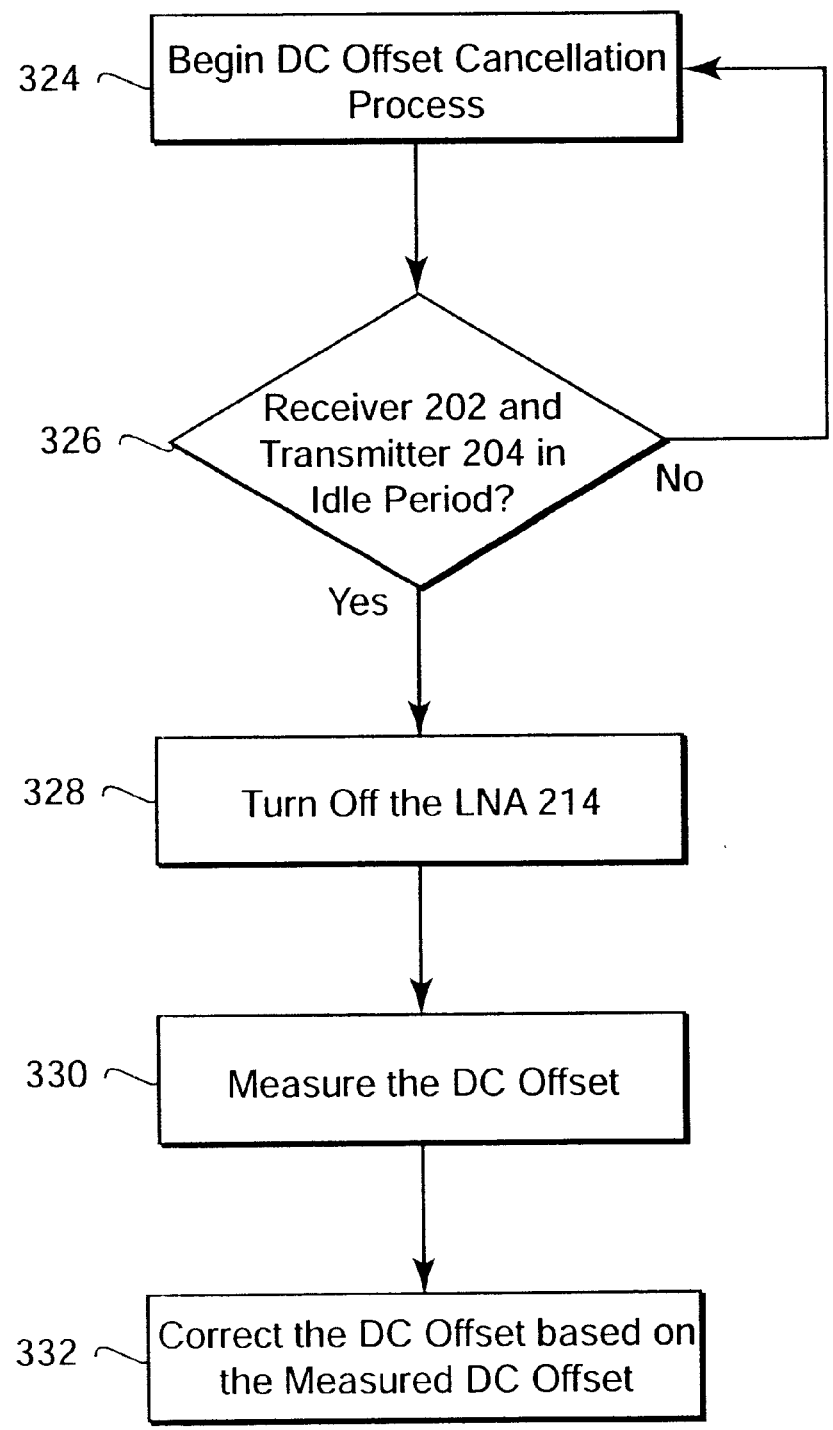
FIG. 9 is a flow diagram illustrating the operation of a DC offset cancellation scheme in accordance with the present invention.

Referring to FIG. 9, a DC offset cancellation process in accordance with the present invention begins in steps 324 and 326 where it is determined whether or not the receiver 202 and the transmitter 204 are in an idle, inactive period. If so, the DC offset cancellation block 310 turns off the LNA 214 in step 328. Instep 330 the DC offset is measured while the LNA 214 is turned off, and in step 332 the DC offset cancellation block 310 corrects the DC offset based on the measured DC offset.

Figure 10:
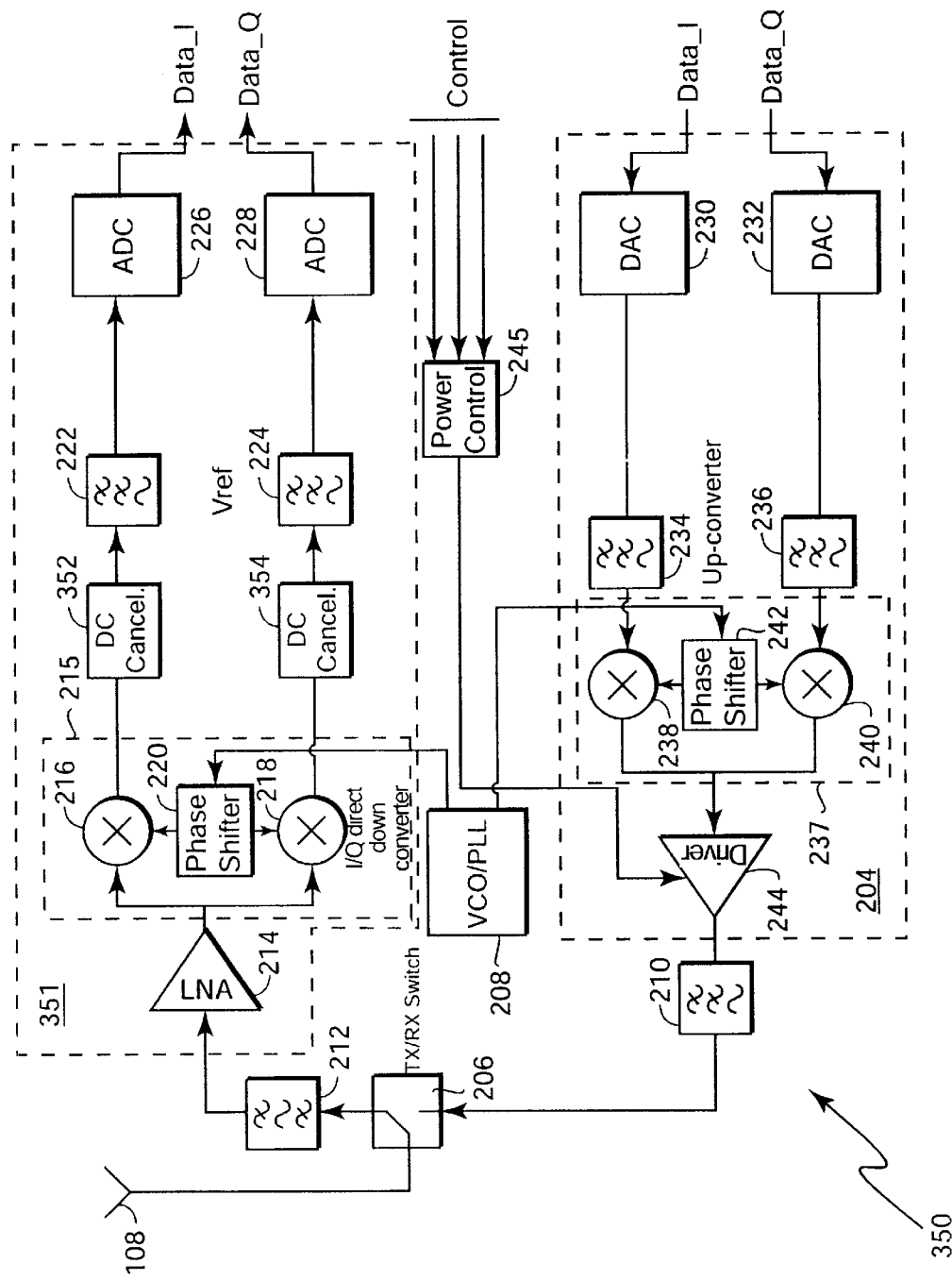
FIG. 10 is a schematic diagram illustrating a direct conversion radio in accordance with the present invention.
Figure 11:
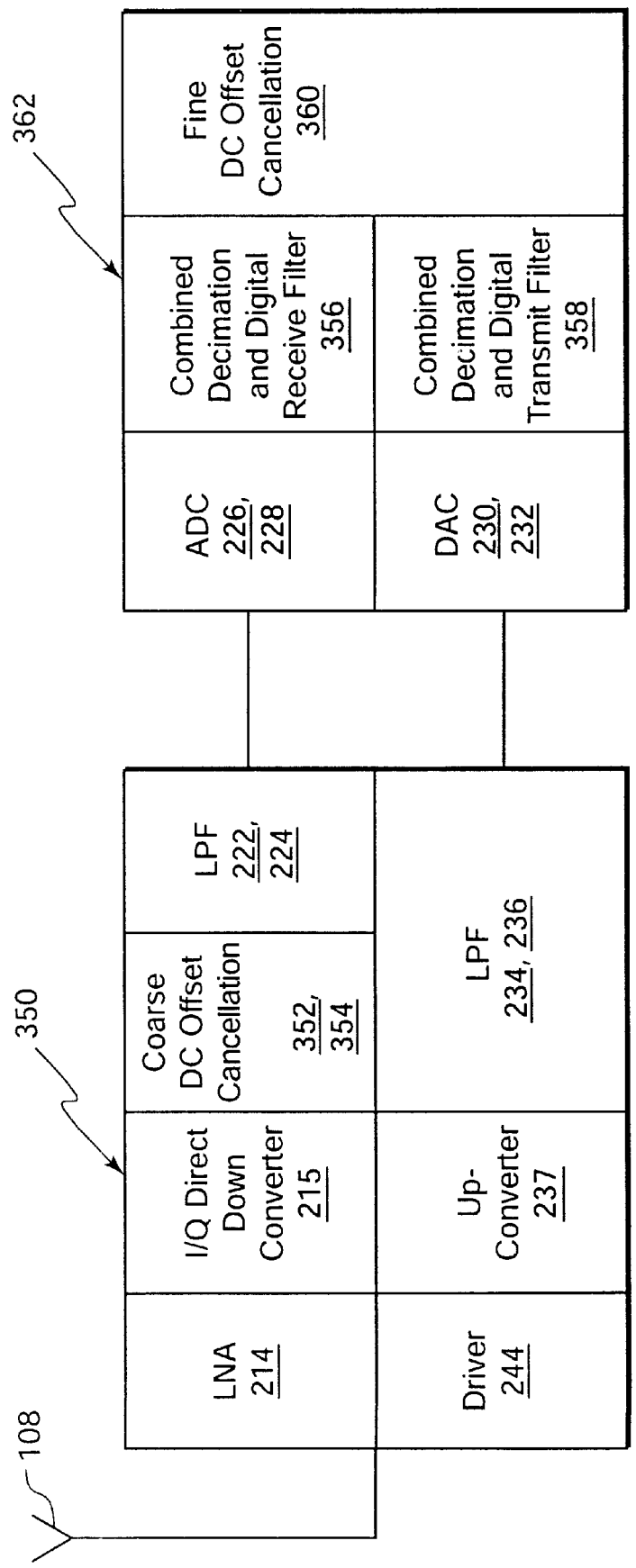
FIG. 11 is a block diagram illustrating a direct conversion radio and digital processing circuitry in accordance with the present invention.

Referring to FIG. 10, there is illustrated another radio front-end 350 in accordance with the present invention. FIG. 11 illustrates the radio front-end 350 and a digital processing stage 362. The ADCs 226, 228 and the DACs 230, 232 are shown as part of the digital processing stage 362 rather than the radio front-end 350. It should be understood that the ADCs 226, 228 and the DACs 230, 232 may be considered as part of the radio front-end 350 or as part of the digital processing stage 362 in accordance with the present invention.

The radio 350 and the digital processing stage 362 utilize another type of DC offset correction in accordance with the present invention. Specifically, the receiver 351 of the radio 350 includes coarse DC offset cancellation circuits 352, 354, and the digital processing stage 362 includes a fine DC offset cancellation stage 360. The coarse DC offset cancellation circuits 352, 354 provide analog DC offset cancellation, and the fine DC offset cancellation stage 360 provides a digital DC offset cancellation. This combination of analog and digital DC offset cancellation is particularly advantageous in direct conversion radios and in the context of TDMA and TDD systems.

The coarse DC offset cancellation circuits 352, 354 and the fine DC offset cancellation stage 360 provide two DC offset corrections. The first correction is performed by the DC offset cancellation circuits 352, 354 and is an analog correction that is done in a mixed mode domain. In other words, this correction is performed just after the I/Q direct down converter 215.

Figure 12:
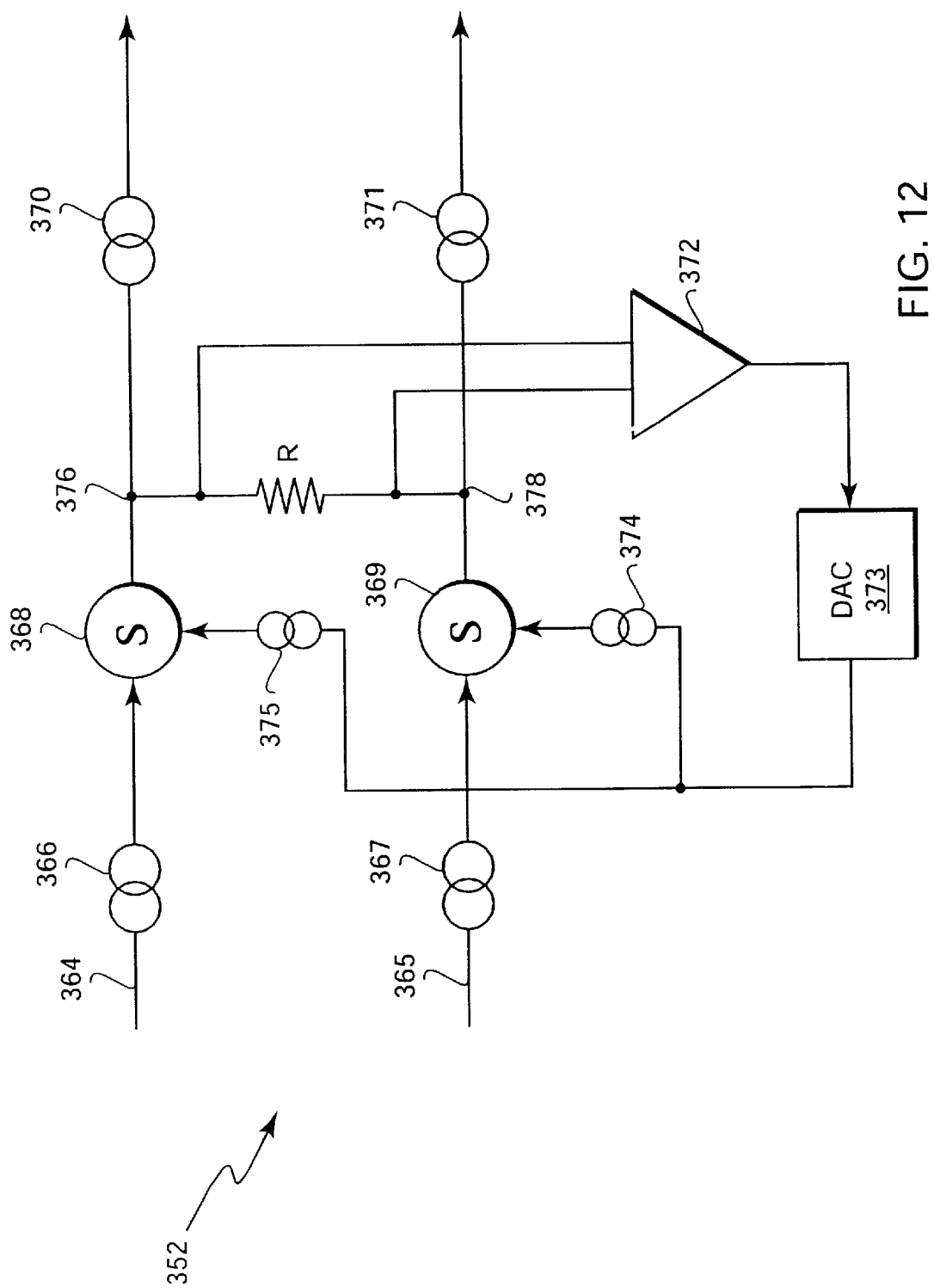
FIG. 12 is a schematic diagram illustrating an example of a coarse DC offset cancellation circuit.

FIG. 12 illustrates the DC offset cancellation circuit 352 in further detail. The technique that the circuit 352 implements is successive approximation analog-to-digital conversion. Specifically, a differential input signal is received at inputs 364, 365. The current sources 366, 367 provide current inputs to the summation blocks 368, 369, respectively. The summation blocks 368, 369 output nodes 376, 378 are connected via a resistor R, which for example may have a value of 20 KΩ. The output nodes 376, 378 are used as the inputs of a comparator 372, the output of which is fed into a DAC 373. The output of the DAC 373 is fed through current sources 375, 374 and then into the summation blocks 368, 369, respectively.

Embedded in (or a byproduct of) the successive approximation analog-to-digital converter of the circuit 352 is the DAC 373 which facilitates the canceling of the DC offset. Specifically, during operation the comparator 372 measures the difference in the voltage between nodes 376, 378 and generates a digital output. The DAC 373 takes this digital output and provides a feedback current to the summation blocks 368, 369. The feedback current attempts to drive the error between nodes 376, 378 to zero. Because the inputs of the summation blocks 368, 369 are currents, the error at the nodes 376, 378 is a voltage. Thus, by driving the error to zero, the voltage difference at nodes 376, 378 is driven to zero which results in the DC offset being canceled.

The successive approximation technique, however, provides only a course DC offset cancellation. This is because to increase the resolution of the successive approximation of the ADC and DAC, the bit width of the data converters needs to be very large. Therefore, the resolution is basically limited by the matching of the DAC 373. By way of example, the DAC 373 may be either 6 bits or 8 bits.

The coarse DC offset cancellation circuits 352, 354 provide DC offset cancellation for the DC offsets of the mixers 216, 218. The specific resolution of the coarse correction made by the DC offset cancellation circuits 352, 354, however, is not critical. This is because the correction is done at the output of the mixers 216, 218 so that the cascading DC offsets will not cause later stages to saturate. However, any DC offset after the mixers 216, 218 will still be seen in the digital domain. For example, even the ADCs 226, 228 can have a DC offset. Therefore, it is advantageous to perform a fine DC offset correction in the digital domain. This fine DC offset correction is performed by the fine DC offset cancellation stage 360. Thus, the fine DC offset cancellation stage 360 provides a second DC offset correction.

Figure 13:
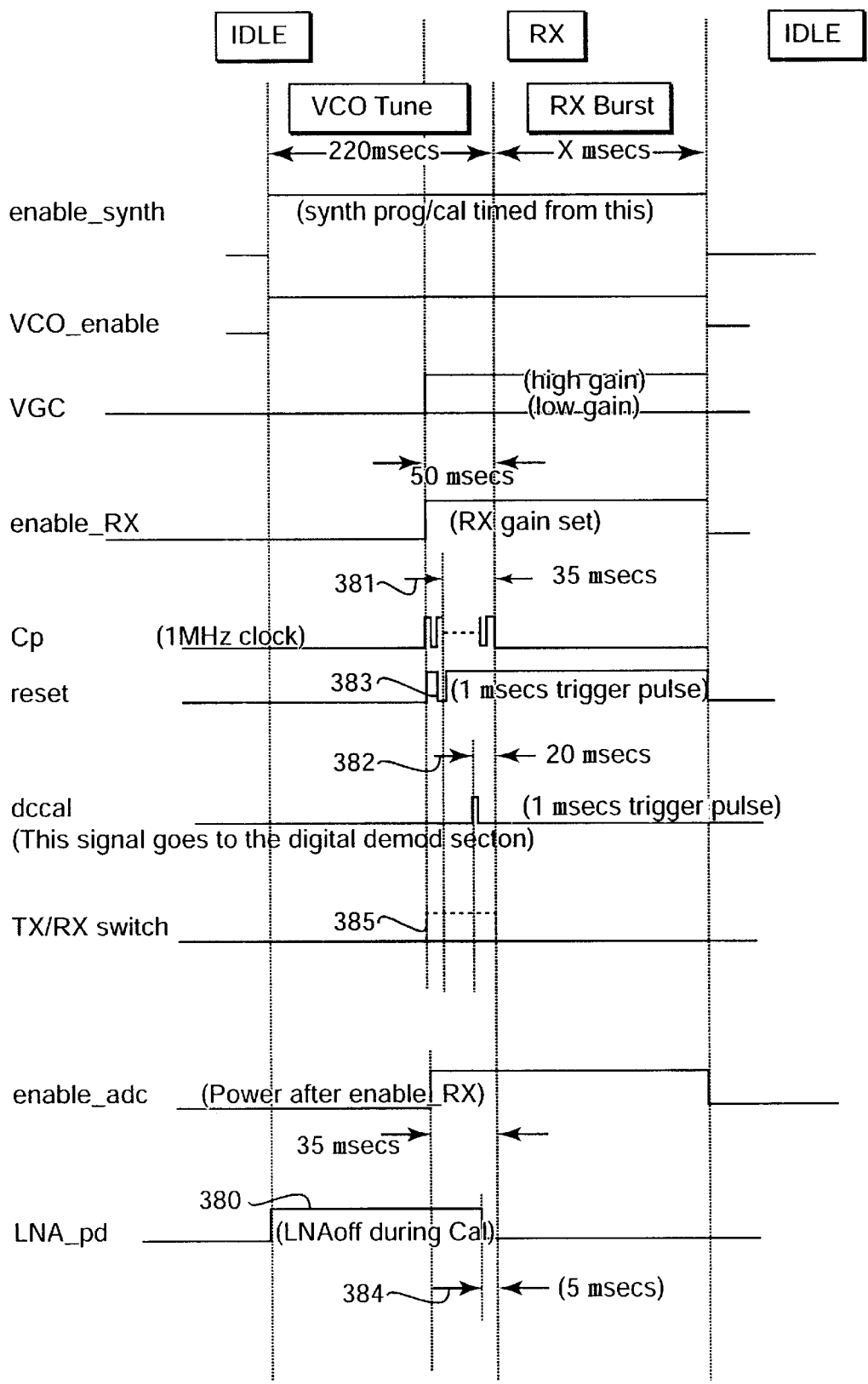
FIG. 13 is a timing diagram illustrating an example of a DC calibration sequence.

An example of the operation of the coarse DC offset cancellation circuits 352, 354 and the fine DC offset cancellation stage 360 will now be described. FIG. 13 illustrates the steps and timing for each event that occurs during and before a receive (RX) burst in this example. This example assumes that the receiver is out of sleep mode and that a 32 MHz clock and analog regulators are up and settled.

The example operation begins with a VCO tune period that is approximately 220 μsec long. The VCO tune period occurs between each frame of transmit and receive and is basically a dead period. One purpose of this dead period is to allow the synthesizer to settle because it is changing frequencies. During this 220 μsec dead period the LNA 214 is turned off as indicated at 380.

There are two intermediate steps in the VCO tune period. Both steps involve the DC calibration of the receiver. The first step indicated at 381 occurs 35 μsecs before the receiver burst and is the coarse DC calibration. This is a hardware calibration undertaken by circuits 352, 354 described above. The actual time it takes to do the calibration is approximately 8 μsecs. Approximately 14 μsecs after initiating the coarse DC calibration, the second DC calibration occurs as indicated at 382. This is the fine DC calibration performed by block 360. The signal "dccal" is sent to the digital demodulation section (described below). During the second or fine DC calibration, the DC offset due to the intrinsic circuitry is sampled. The sampled DC offset is averaged over some finite period of time, normally at least 10 microseconds. By way of example, the DC offset may be averaged over 32 microseconds. Then, using a digital subtraction, the calculated average DC offset is subtracted out from all of the data of the next frame. This process occurs in the fine DC offset cancellation stage 360 after the decimation filter 356. It is typically a slow process and is done at a very high resolution. The decimation filter 356 provides the high resolution.

Each of the trigger pulses is 1 μsec long as indicated at 383, and the coarse correction circuits 352, 354 are −ve edge sensitive. The leading edge of the 1 μsec trigger pulse initiates the second DC calibration. The LNA 214 is powered up 5 secs before the RX burst is expected as indicated at 384. This allows time for the receiver to settle after this disturbance. The actual length of the RX Burst, X μsecs, depends on the type of burst to be received. Although the TX/RX switch signal 385 (shown as a dotted line) is not required in the example described, it may be used if the DC calibration requires more isolation from the antenna than is provided when the LNA 214 is turned off. Under such circumstances the TX/RX switch will go into TX mode during the calibration period.

As shown in FIG. 11, the decimation filters 302, 304, the digital receive filter 306, and the digital transmit filter 308 of the digital processing stage 300 have been combined in accordance with the present invention. Specifically, the decimation filter 302 and the digital receive filter 306 have been implemented in one combined filter 356, and the decimation filter 304 and the digital transmit filter 308 have been implemented in one combined filter 358.

The radio 200 may be implemented in many different ways with any one or more of several optional features. For example, multiple power modes may be included which allow each section of the radio 200 to be powered up and down independently. The reference oscillator crystal and the low-power oscillator crystal may be located external to the radio 200. An external amplifier may be added to allow operation where extended range capability is required. In the scenario where the UHF PLL/VCO 208 is utilized, no external VCO resonator components are required. The dc power to each stage in the radio 200 may be controlled separately. Various on-chip switches may be added to control the dc power to the reference oscillator, the transmitter 204, the PLL/VCO 208, the receiver 202 and the LNA 214.

The RMC

Figure 14:
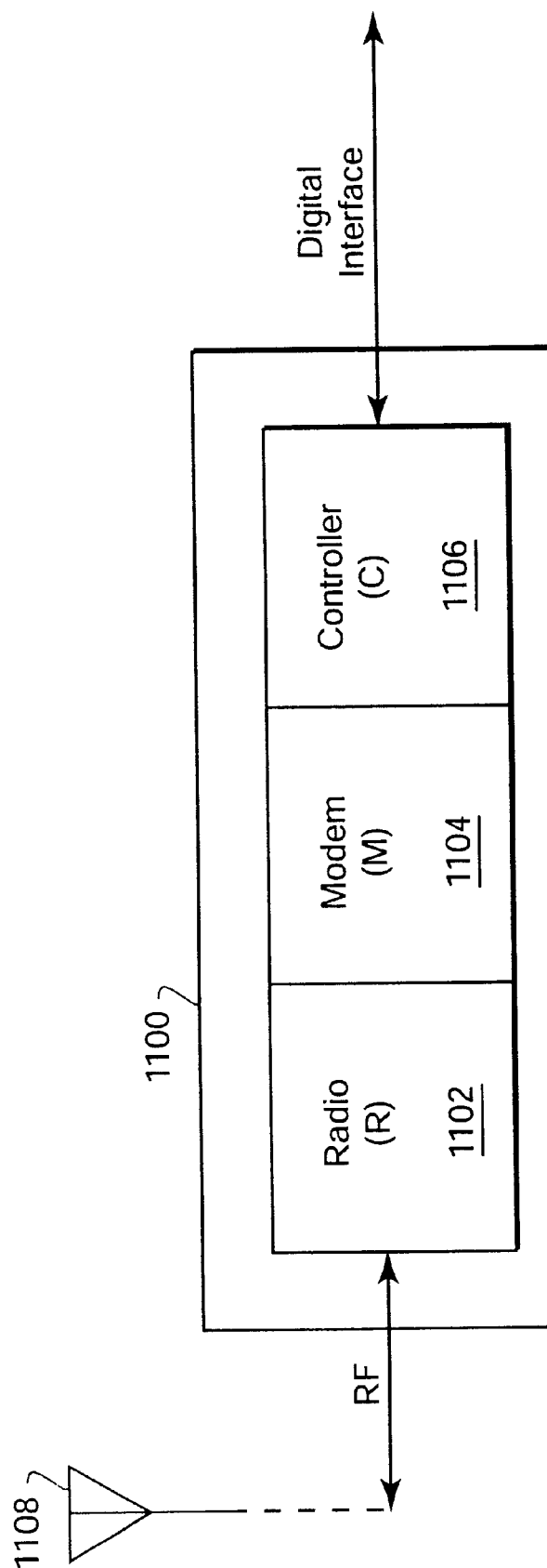
FIG. 14 is a block diagram illustrating an architecture for wireless communications in accordance with the present invention.

Referring to FIG. 14, there is illustrated an architecture 1100 in accordance with the present invention. The architecture 1100 is particularly useful for implementing wireless communications. For example, the architecture 1100 may be used to efficiently implement the radio 20 and the link baseband controller 24 layer of the Bluetooth specification described above, as well as some portions of the link manager 26 layer, such as for example the low power mode protocols and initial call setup. Implementing portions of the link manager 26 adds functionality which substantially improves the performance of the Bluetooth system. The improved performance is due, at least in part, to the advantages of the architecture 1100, which include lower current and power, lower cost, lower interference, smaller size and footprint, and the ability to be implemented with multiple product platforms.

There are two categories of protocol actions in the link manager 26 layer that are implemented by the architecture 1100. The first is rapid and tightly time constrained actions. For example, the Page, Page Scan, Inquiry and Inquiry Scan are implemented in the connection state machine (discussed below) of the controller 1106. Implementation of these functions in the controller 1106 relieves the host or external processor from these tasks. This saves power and reduces the requirements of the external processor. The second category of protocols is repetitive transmission and monitoring actions of master and parked slave. By implementing this action in the architecture 1100 the external processor can remain powered down until something addressed to the unit occurs. This also saves power. As will be discussed below, the controller 1106 includes a Rx/Tx state machine, which implements link controller actions, and a connection state machine, which implements protocol actions. The other portions of the link manager 26 layer, as well as the higher layers of the Bluetooth specification, may be implemented in an external processor or the host.

In general, the architecture 1100 will run autonomously according to commands and state machine design until one of several events occur at which time the controller 1106 will interrupt or otherwise communicate with the host to indicate completion or abnormal ending of the commanded actions. The higher layers of the Bluetooth specification are partitioned between software and hardware implementation. The choice of hardware versus software implementation may be made, for example, upon whether the frequency of the signal being processed is high, or the function is repetitive in all conditions. If the frequency is high and the function predictable, the functions may be implemented in hardware. Mode dependent functions such as Logical Link control may be implemented in software.

Although the architecture 1100 is particularly useful for implementing the Bluetooth specification, it should be well understood that the architecture 1100 may also be used, in accordance with the present invention, to implement other types of wireless communications standards, specifications and/or protocols. Examples of other protocols that the architecture 1100 could be used to implement are Home RF, IEEE 802.11, etc. There are several standards in the ISM frequency band, and it is believed that Japan is reviewing their own requirements. Thus, the architecture 1100 may be used to implement many different types of wireless systems in the general ISM frequency band in addition to the Bluetooth standard. Whether or not it is used to implement the Bluetooth specification, the architecture 1100 may be used in cellular handsets, personal computer (PC) peripheral cable replacement, personal digital assistants (PDA), palmtop computers, personal organizers, cordless telephones, cordless headsets, etc.

The architecture 100 generally includes a radio 1102, a modem 1104, and a controller 1106. Because of its radio (R), modem (M), controller (C) architecture, the architecture 1100 may at times be referred to herein as the RMC 1100. The radio 1102 includes an antenna interface for connection to an antenna 1108. The controller 1106 includes a digital interface for communication with external devices. Control of the radio 1102 is provided by the modem 1104 and controller 1106 as described herein.

In the scenario where the architecture 1100 is used to implement the Bluetooth specification, it will be fully compliant with the Bluetooth radio and baseband layers. For example, the radio 1102 may be a 2.4 GHz radio transceiver, the modem 1104 may be a 1 Mbps Gaussian Filtered Frequency Shift Keying (GFSK) modem, and the controller 1106 may handle time-critical packet processing and protocols. Together, the modem 1104 and the controller 1106 may be used to implement the timing, frequency hopping, framing, packets, flow control, error detection and correction, and encryption specified in the Bluetooth specification. In short, the modem 1104 and the controller 1106 can fully implement the baseband or link control layer in the Bluetooth specification. It should be well understood, however, that the architecture 1100 may be used to implement wireless communications in multiple frequency bands in accordance with the present invention and is not limited to 2.4 GHz. For example, the architecture 1100 may be used for, and the teachings of the present invention may be applied to, wireless communications devices using high-frequency signals such as 900 MHz to 1900 MHz for cellular phones and higher frequencies (up to 6 GHz) for other systems such as wireless local area networks (LANs), as well as any other frequency in the ISM band.

Figure 15A:
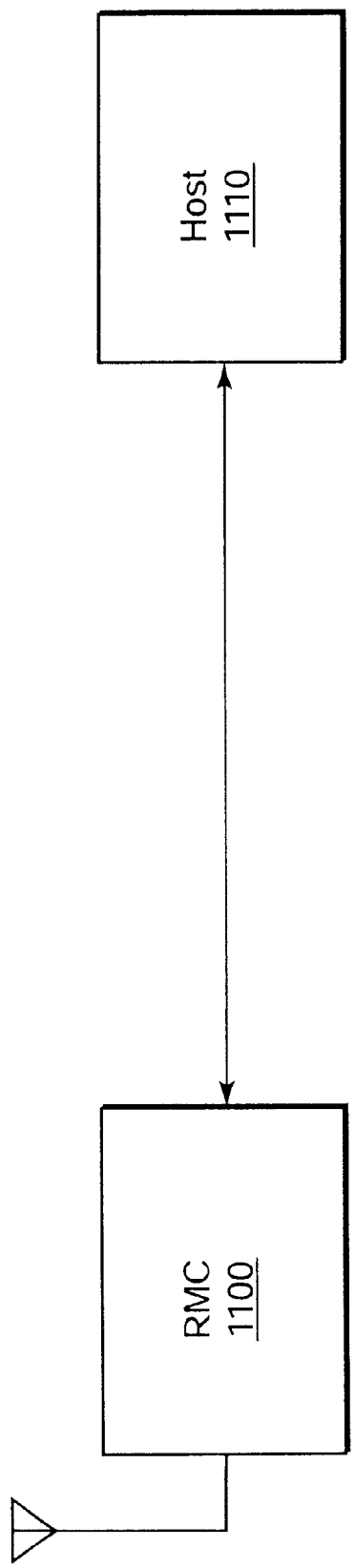
FIGS. 15A and 15B are block diagrams illustrating ways of interfacing the architecture shown in FIG. 14 with a host.
Figure 15B:
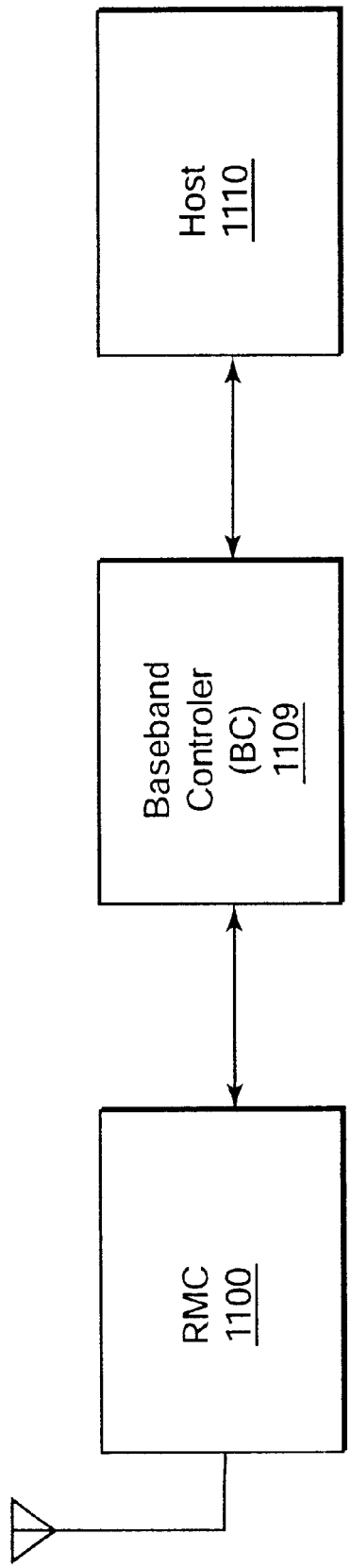

The architecture 1100 may be used to implement the Bluetooth system with a host microprocessor 1110 in a variety of ways. Referring to FIG. 15A, the architecture 1100 may be connected directly to the host 1110. Referring to FIG. 15B, the architecture 1100 may be connected to a baseband controller processor 1109, where the baseband controller 1109 is connected to the host 1110. An advantage of using the baseband controller 1109 is that it can run software that implements the remaining Bluetooth specific tasks not handled by the architecture 1100 without involvement of the host 1110. The baseband controller 1109 may be implemented with virtually any commercially available generic processor.

Figure 16C:
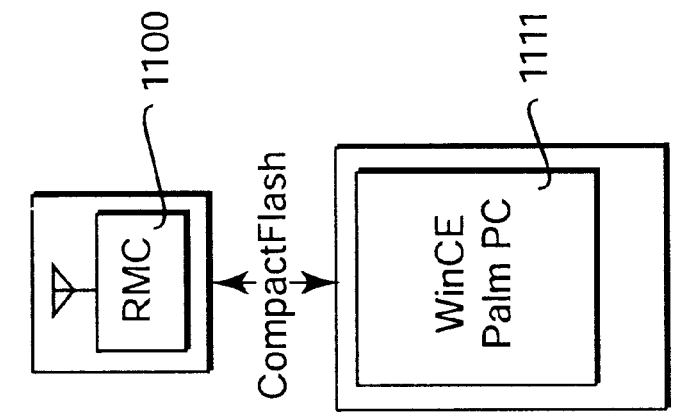
FIGS. 16A, 16B, and 16C are block diagrams illustrating several ways of interfacing the architecture shown in FIG. 14 with a PDA.
Figure 16B:
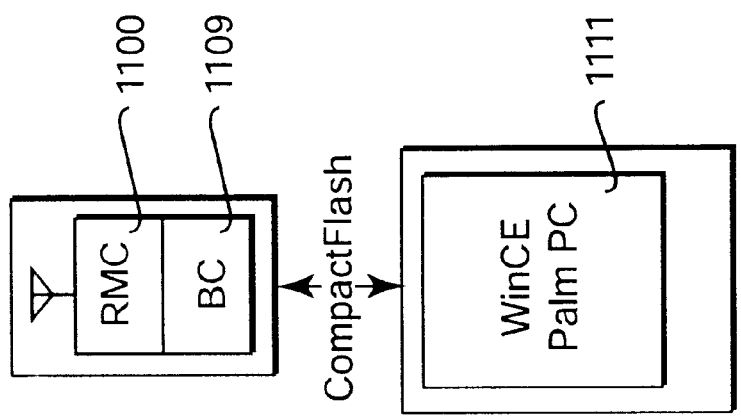
Figure 16A:
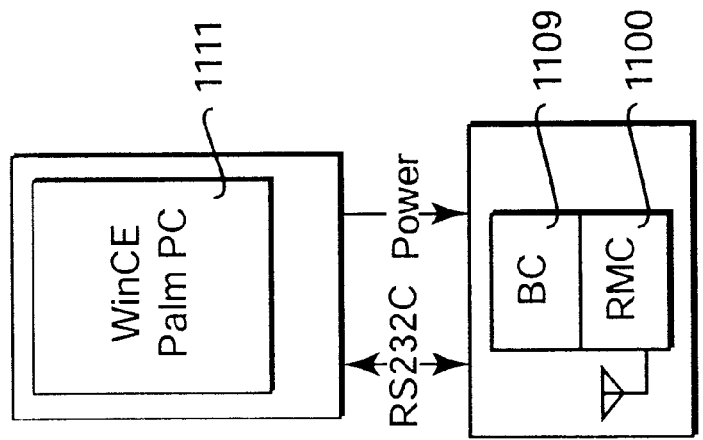

The architecture 1100 may be interfaced with PDAs, PCs and cell phones in a variety of ways. External interfaces may include, for example, RS232C, CompactFlash, Improved CompactFlash, universal serial bus (USB), PCI, and PCM-CIA. Internal interfaces may include a serial port interface and a parallel interface. FIGS. 16A, 16B and 16C show several ways of interfacing the architecture 1100 with a palm PC 1111. FIG. 16A shows that RS232C may be used to interface with the BC 1109 (e.g., a cradle port interface). FIG. 16B shows that CompactFlash may be used to interface with the BC 1109. FIG. 16C shows that CompactFlash may be used to interface directly to the architecture 1100 (an improved CompactFlash interface). FIG. 17 illustrates some of the external interface tradeoffs.

Figure 18:
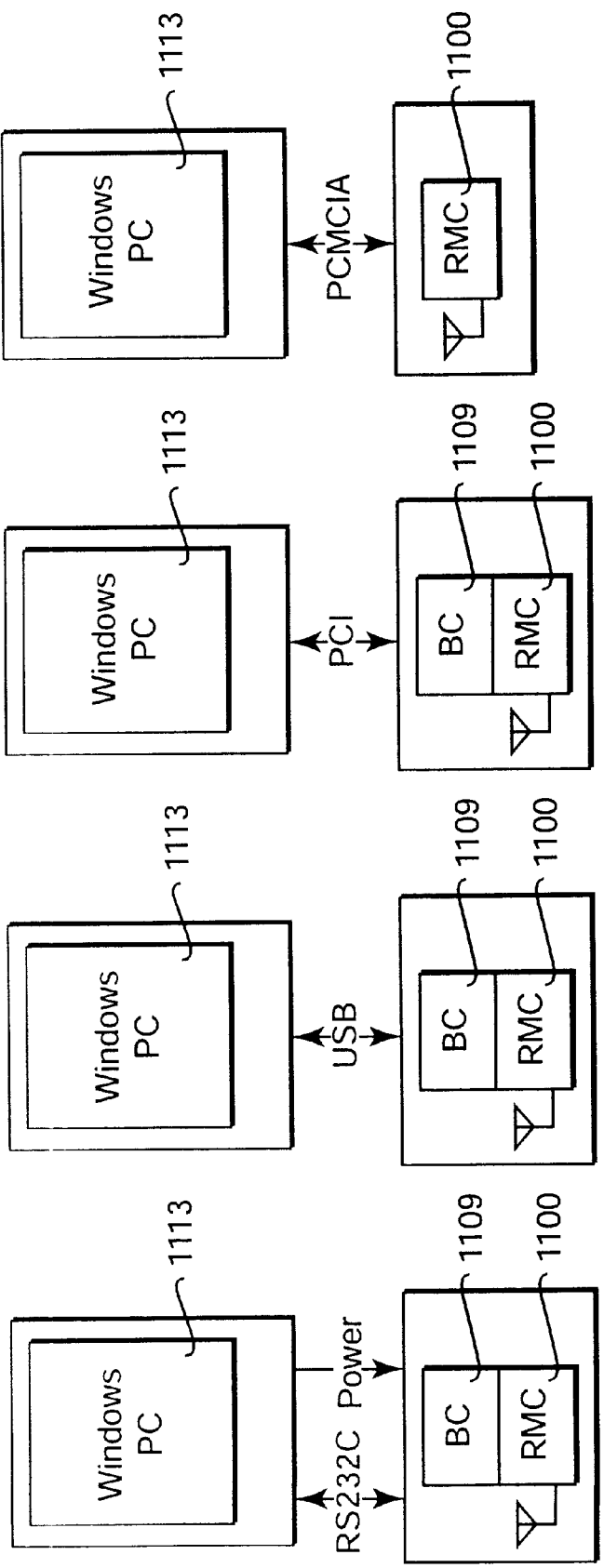
FIGS. 18A, 18B, 18C and 18D are block diagrams illustrating several ways of interfacing the architecture shown in FIG. 14 with a PC.

FIGS. 18A, 18B, 18C and 18D show several ways of interfacing the architecture 1100 with a PC 1113. FIG. 18A shows that RS232C may be used to interface with the BC 1109. FIG. 18B shows that universal serial bus (USB) may be used to interface with the BC 1109. FIG. 18C shows that PCI may be used to interface with the BC 1109. FIG. 18D shows that PCMCIA (PC card interface) may be used to interface directly with the architecture 1100.

Figure 19:
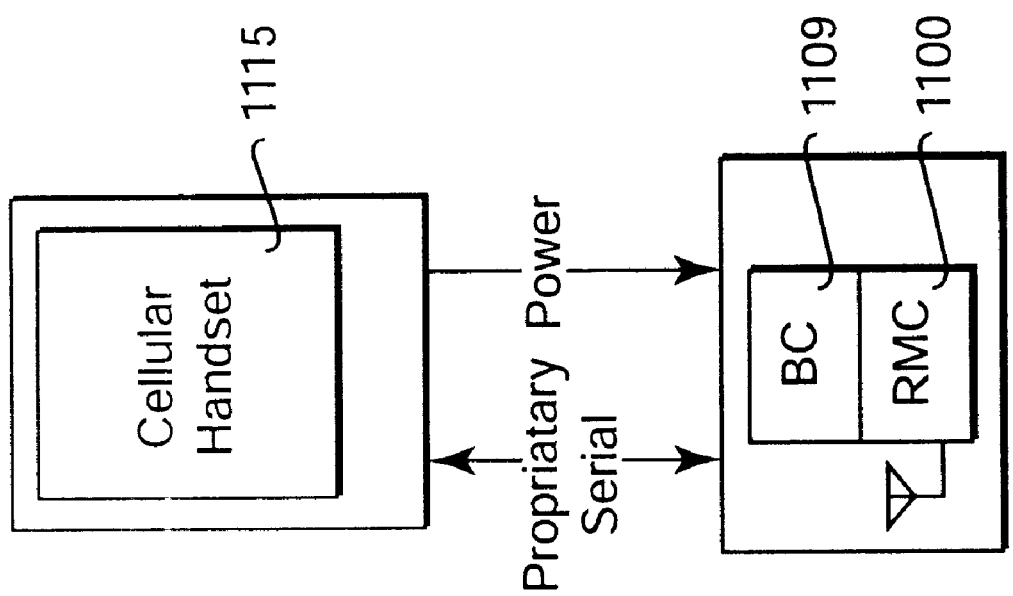
FIG. 19 is a block diagram illustrating a way of interfacing the architecture shown in FIG. 14 with a cellphone.

FIG. 19 illustrates one way in which the architecture 1100 may be interfaced to a cell phone 1115. Specifically, many cell phone OEMs use a different interface. Some are similar to RS-232, and some are proprietary. In such a scenario, the proprietary serial interface may be used.

Figure 20B:
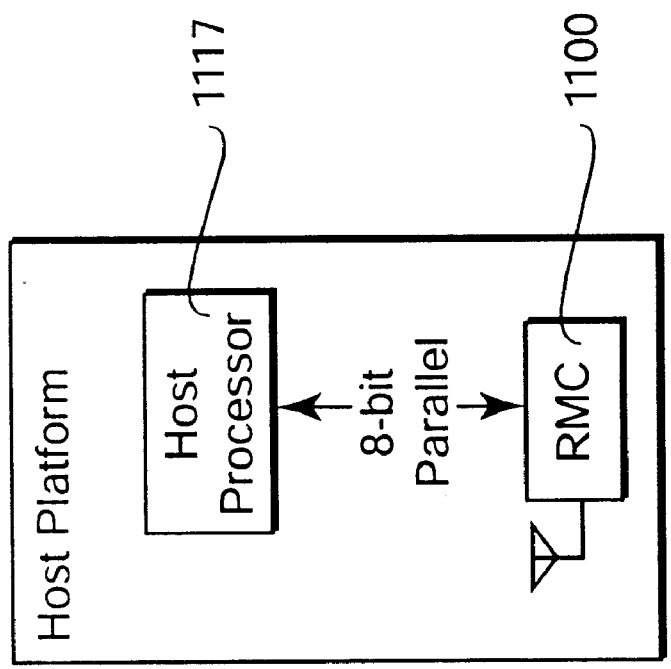
FIGS. 20A and 20B are block diagrams illustrating two different types of internal interfaces which may be used with the architecture shown in FIG. 14.
Figure 20A:
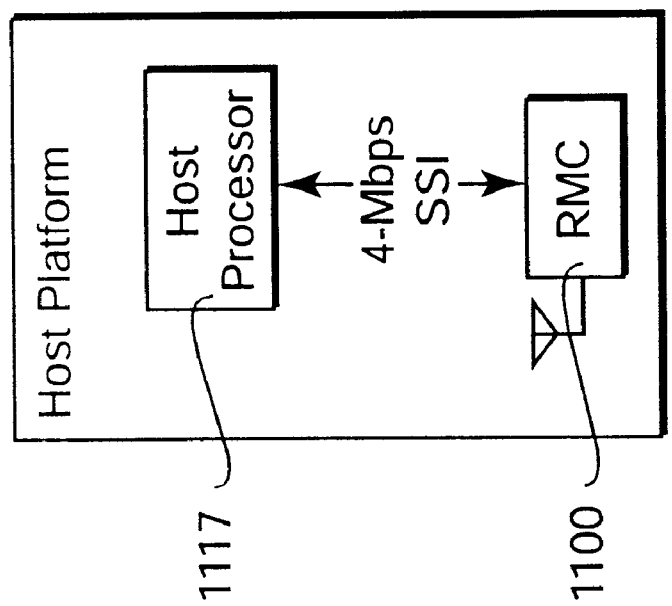

FIGS. 20A and 20B illustrate internal interfaces options. Specifically, the interface is part of the controller 1106 which will be discussed in more detail below. The interface may be a serial interface as shown in FIG. 20A. By way of example, the serial interface may be a 4-Mbps synchronous serial interface (SSI). Or, the interface may be a parallel interface as is shown in FIG. 20B. By way of example, the parallel interface may be an 8-bit parallel interface. It should be understood that the architecture 1100 may include one or both of the serial and parallel interfaces. The host 1117 may be, for example, a cellphone, PC, PPC, HPC, PC peripheral, cordless phone, headset, etc. FIG. 21 illustrates some of the internal interface tradeoffs. The interface facilitates communication, such as exchange commands and data, with the interface of the BC or host to implement the higher layers of the Bluetooth protocol.

Figure 33:
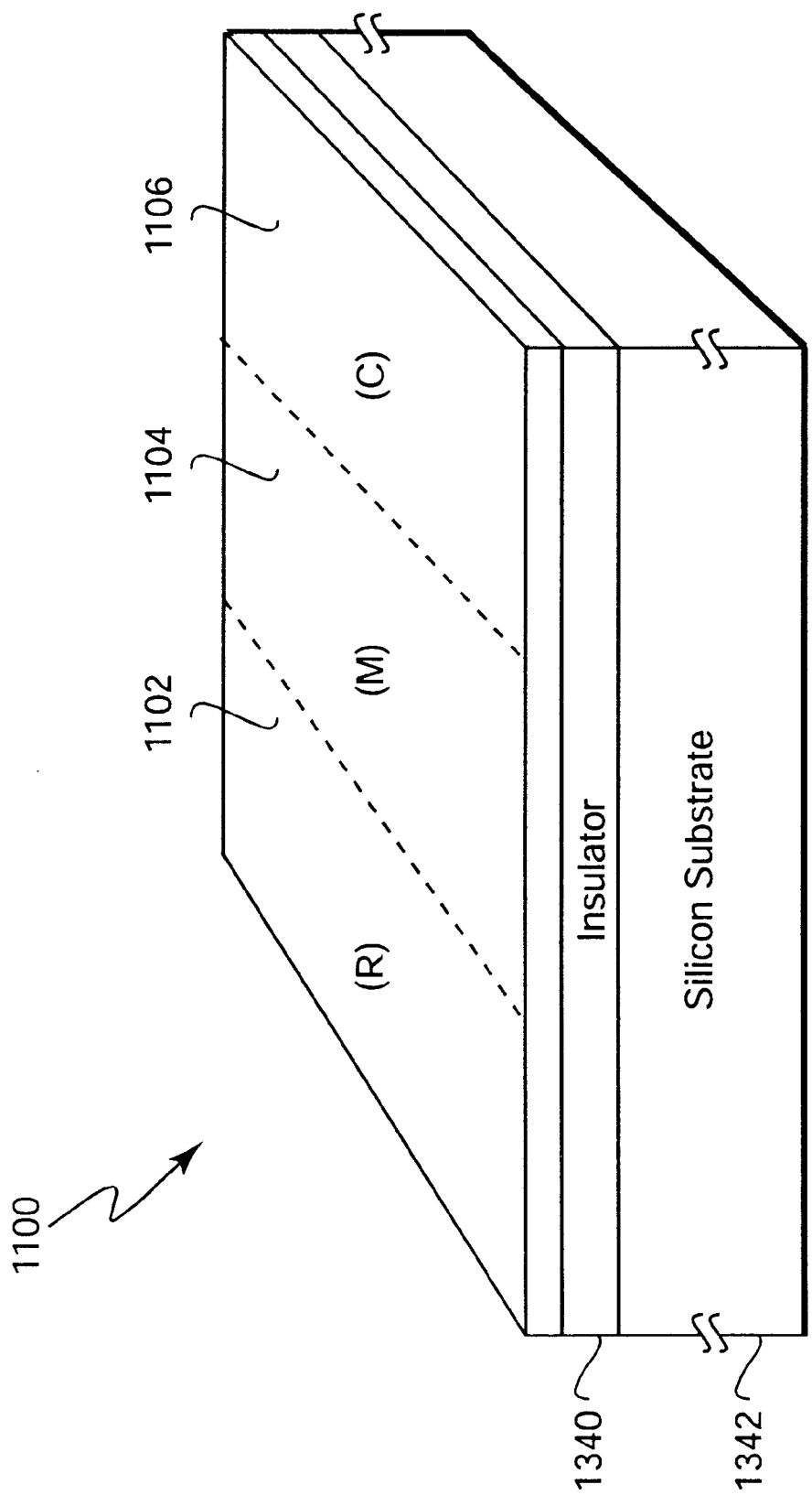
FIG. 33 is an isometric, cross-sectional view of the architecture for wireless communications shown in FIG. 14 integrated onto a single integrated circuit (IC).

One advantage of the architecture 1100 that will be discussed in more detail below is that it may be integrated onto a single integrated circuit (IC) chip (as is shown, for example, in FIG. 33). The architecture 1100 may, for example, be integrated onto a single monolithic integrated circuit. In this scenario, the architecture 1100 will provide a fully integrated radio transceiver, modem and baseband controller on a single chip. No external VCO or channel filter components will be required. It should be well understood, however, that integration of the architecture 1100 onto a single IC chip is not a requirement of the present invention. Indeed, the architecture 1100 may be implemented with discrete circuit components, as a module, with more than one IC chip, etc., all in accordance with the present invention.

The Radio

Figure 1:
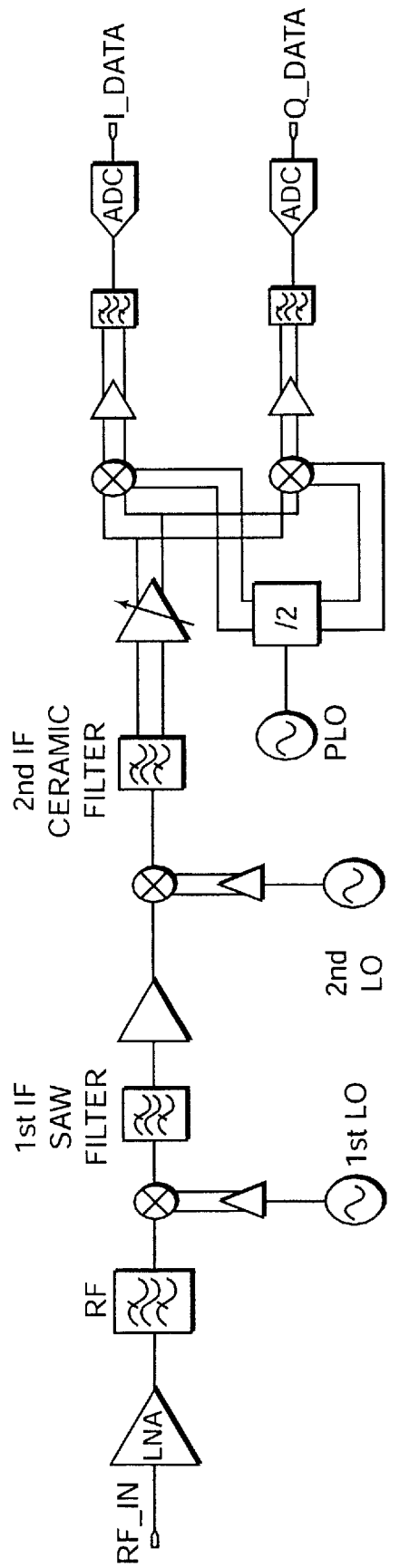
FIG. 1 is a schematic diagram illustrating a conventional superhetrodyne receiver architecture.
Figure 22:
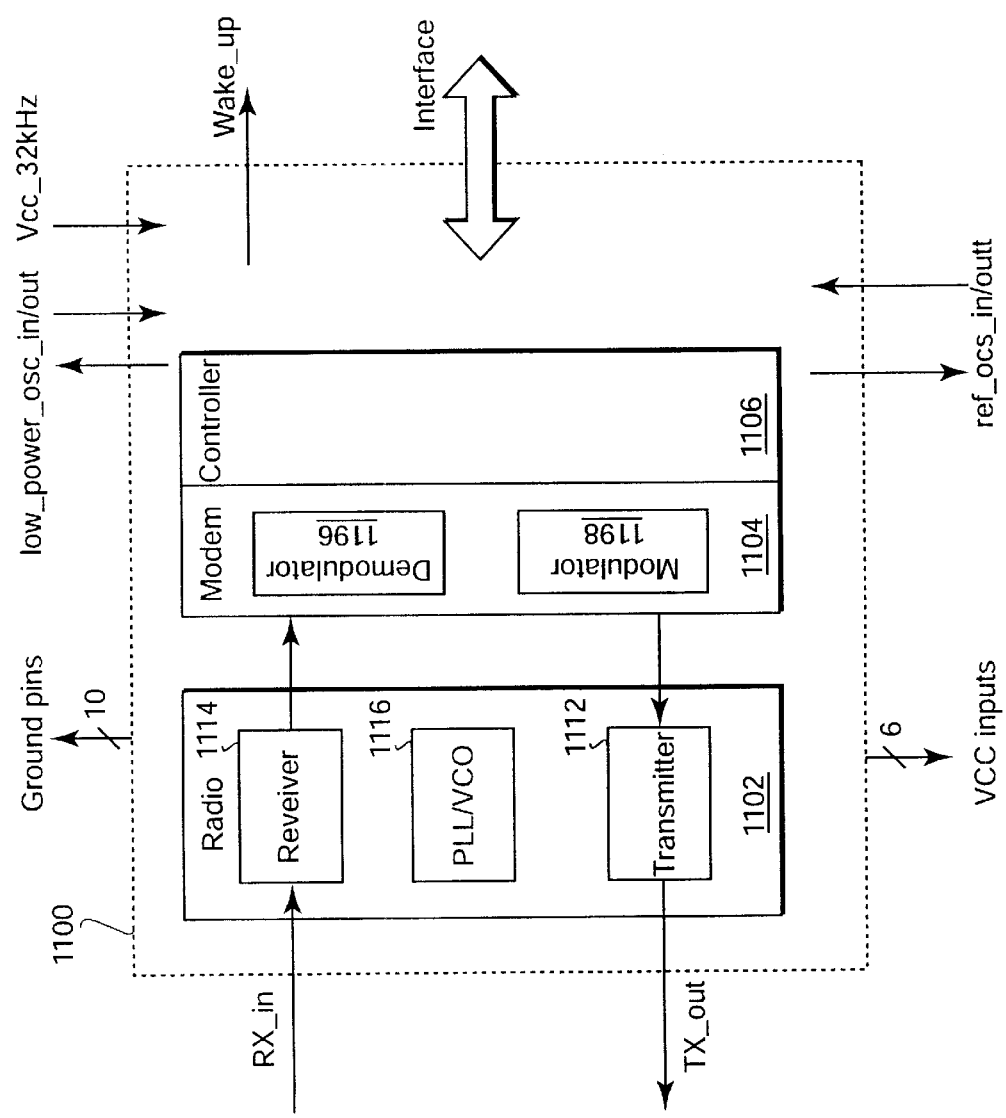
FIG. 22 is a block diagram illustrating the architecture for wireless communications shown in FIG. 14 in more detail.

The radio 1102 may be implemented in many different ways in accordance with the present invention. Referring to FIG. 22, the radio 1102 will generally include a transmitter 1112, a receiver 1114, and a UHF phase locked loop voltage controlled oscillator (PLL/VCO) 1116. By way of example, the transmitter 1112 and receiver 1114 may be implemented using superheterodyne techniques, such as is shown in FIG. 1. The receiver's IF may either be very high or very low in frequency. Alternatively, the transmitter 1112 and receiver 1114 may be implemented using direct conversion techniques, such as is shown in FIG. 2.

Figure 23:
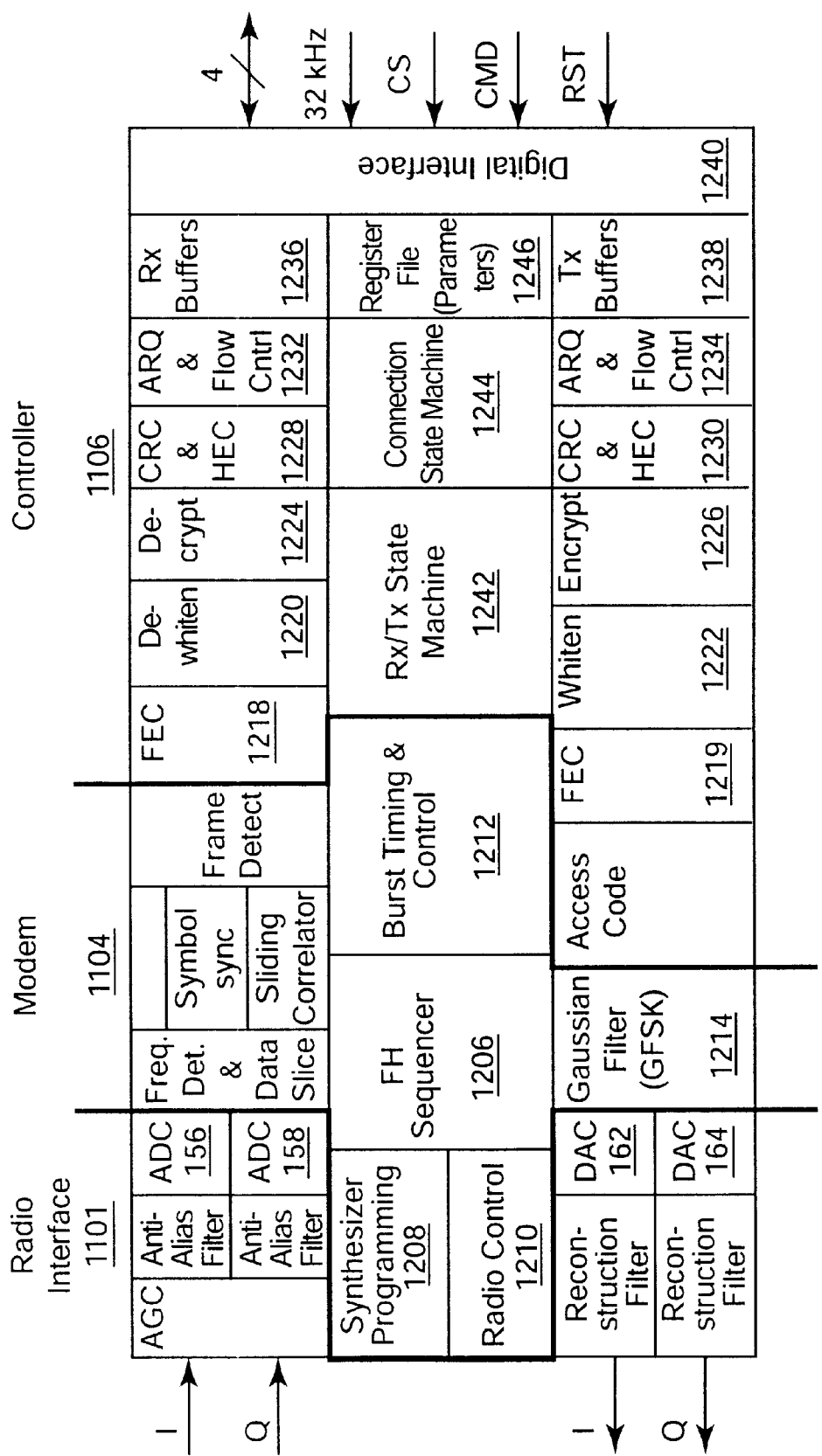
FIG. 23 is a block diagram illustrating a radio interface which may be used for the radio.

It is particularly advantageous to use the radio 200 and the digital processing stage 300 described above as the radio 1102 in the architecture 1100. This will provide a fully integrated, small size, low power, single chip solution. Alternatively, the radio 100 described above could be used as the radio 1102. FIG. 23 illustrates a radio interface 1101 for interfacing the radio 1102 to the modem 1104. The interface is set up for interfacing to the radio 100, i.e., all of the components shown in the radio interface 1101 are also shown as part of the radio 100, such as for example, the ADCs 156, 158 and DACs 162, 164.

By way of example, the transmitted signal may be GFSK modulated data that is amplified within the architecture 1100 to an output power of +3 dBm. Power control may also be implemented in the architecture 1100, for example, by providing 30 dB of power control range. This allows the overall power efficiency of the architecture 1100 to be maximized. The architecture 100 may be used with only one regulator. The 32 kHz low-power oscillator and associated circuitry may be powered separately from an external power source. This allows the architecture 1100 and the host controller/microprocessor 1110 to be put into a sleep state during extended periods of inactivity.

The Modem

Figure 24:
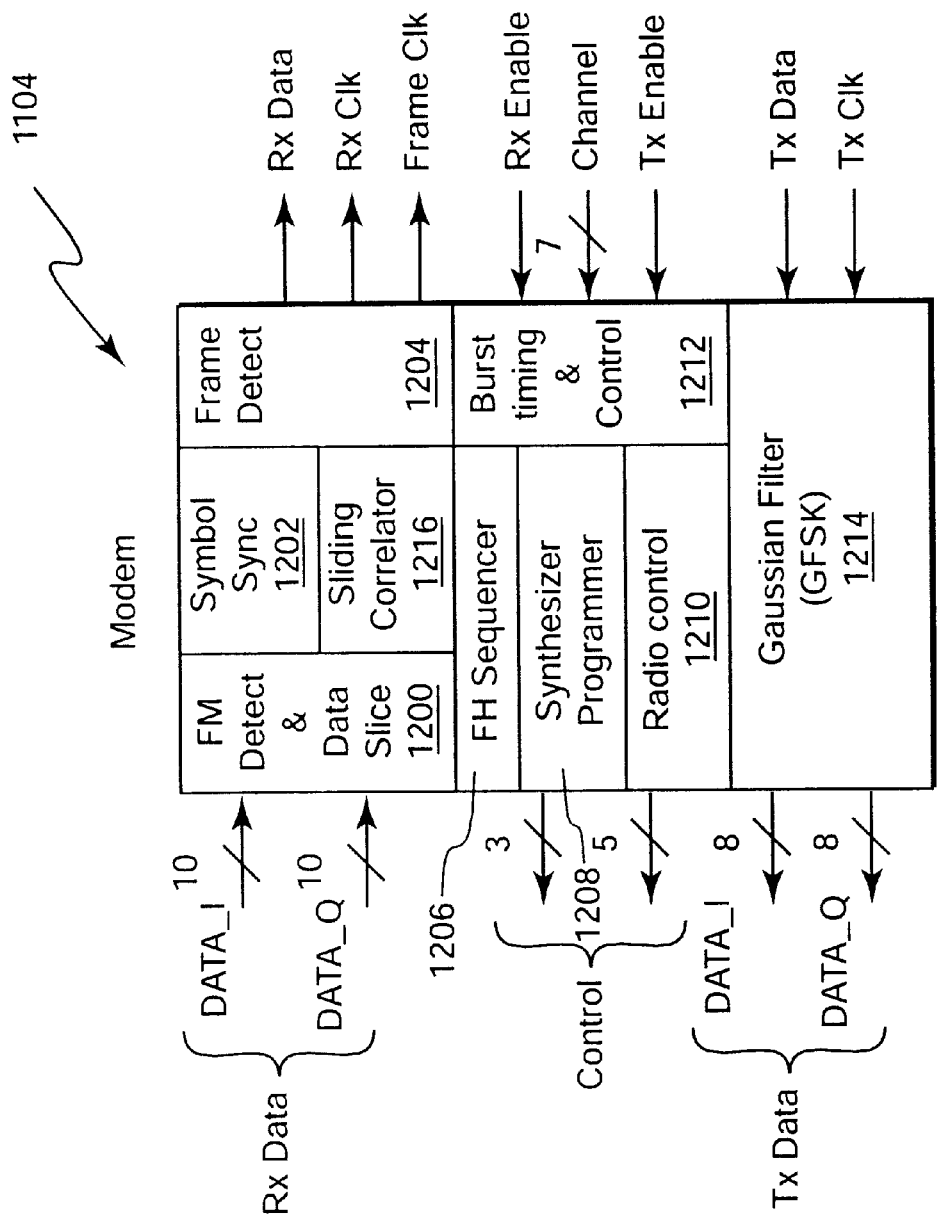
FIG. 24 is a block diagram illustrating the modem shown in FIG. 14 in more detail.

As shown in FIG. 22, the modem 1104 includes a demodulator 1196 for demodulating received data and a modulator 1198 for modulating data to be transmitted. The modem 1104 is capable of performing GFSK modulation and demodulation, frame timing recovery, and frequency hop control. FIG. 24 illustrates the modem 1104 in more detail.

The modem 1104 is partitioned into several blocks, which in turn, give rise to several advantages. The general functions of each of the blocks in the modem 1104 are as follows. The FM detect and data slice block 1200 receives the received data from the radio 1102 and performs the frequency to amplitude conversion and 1/0 bit decision functions. The symbol synchronization block 1202 performs the symbol timing recovery function. The frame detect block 1204 performs the frame header decision function and transfers the received data to the controller 1106. The frequency hopping (FH) sequencer block 1206 performs the frequency hop number generator function. The synthesizer programmer block 1208 programs the radio 1102 to the next frequency. The radio control block 1210 manages the various power modes. The burst timing and control block 1212 receives control information and generates clocks for burst events. The GFSK Modulator 1214 receives and maps TX data to the modulation waveform. Finally, the sliding correlator block 1216 identifies received packets that are addressed to its own unit and immediately discards received packets that are addressed to a different unit.

Figure 25:
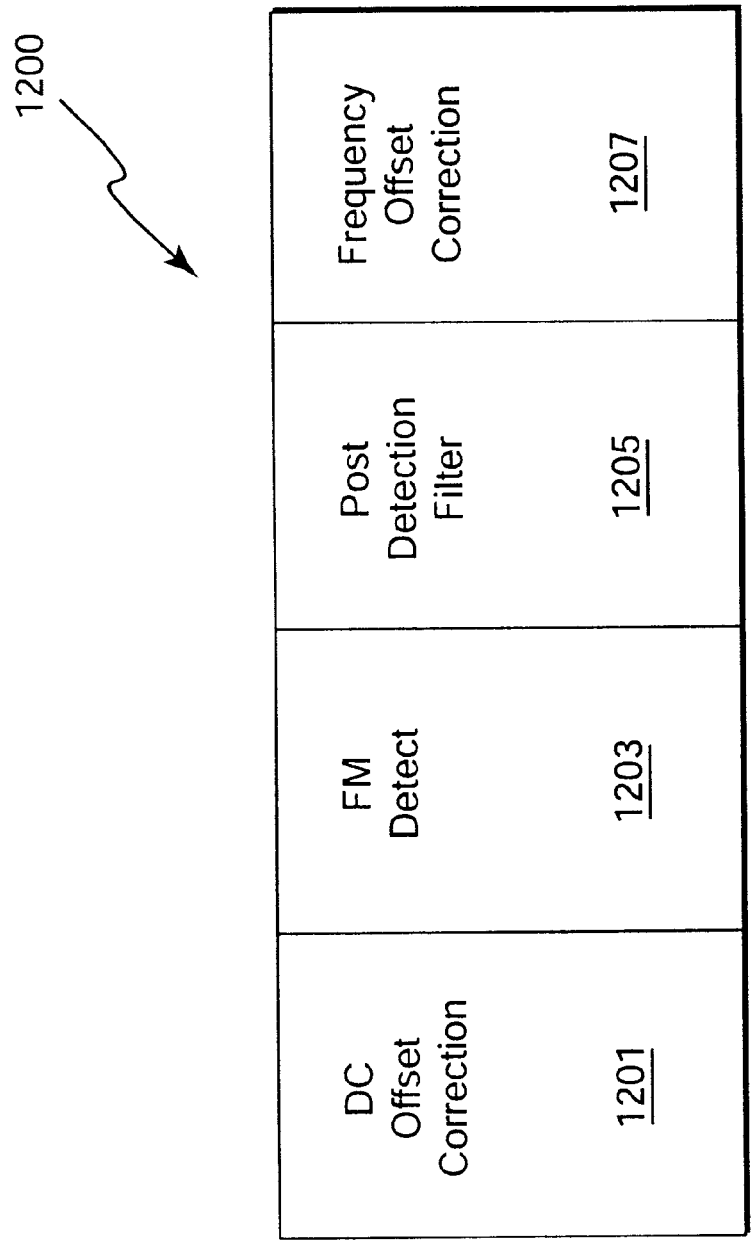
FIG. 25 is a block diagram illustrating the FM detect and data slice block shown in FIG. 24 in more detail.

FIG. 25 illustrates the FM detect and data slice block 1200 in further detail. Specifically, the FM detect and data slice block 1200 may include a DC offset correction stage 1201, an FM detect stage 1203, a post detection filter 1205, and a frequency offset correction stage 1207. The DC offset correction stage 1201 may comprise the DC offset cancellation stage 310 or the fine DC offset cancellation stage 360 described above.

As discussed above, the Bluetooth specification provides that spectrum spreading is accomplished by frequency hopping in 79 hops displaced by 1 MHz, starting at 2.402 GHz and stopping at 2.480 GHz. The maximum frequency hopping rate is 1600 hops/s, or 3200 hops/s for Inquiry or Page. Frequency hopping is used to mitigate the effect of high level interferers. For example, if the architecture 1100 is used to implement the Bluetooth system, the transceiver of the radio 1102 will change its transmit or receive frequency prior to each burst. In doing so the probability of an interferer causing problems in the reception of a signal is greatly reduced.

In order to implement the frequency hopping scheme, the data required to perform the frequency hopping will need to be programmed into the frequency synthesizer 1208 that generates the LO required in the radio, such as the radio 1102. In a conventional implementation of the Bluetooth system, this programming is performed by a microprocessor. The microprocessor runs at high speed, typically 10–20 MHz or higher if it is a PC. High speed devices generally require more current than slower devices. Because in this conventional scenario the microprocessor will be active to change the frequency of reception and transmission, a significant amount of current will be used by the microprocessor in implementing the frequency hopping.

In the present invention, on the other hand, the FH sequencer 1206 of the modem 1104 stores the data required to perform the frequency hopping in the system. Moreover, the programming of the frequency synthesizer that generates the LO required in the radio 1102 is performed in hardware that is driven from the pseudo-random sequence generated by the FH sequencer 1206. Thus, a pre-determined but pseudo random sequence of frequency hops is performed. The host processor need not be active to change the frequency of reception and transmission. This results in the overall current and power consumption being reduced.

The radio control block 1210 in the modem 1104 is also a feature of the present invention which helps to reduce the overall current and power consumption of a system using the architecture 1100. Specifically, during normal operation, various parts of the radio are switched on and off. This helps to reduce the overall current and power consumption. In a conventional implementation, this function will typically be performed by a microprocessor, or some special purpose hardware implemented on an ASIC containing the microprocessor. Again, the microprocessor is generally a current hungry device.

In the present invention, on the other hand, the radio control block 1210 manages the various power modes and performs the control sequence function of switching the various parts of the radio 1102 on and off. The controller 1106 will implement one or more state machines that can be programmed to step through the actions of turning on or off the functional blocks of the radio 1102 in the required sequence. For example, to bring up the radio 1102 from the off state, first the reference oscillator will be powered up a required time period in advance of a transmit or receive action. The oscillator requires time to turn on and stabilize in frequency and amplitude. Once this time has elapsed, the digital PLL function will be powered on providing the required reference sinusoid signals and clock signals for the radio 1102. The receiver or transmitter will then be powered on and any required calibration or stabilization actions performed before the time that radio operation is required. This relieves the host processor of this function, and by keeping the host processor turned off during such control sequences, the overall current is reduced resulting in low current operation. The radio control block 1210 participates in implementing the sequence of events described in FIG. 28.

In a conventional implementation of the Bluetooth system, received packets that are addressed for a different unit are typically passed all the way to the processor where they are then discarded. In the present invention, on the other hand, the sliding correlator block 1216 in the modem 1104 identifies packets with the correct access word. Packets that have a different access word are immediately discarded by the sliding correlator block 1216 and not passed on to the processor. In a piconet, all packets have the same access word but are addressed via the Active Member address. The controller 1106 will check the address and only pass on packets addressed to the local unit or any broadcast packets which are intended for all units in the piconet. This way, no further intervention by either the controller or the host microprocessor is required for received packets that are addressed to a different unit. Again, this helps to conserve the resources of the host processor which lowers the power requirements of the system utilizing the architecture 1100.

The Controller

Figure 26:
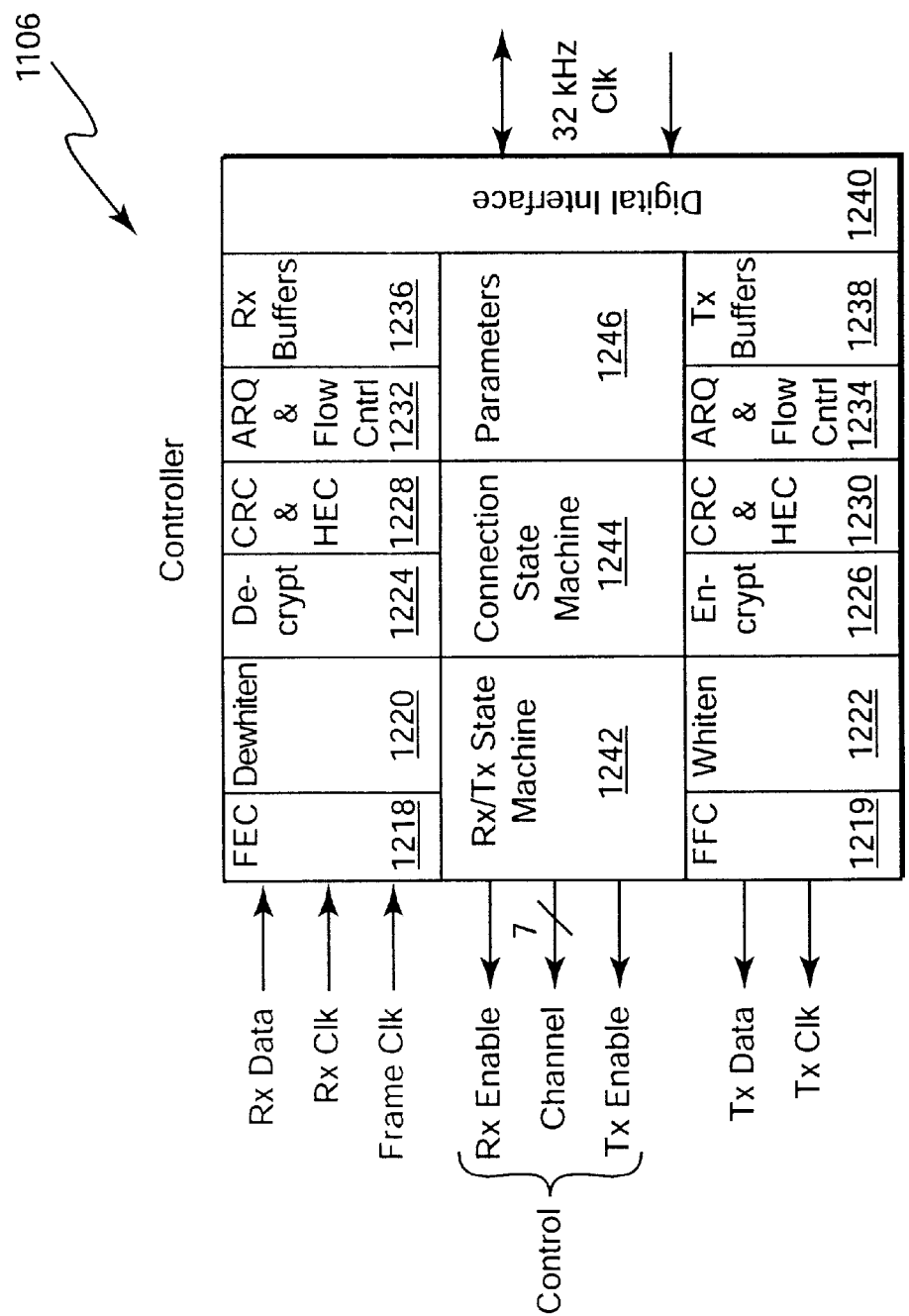
FIG. 26 is a block diagram illustrating the controller shown in FIG. 14 in more detail.

FIG. 26 illustrates the controller 1106 in more detail. In the scenario where the architecture 1100 is used to implement the Bluetooth system, the controller module 1106 is capable of performing all of the functions of the Bluetooth baseband protocol layer, including connection management. The controller 1106 takes care of the forward error correction, error detection (i.e. CRC calculations), payload extraction, ARQ (Automatic Repeat Request) and flow control, along with general control functions.

Similar to the modem 1104, the controller 1106 is partitioned into several blocks, which in turn, give rise to several advantages. The general functions of each of the blocks in the controller 1106 are as follows. The forward error correction (FEC) blocks 1218, 1219 receive the receive data Rx from the modem 1104 and transmit the transmit data Tx to the modem 1104, respectively. The dewhiten block 1220 unscrambles the received data Rx, and the whiten block 1222 scrambles data to be transmitted Tx. The decryption block 1224 removes encryption from the received data Rx, and the encryption block 1226 applies encryption to the data to be transmitted Tx. The CRC and HEC blocks 1228, 1230 perform cyclic redundancy check and header error correction in the received and transmitted data, respectively. The ARQ and flow control blocks 1232, 1234 generate the automatic repeat request (ARQ) and regulate the throughput in the received and transmitted data, respectively. The RX buffers 1236 provide storage for the received packets, and the TX buffers 1238 provide storage for packets to be transmitted. The digital interface 1240 is used to exchange commands and data with the host 1110. The RX/TX state machine 1242 controls intra-packet events, and the connection state machine 244 controls inter-packet events. The parameters block 1246 provides configuration parameter storage.

Figure 27A:
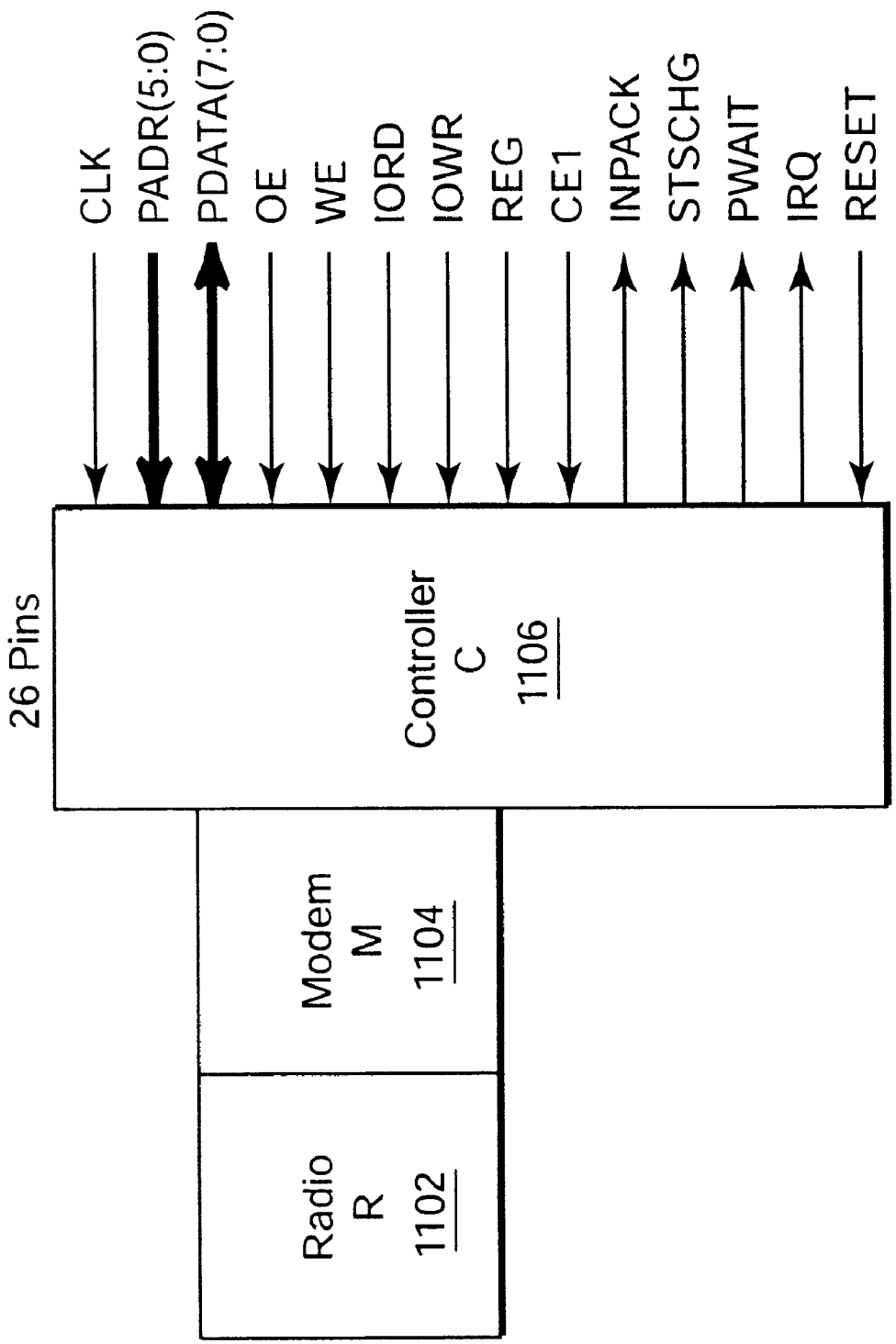
FIGS. 27A, 27B and 27C are block diagrams illustrating three different types of interfaces that can be used on the controller shown in FIG. 26.
Figure 27B:
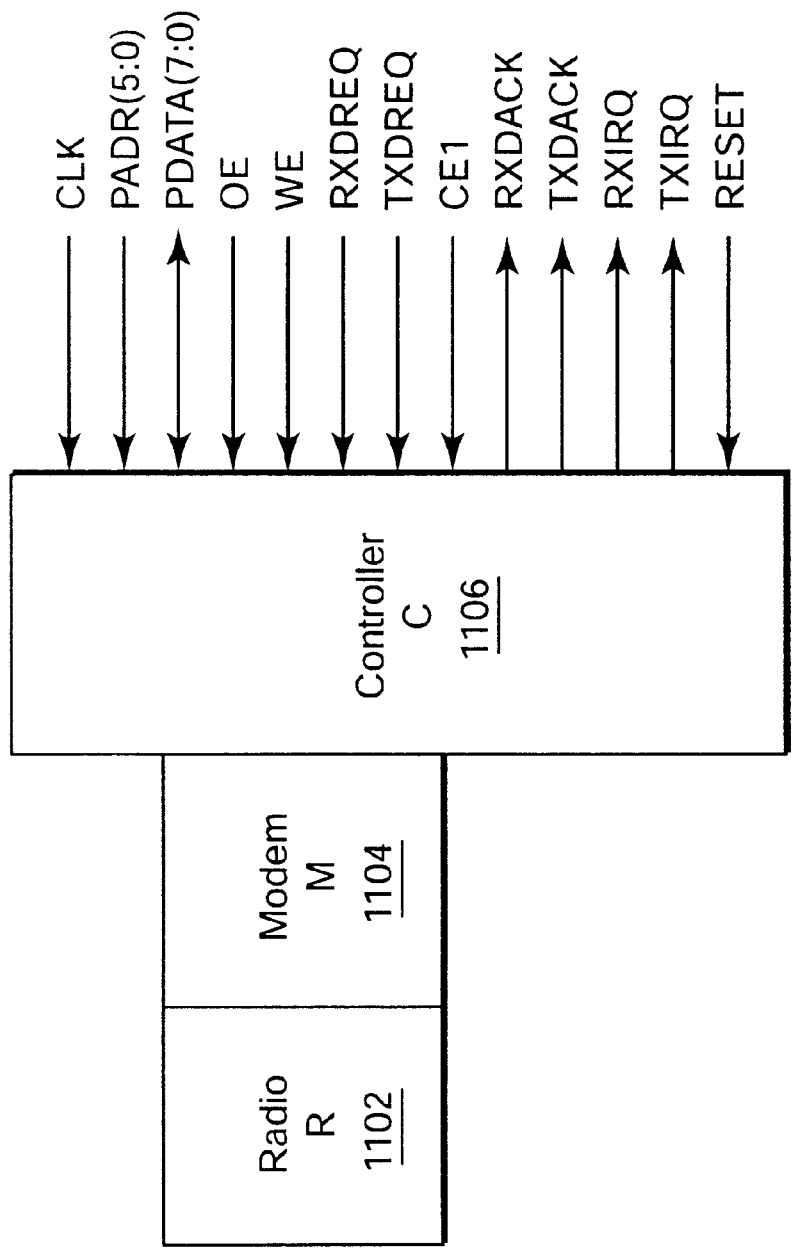
Figure 27C:
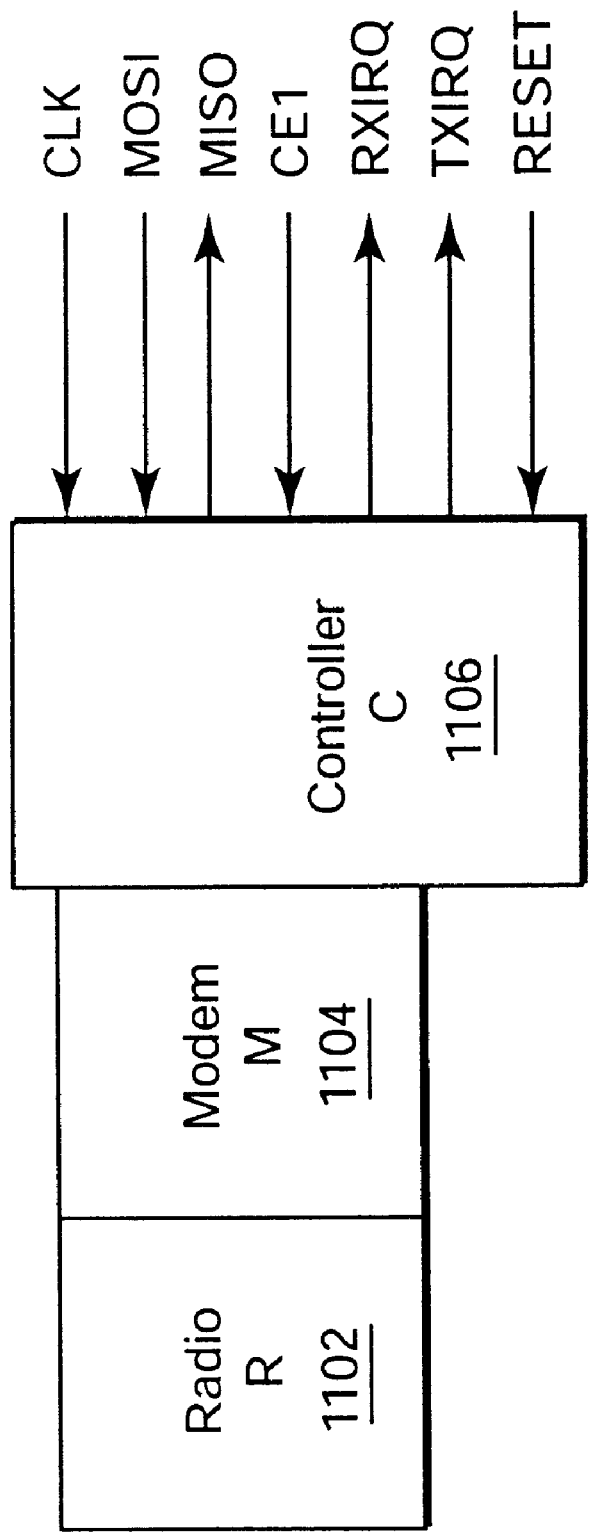

As discussed above, the digital interface 1240 may include three different types of interfaces. Specifically, the digital interface 1240 may be a PC-Card (CompactFlash or 8-bit PCMCIA) interface as shown in FIG. 27A, a parallel/DMA interface as shown in FIG. 27B, or a serial interface as shown in FIG. 27C. If the interface 1240 is a serial interface, it is preferably a 4-pin slave synchronous serial interface. It should be understood, however, that the serial port may include fewer or more than 4-bits and may comprise other types of serial ports in accordance with the present invention. If the interface 1240 is a parallel/DMA interface, it is preferably an 8-bit parallel/DMA interface. It should be understood that the digital interface 1240 may include one or more of the PC-Card, parallel/DMA and serial interfaces. In the scenario where the architecture 1100 includes all three types of interfaces, it will have many different interface options.

The ability to interface with external processors via a serial port as the digital interface 1240 has at least two important advantages. First, there is a current savings due to the host 1110 not having to process any control or error checking functionality. Second, the amount of interference from high-speed digital lines is minimized. This second advantage is important in radio design where high-speed digital lines can interfere with the very low-level analog signals that appear at the antenna port of the radio 1102. This second advantage is also one factor that facilitates integration of the radio 1102, the modem 1104 and the controller 1106 onto a single IC chip. The reason is that the amount of high speed interfering I/O is minimized and the amount of high speed, high current digital lines is also minimized. Again, however, it should be understood that integration of the architecture onto a single IC chip is not a requirement of the present invention.

The RX/TX state machine 1242 performs radio state control and the selection and sequencing of processing actions through FEC, dewhiten, etc. This is a pre-determined sequence of on-off control of the blocks that make up the radio 1102 and data processing 1218–1238, depending on which top-level state is required and what packet type is being processed. In the scenario where the architecture 1100 is used to implement the Bluetooth system, the controller 1106 performs the steps of Inquiry, Inquiry-Scan, Paging, Page-Scan, connection establishment and the power saving active routines of Sniff and Park modes described in the Bluetooth specification. These functions are performed by first generating the required bursts and then monitoring for bursts that should be received in response to those sent. Rapid handshaking is performed for these operations. With the architecture 1100, the handshaking can be performed without involvement from the BC or host processor. This means that the processor does not need to get involved when the radio 1102 needs to go from one state to another. This saves current and power because the host processor need not be interrupted to process any control function.

Figure 28:
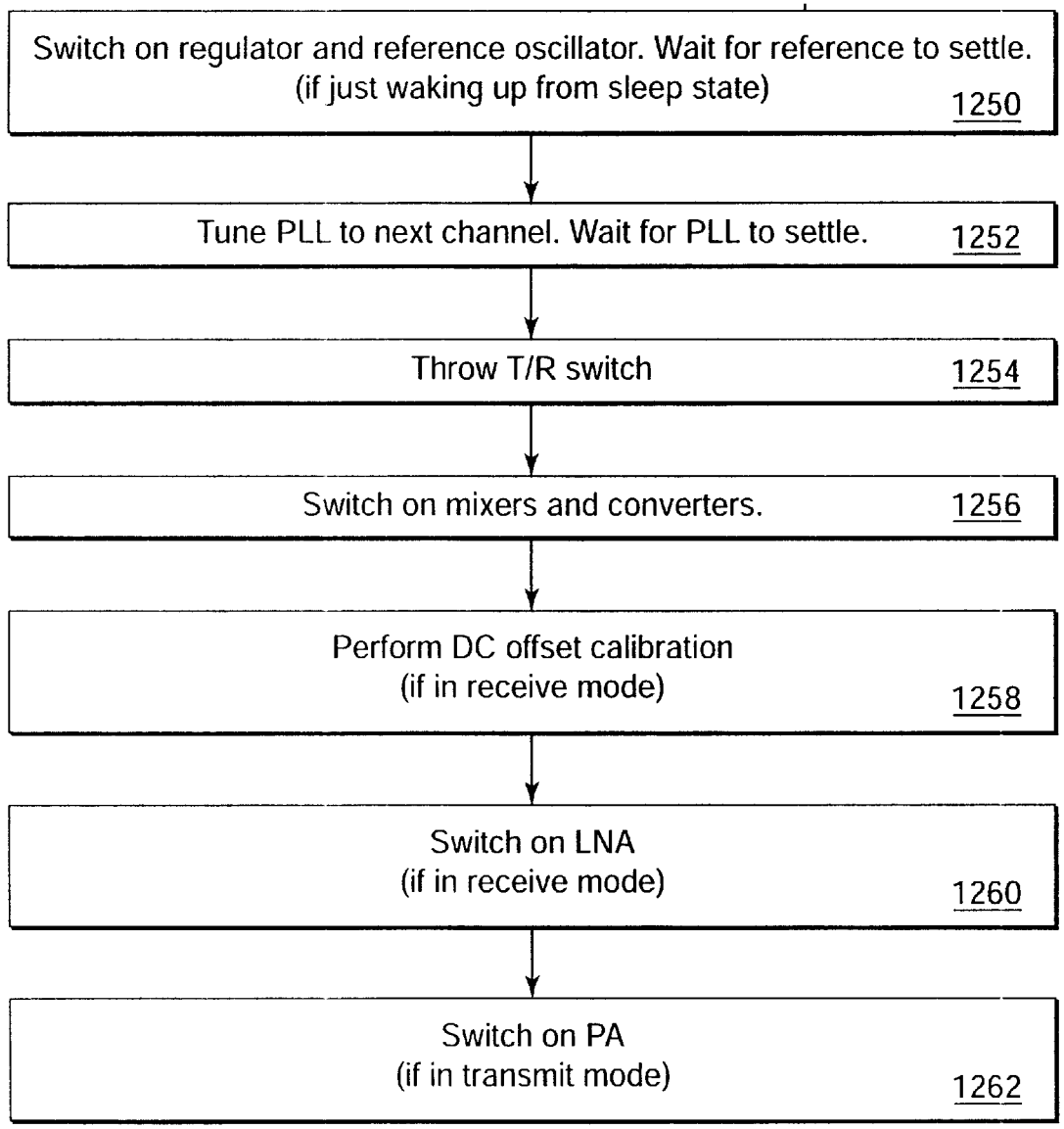
FIG. 28 is a flow diagram illustrating the operation of the controller shown in FIG. 26.

Referring to FIG. 28, there is a flow diagram illustrating the operation of the Rx/Tx state machine 1242. In describing the operation of the Rx/Tx state machine 1242, it will be assumed that the radio 1102 comprises the direct conversion receiver 1114 and transmitter 1112 described above, but it should be understood that the radio 1102 may be implemented with many different types of radios. In step 1250, the regulator and the reference oscillator 1138 are switched on. The state machine 1242 then waits for the reference oscillator 1138 to settle. In step 1252, the PLL 1140 is tuned to the next channel and allowed to settle. The transmit/receive switch 1124 is switched to the appropriate position in step 1254, and the mixers 1132, 1134 and converters are switched on in step 1256. If the radio 1102 is in the receive mode, the DC offset calibration is performed in step 1258 and the LNA 1126 is switched on in step 1260. If the radio 1102 is in the transmit mode, the power amplifier (PA) 1176 is switched on in step 1262 which generates the transmit power to the antenna.

Referring to FIGS. 29A through 29H, there are flow diagrams illustrating the operation of the connection state machine (CSM) 1244. The CSM 1244 accepts commands from the external host 1110. These commands may be: page scan sequence, page sequence, inquiry scan sequence, inquiry sequence, active sequence, sniff sequence, hold sequence, and park sequence. The CSM 1244 responds to each command, with the exception of the hold sequence, by initiating a sequence of states and substates. The hold sequence will probably not be included in a preferred embodiment of the CSM 1244, but may be included in other embodiments. These states and substates are defined in the Bluetooth specification, version 0.7. In general, when a device is unconnected it is in standby mode. The connection procedure is initiated by any of the devices which then becomes master. The connecting states are PAGE and INQUIRY. A connection is made by a PAGE message if the address is already known, or by an INQUIRY message followed by a subsequent PAGE message if the address is unknown. The active states are the connected state and the transmit data state. In addition, low power modes are available for connected units. The low power modes are PARK, HOLD, and SNIFF.

Figure 29A:
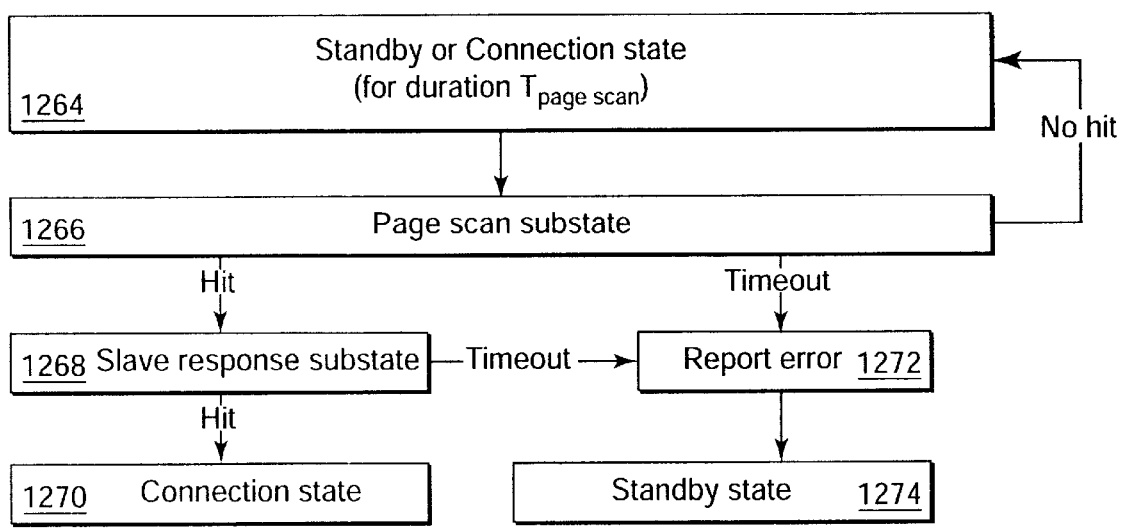
FIGS. 29A, 29B, 29C, 29D, 29E, 29F, 29G and 29H are flow diagrams illustrating the operation of the controller shown in FIG. 26.

FIG. 29A illustrates the page scan sequence. The CSM 1244 begins in the standby or connection state 1264 (for duration $T_{page\ scan}$). The PAGE SCAN substate is initiated in state 1266 by the device which then becomes the master. If there is a hit from a slave, the slave response substate 1268 is entered. If there is no hit, the standby or connection state 1264 is reentered. Once in state 1268, if the slave responds before a timeout period, then the connected state 1270 is entered. If the timeout period expires, however, an error is reported in state 1272 and the standby state 1274 is entered.

Figure 29B:
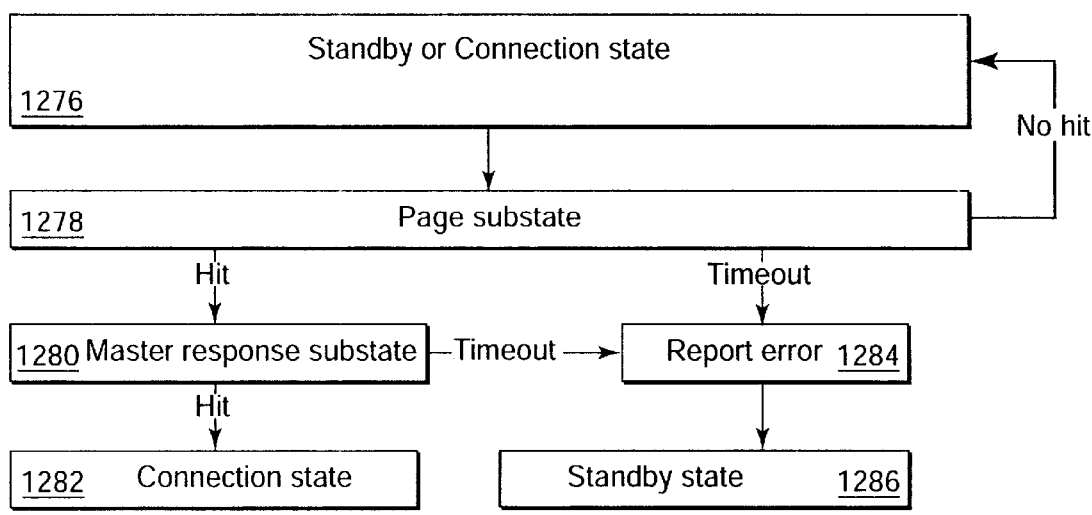

FIG. 29B illustrates the page sequence. The CSM 1244 begins in the standby or connection state 1276 (for duration $T_{page\ scan}$). The PAGE substate is initiated in state 1278. If there is a hit, the master response substate 1280 is entered. If there is no hit, the standby or connection state 1276 is reentered. Once in state 1280, if the master responds before a timeout period, then the connected state 1282 is entered. If the timeout period expires, however, an error is reported in state 1284 and the standby state 1286 is entered.

Figure 29C:
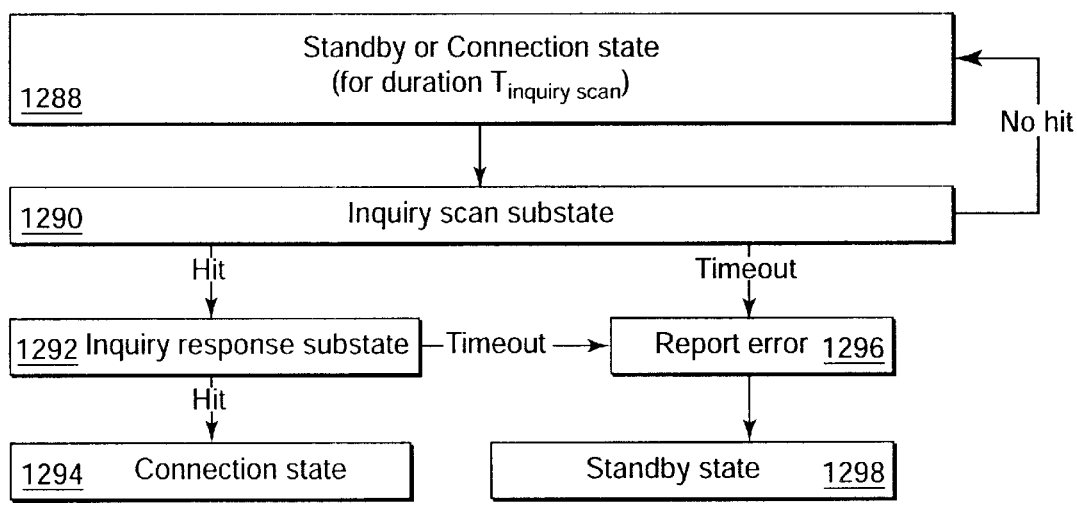

FIG. 29C illustrates the inquiry scan sequence. The CSM 1244 begins in the standby or connection state 1288 (for duration T inquiry scan). The INQUIRY SCAN substate is initiated in state 1290. If there is a hit, the Inquiry response substate 1292 is entered. If there is no hit, the standby or connection state 1288 is reentered. Once in state 1292, if the slave responds before a timeout period, then the connected state 1294 is entered. If the timeout period expires, however, an error is reported in state 1296 and the standby state 1298 is entered.

Figure 29D:
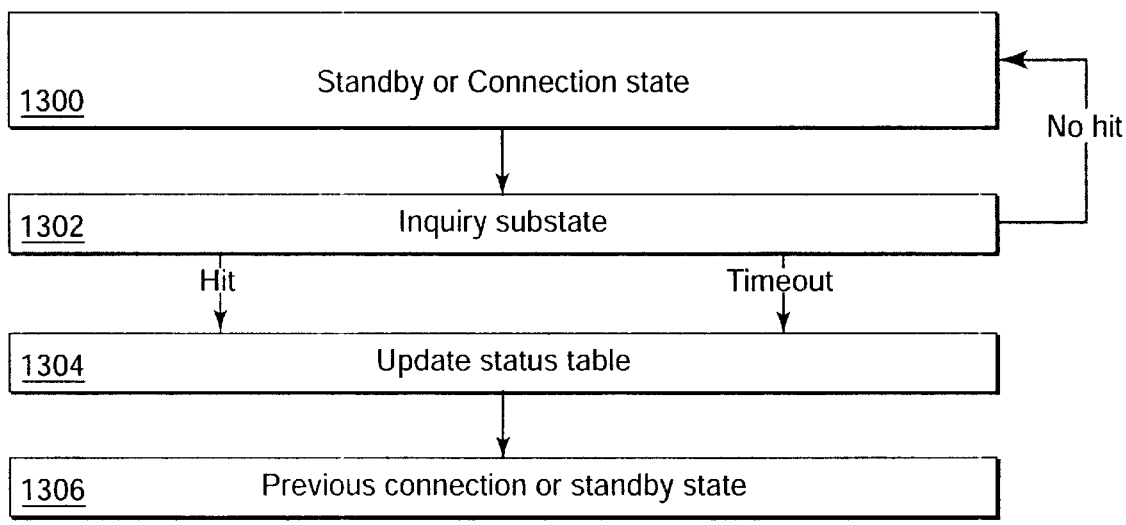

FIG. 29D illustrates the inquiry sequence. The CSM 1244 begins in the standby or connection state 1300. The INQUIRY substate is initiated in state 1302. If there is a hit, or a timeout, the status table is updated in state 1304 and the previous connection or standby state is entered in state 1306. If there is no hit, the standby or connection state 1300 is reentered.

Figure 29E:
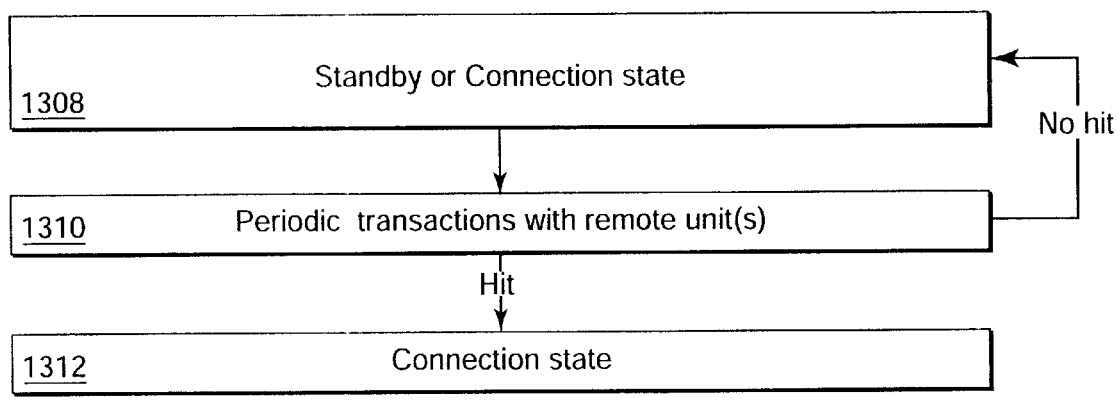

FIG. 29E illustrates the active sequence. The CSM 1244 begins in the standby or connection state 1308. If there are periodic transactions with remote units in state 1310, then the connection state 1312 is entered. If not, the standby or connection state 1308 is reentered.

Figure 29F:
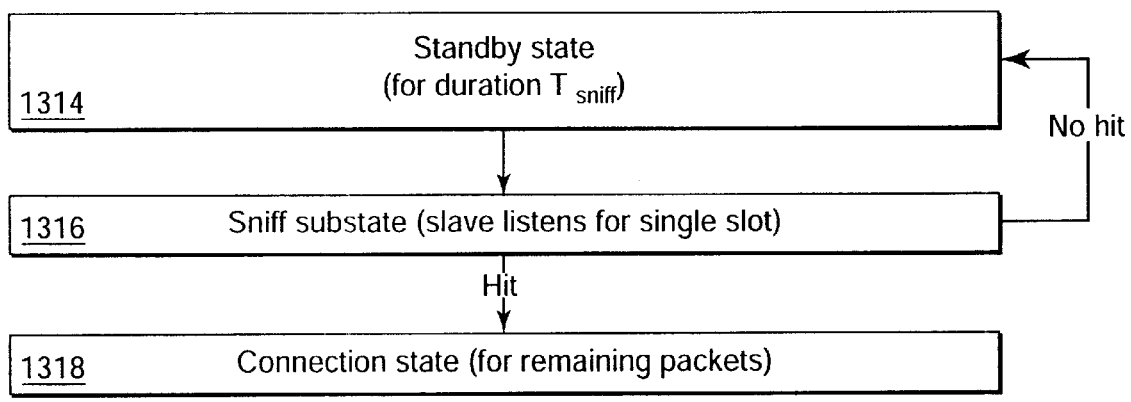

FIG. 29F illustrates the sniff sequence. The CSM 1244 begins in the standby state 1314. The SNIFF substate is entered in state 1316. If there is a hit, the connection state is entered in state 1318 for the remaining packets. If not, the standby or connection state 1314 is reentered.

Figure 29G:
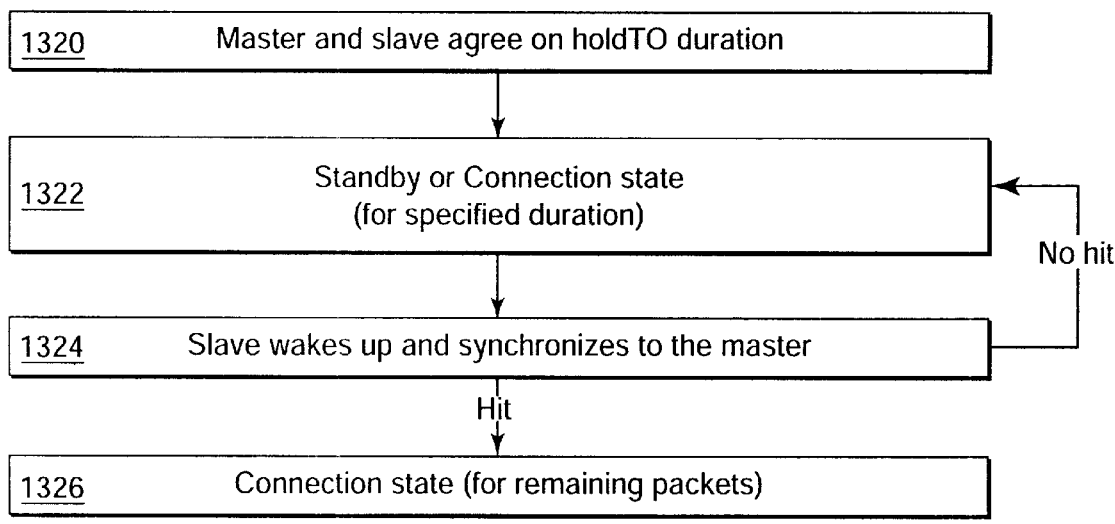

FIG. 29G illustrates the hold sequence, which as mentioned above, will probably not be included in a preferred embodiment of the architecture 1100, but may be included in other embodiments. First, the master and slave agree to hold in state 1320. The standby or connection state 1322 is then entered for the specified duration, followed by the slave waking up and synchronizing to the master in state 1324. If there is a hit, the connection state is entered for the remaining packets in state 1326. If not, the standby or connection state 1322 is reentered.

Figure 29H:
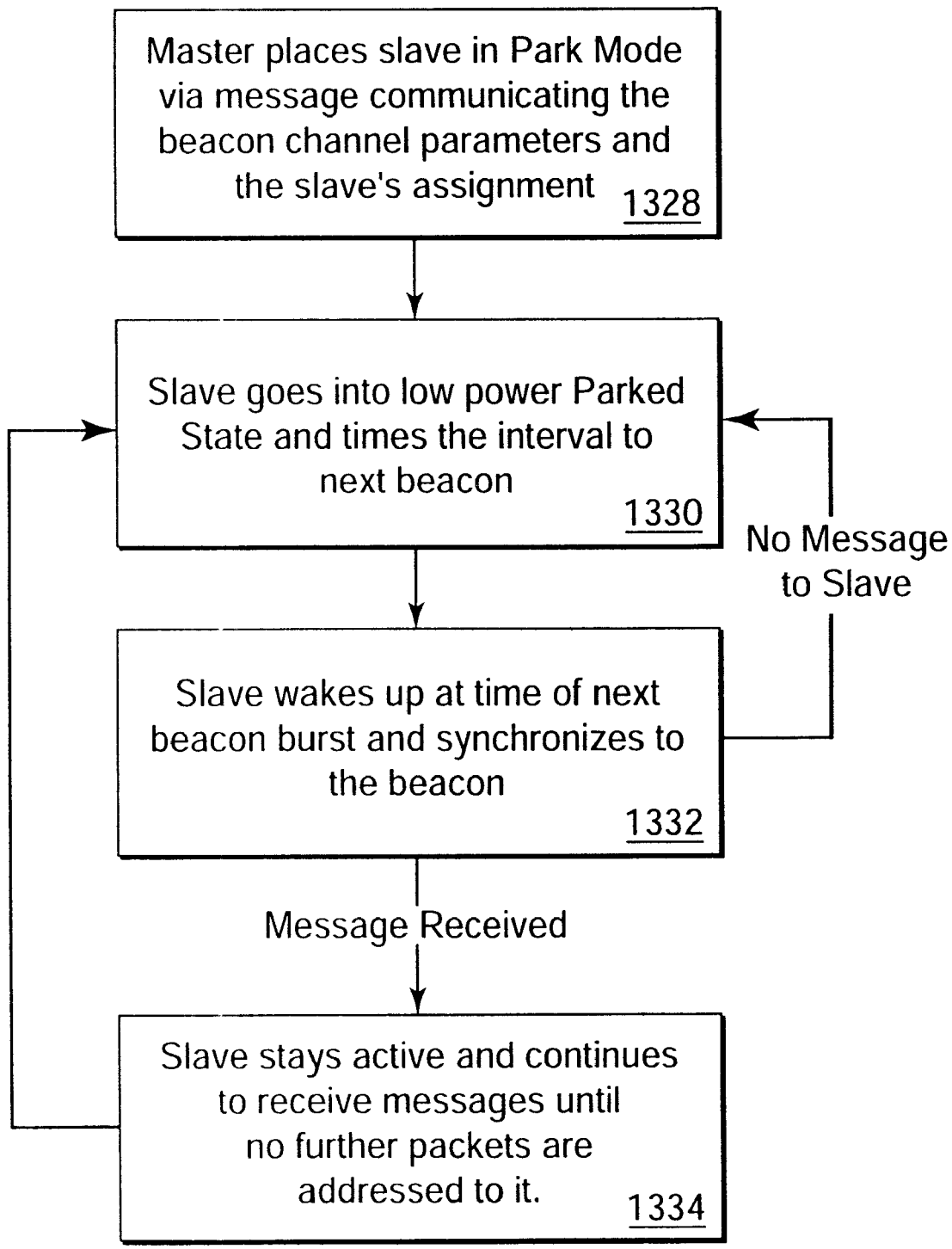

FIG. 29H illustrates the park sequence. First, the master establishes a beacon channel in state 1328 by placing the slave in Park Mode via a message communicating the beacon channel parameters and the salve's assignment. In step 1330 the slave goes into low power Parked State and times the interval to the next beacon. The slave wakes up at the time of the next beacon burst and synchronizes to the beacon in step 1332. If there is a message received, the slave stays active and continues to receive messages until no further packets are addressed to it in step 1334, and then it returns to step 1330. If there are no messages to the slave, it returns to step 1330.

The parameters block 1246 provides configuration parameter storage. Specifically, it stores basic parameters that can be set for the radio 1102. For example, these parameters could be capability, system options, etc. This block is semi-programmable in that at power up the host 1110 writes this information to the controller 1106. This provides flexibility as well as providing low current because the host 1110 only has to provide this information to the architecture one time.

In a conventional implementation of the Bluetooth system, error detection and address matching is performed in a baseband IC. This means that all received data, good and bad, is passed from the radio to the baseband IC where error correction is performed. In the present invention, on the other hand, error correction is performed in the CRC and HEC block 1228. This means that only good data is ever sent to the baseband IC because bad data is eliminated in the controller 1106. This results in the advantage that this other IC need only be powered up or interrupted if the received data is of sufficiently good quality.

All bursts that are received are screened by examining the address in the burst. This is to ensure that only data addressed for the particular Bluetooth unit are passed to the baseband IC. Although the sliding correlator 1216 in the modem 1104 filters out many of the unwanted bursts, it nevertheless lets through all bursts in the piconet.

The ARQ and flow control blocks 1232, 1234 generate the automatic repeat request and regulate the throughput in the received and transmitted data, respectively. Specifically, in the Bluetooth specification ARQ is used in the system as a method of handshaking between different peers. A response to an ARQ is required in the next burst opportunity. This means that fast processing is required if the ARQ is to be processed in one frame, i.e. an ARQ is received and a response is required in the subsequent transmit slot. In a conventional implementation of the Bluetooth system, this processing will typically be performed in a processor which will require a fast clock speed. Fast processing equates to high current consumption. In the present invention, on the other hand, the ARQ is implemented in the controller 1106 rather than in the host 1110, which in turn, reduces current.

The RX buffers 1236 provide storage for the received packets. By storing received packets in the controller 1106, this allows the processing performed by the baseband controller 1109 or host 1110 processor to be performed at different times from the reception of low-level analog signals by the radio 1102. This scheme reduces interference between the radio 1102 and the host 1110.

Figure 30A:
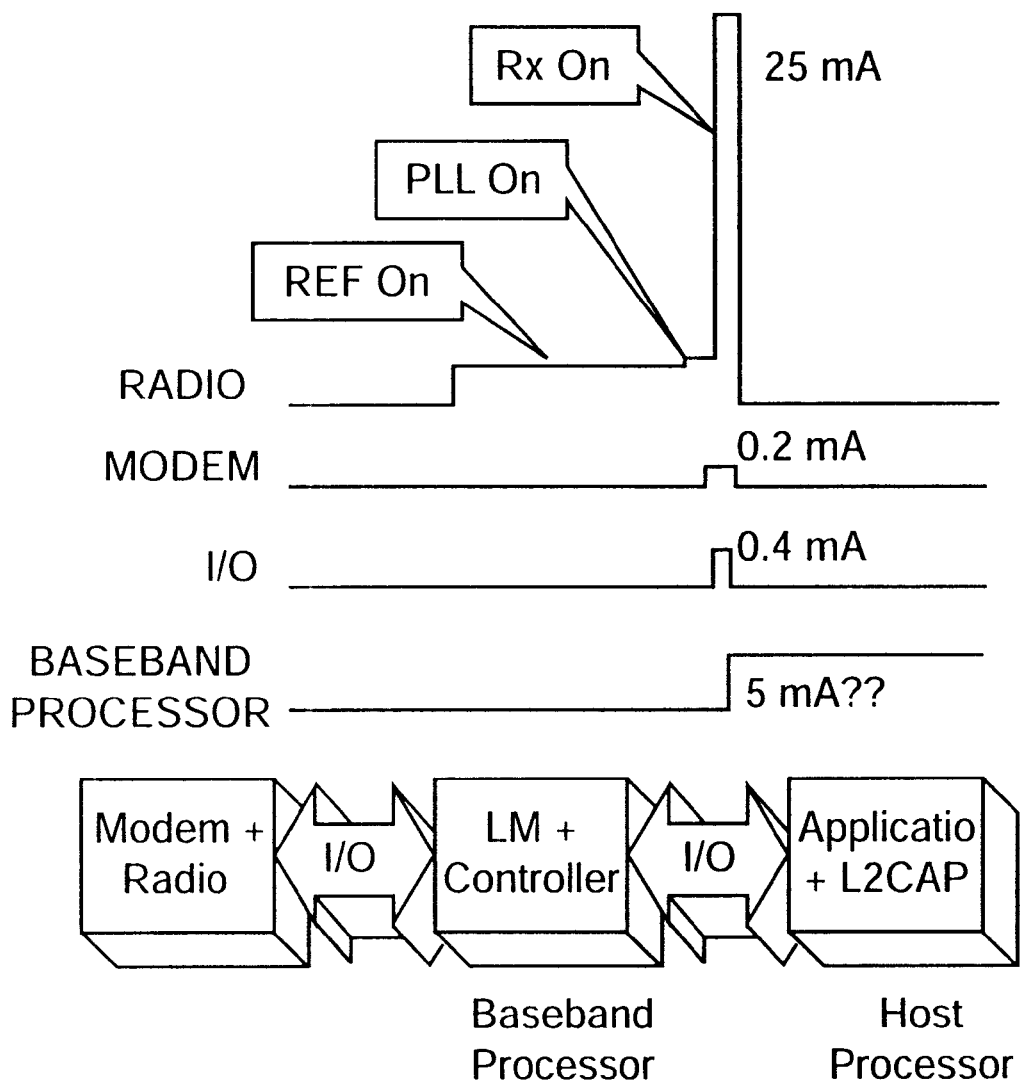
FIGS. 30A and 30B are timing diagrams illustrating advantages of the use of the architecture for wireless communications shown in FIG. 14.
Figure 30B:
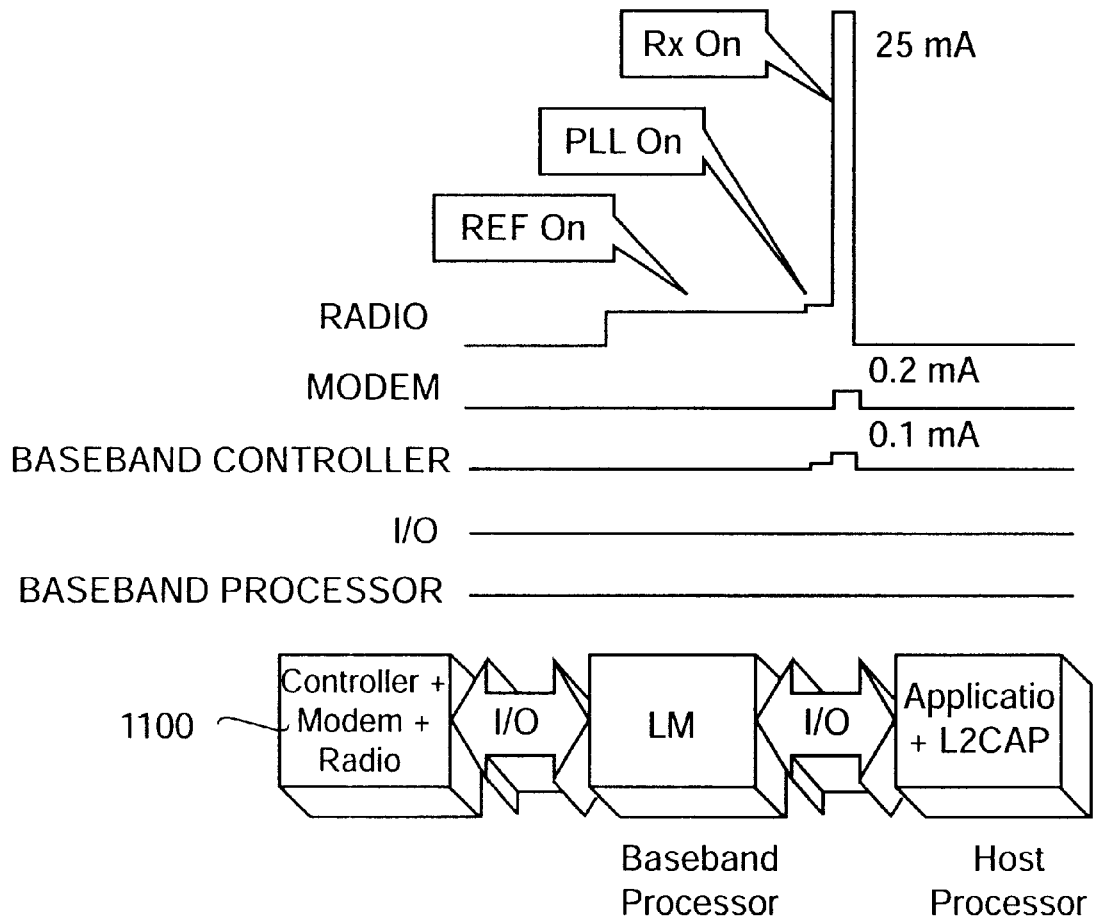

FIG. 30A illustrates a timing diagram for an implementation of the Bluetooth system that does not use the architecture 1100 of the present invention. The diagram shows current versus time for the example of a parked slave receiving a beacon. In the scenario shown in FIG. 30A, the controller is located in the baseband processor which increases the total system current, for example, by 5 mA as shown. FIG. 30B, on the other hand, illustrates the same situation, except that the architecture 1100 of the present invention is used. As can be seen, the I/O current and the baseband current are minimized. Therefore, the architecture 1100 can help reduce interference and current consumption in the system.

The controller 1106 performs many of the functions that would otherwise be performed by an external processor. For example, in the scenario where the architecture 1100 is used to implement the Bluetooth system, most of the Baseband and some of the Link Manager functionality of the Bluetooth specification is implemented in the architecture 1100. This has the advantage that the interface between the architecture 1100 and the external processor can be minimized. For example, the digital interface 1240 may be a serial port, providing minimal I/O.

Figure 31:
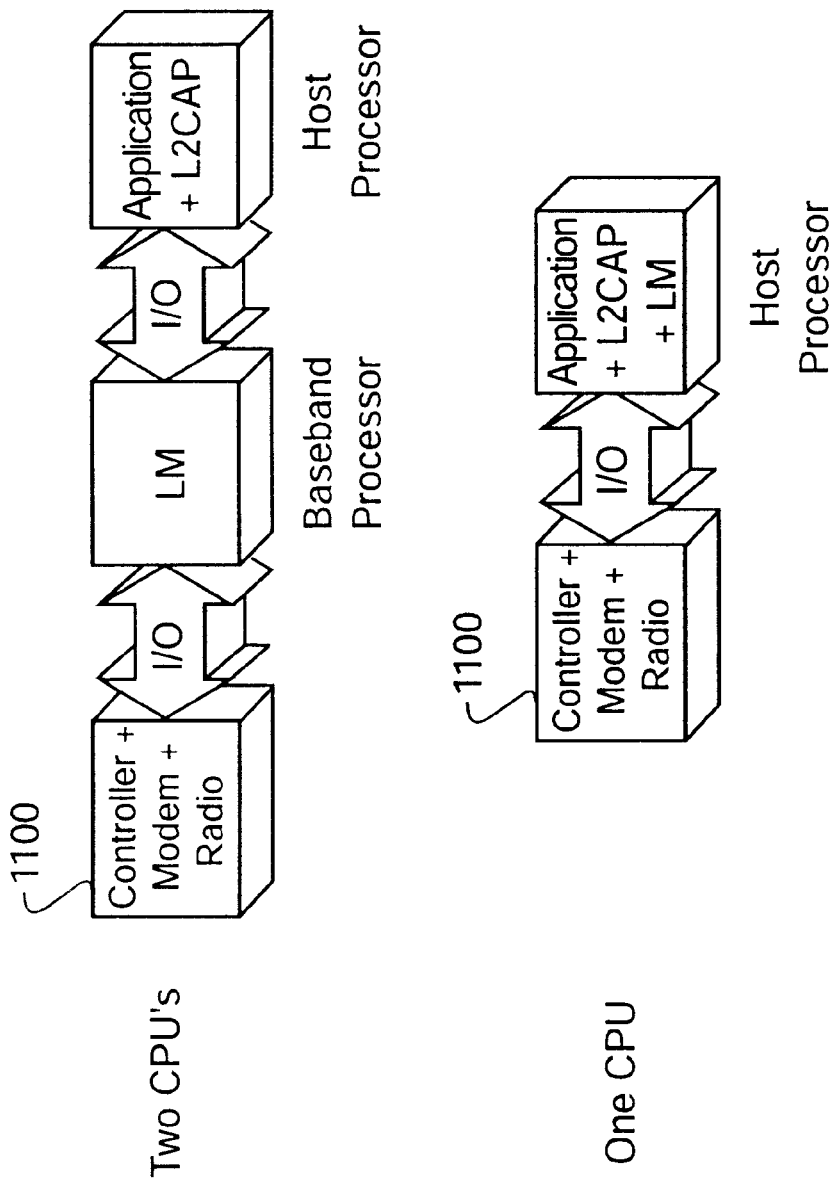
FIG. 31 is a block diagram illustrating alternative applications of the architecture for wireless communications shown in FIG. 14.

Because the architecture 1100 includes all of the important radio specific hardware and all the Bluetooth specific functions typically implemented in hardware, the architecture 1100 can readily interface to multiple existing processors and product arrangements, as shown in FIG. 31 which illustrates two possible configurations. In a conventional implementation of the Bluetooth system, the Bluetooth specific hardware would typically be integrated into the adjacent processor. This has the disadvantage that the adjacent processor will only interface to a specific radio and when the processor has to be changed to better match the requirements of new types of applications, an ASIC development must be done to incorporate the Bluetooth specific hardware. Typically, in this scenario the modem and the controller are specific to a system. IC manufacturers customize the modem and controller part for a particular system.

Figure 32:
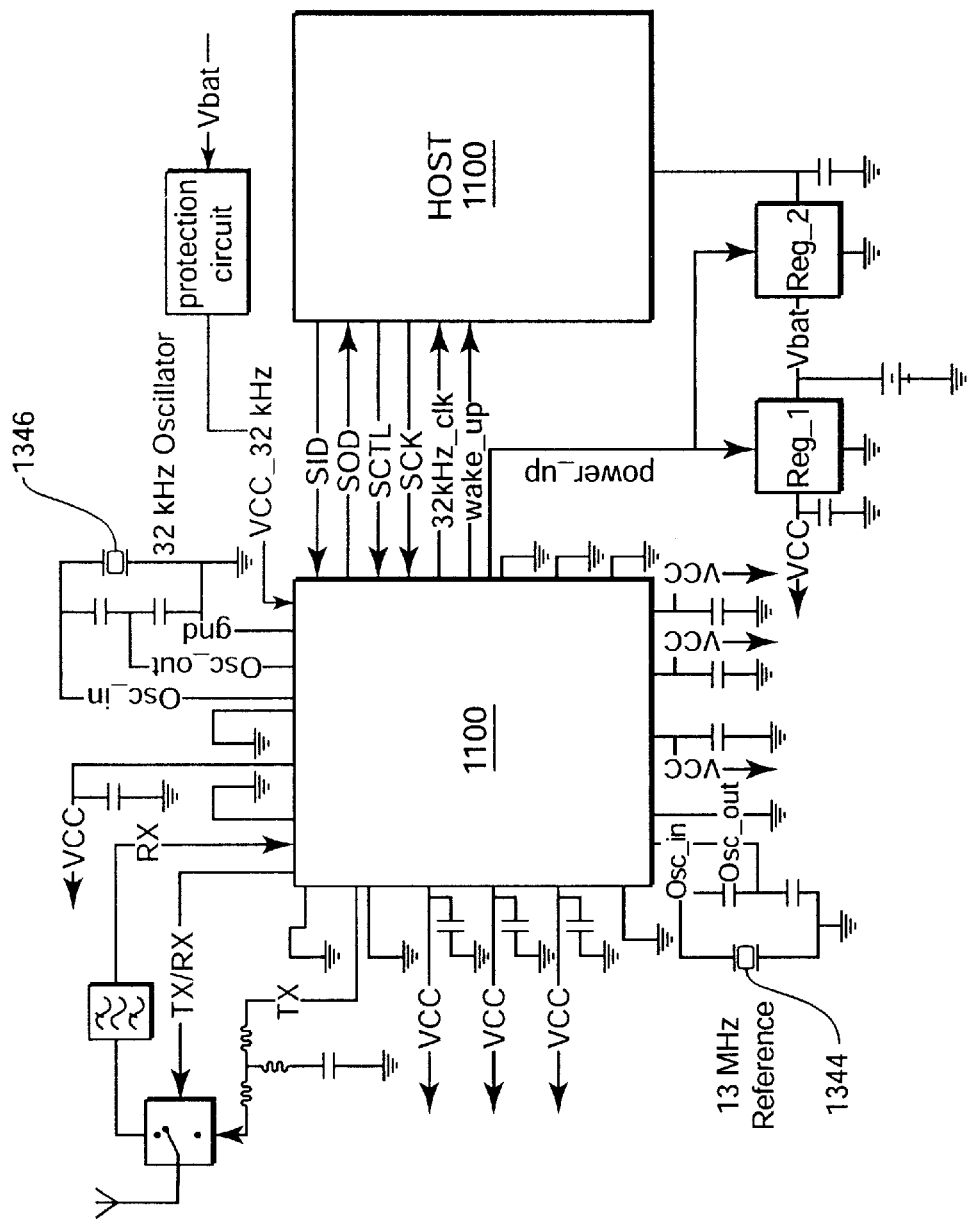
FIG. 32 is a schematic diagram illustrating an application of the architecture for wireless communications shown in FIG. 14.

FIG. 32 illustrates the use of the architecture 1100 in a typical Bluetooth application. Many of the external components for the architecture 1100 are shown. However, the full requirements of the host processor 1110 are not shown because this is application specific. The host processor 1110 could be replaced by a dedicated micro-controller specifically designed to control the architecture 1100, but this is optional. The main system clock reference 1344 may be, for example, 32 MHz or 13 MHz. This supplies a number of functions on the radio as well as the modem controller and baseband, and 32 MHz is a standard microprocessor crystal with 10 ppm accuracy. There may also be a programmable option of enabling a PLL to synthesize the desired frequency for the baseband in order to enable the use of an existing clock. There may also be a very power clock 1346, for example 32 kHz, which is used to clock the counters in the Sleep mode. The only operation during Sleep mode is the 32 kHz clock 1346 and the programmable counter. The 32 kHz clock is a standard clock typically used in time of day clocks.

The advantages and features of the architecture 1100 are numerous. Specifically, the collection of the radio 1102, modem 1104 and controller 1106 functionality in the architecture 1100 provides for a low-power and low interference implementation of wireless communications, including that of the Bluetooth specification. Including the frequency hopping control programming in the controller 1106, rather than relying on the host processor of the applications, helps to reduce current and interference. Including error correction and payload extraction in the controller 1106, rather than relying on the host processor of the applications, ensures that the host microprocessor is only alerted if good data is received, which helps to reduce current. Including an address screening function in the architecture 1100 ensures that only data addressed for the particular unit is passed to the host microprocessor, which helps to reduce current. Including the RX and TX buffers 1236, 1238 in the controller 1106 so that data transfers can be spread out in time to minimize the data rate over the serial interface 1240 helps to reduce peak and average current. Including error correction and payload extraction in the controller 1106, rather than relying on the host processor of the applications, helps to reduce current and ensure rapid response time to an ARQ. Including the semi-programmable parameters block 1246 in the controller 1106 to reduce the amount of interaction between the host microprocessor and the radio helps to reduce current. The host microprocessor generally programs the parameters block 1246 at power up or whenever there are changes. The use of RX buffers to time data transfers helps to minimize interference during a receive burst. The use of a serial interface 1240, preferably of low frequency, between the architecture 1100 and the host microprocessor helps to reduce current consumption and possible interference. The use of the architecture 1100 allows interface to multiple platforms. And finally, the use of the architecture 1100 allows integration onto a single IC chip due, at least in part, to the minimization of digital interference.

Additional SOI Discussion

As discussed above, one way to implement the architecture 1100, which is optional, is to integrate the radio 1102, modem 1104, and controller 1106 onto a single IC chip. An example of such integration onto a single IC chip is shown in FIG. 33. If in this scenario the radio 1102 is a direct conversion radio, such as the radio 200, a silicon-on-insulator (SOI) device fabrication process will be advantageous, significantly reducing some of the major problems associated with direct conversion. Such problems are reduced because with SOI an insulating layer 1340 separates the circuit devices from the solid silicon substrate 1342. While the SOI process has certain advantages for the radio 1102, it should be understood that the SOI process may be used for the integration of the entire architecture 1100, namely, the radio 1102, modem 1104, and controller 1106.

For example, SOI can help to reduce the problem of LO pulling. Specifically, the radiated path associated with LO leakage is reciprocal. That is, just as the LO signal can get to the input of the receiver, signals that appear at the input of the receiver can get to the LO circuitry, and in particular to the VCO resonator. One problem this causes is LO pulling. An oscillator is sensitive to injection of signals that are close to its frequency of oscillation. Any such RF signals that appear on the very sensitive resonator port of the VCO may cause an instantaneous change in frequency. It is important to minimize this since it will corrupt a signal being received. Integrating the resonator of the VCO will minimize the sensitivity to pulling. As stated above, such integration may be achieved using the fabrication techniques available in an SOI process using a high resistivity substrate.

SOI can also help to reduce the problems associated with DC offsets. Specifically, direct conversion receivers tend to be sensitive to DC offsets. The reason for this is that the majority of the gain is placed after the down-converting mixer. Small DC offsets that appear at the IF output of the mixer may cause large shifts in the DC level at the output of the receiver.

The DC offset is mainly due to the cross-talk between the RF and LO ports of the mixers. Basically what happens is that an amount of the LO signal appears at the RF ports of the mixer. This signal mixes with itself and appears as DC offset at the IF port of the mixer. It is important to maximize the amount of LO-RF isolation. Using the arguments stated above on radiated and conducted path isolation, it is clear that if the circuits are fabricated on SOI with a high resistivity substrate, this problem can be solved or at least significantly reduced.

Direct conversion receivers are susceptible to distortion from $2^{nd}$ order effects. These are typically characterized by the $2^{nd}$ order Intercept Point (IP2). A basic non-linearity may be described by the series:

$$V(t) = a_0 + a_1 V + a_2 V^2 + a_3 V^3 + a_4 V^4$$

Basically, $2^{nd}$ order effects are characterized by the $a_2 V^2$ term of the series expansion. The $V^2$ term may be examined simply as follows. Defining the fundamental signal as:

$$V = V_0 * \cos(\omega * t)$$

where $V_0$ is the signal amplitude, $\omega$ is the frequency of the signal, and t is the time. The $2^{nd}$ order term may be expanded to:

$$V = a_2 V_0^2 * \frac{1}{2}(1 + \cos(2 * \omega * t))$$

In other words, the second order products introduce a $2^{nd}$ harmonic ac term and also a DC term.

If $V_0$ is modulated by a larger interfering signal via cross modulation or intermodulation, then the dc level that appears at the output of the mixer will change with time. The amount of change in DC is dependent on the size of the interfering signals and magnitude of $a_2$. The term $a_2$ is a measure of the balance of the circuit block or the IP2.

Since the IP2 of a differential circuit is the level of balance of the circuit, it may be described by the common-mode rejection ratio (CMRR). The CMRR of a differential pair is set by:

$$CMRR = 1 + 2 * g_m * Z_{ee} * (1 + 1/\beta_0)$$

where $g_m$ is the transconductance of the stage, $Z_{EE}$ is the impedance of the current sink and $\beta_0$ is the current gain of the stage. This means that the IP2 of a differential circuit is directly related to the impedance of the current sink. At RF this is limited by parasitic capacitance. In order to maximize the IP2 of a differential circuit, the impedance of the current must be maximized. At RF it is best to limit the parasitic capacitance of the current source. Using an SOI process with a high resistivity substrate, the parasitics may be minimized and the CMRR, and therefore the IP2, may be maximized. The use of an SOI process with high resistivity substrate and trench isolation facilitates the design of high IP2 circuits, which is very advantageous for implementing a direct conversion receiver.

Figure 34:
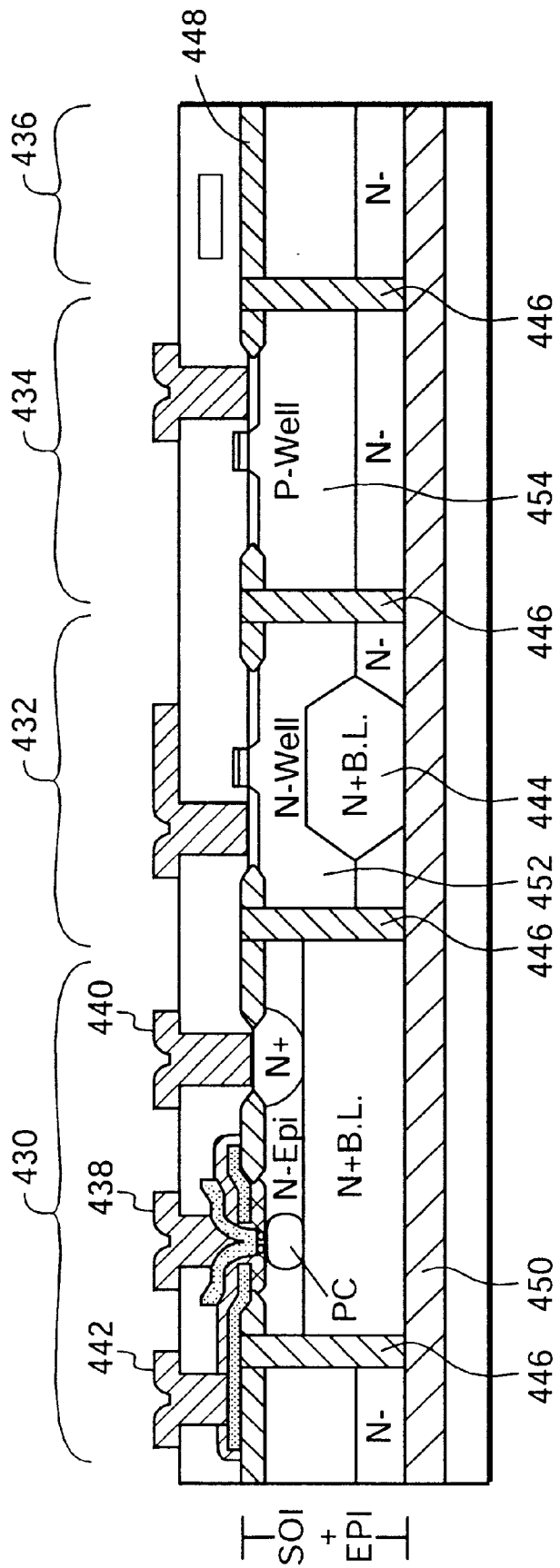
FIG. 34 is a cross-sectional view of semiconductor devices fabricated using a silicon-on-insulator (SOI) process technology.
Figure 35:
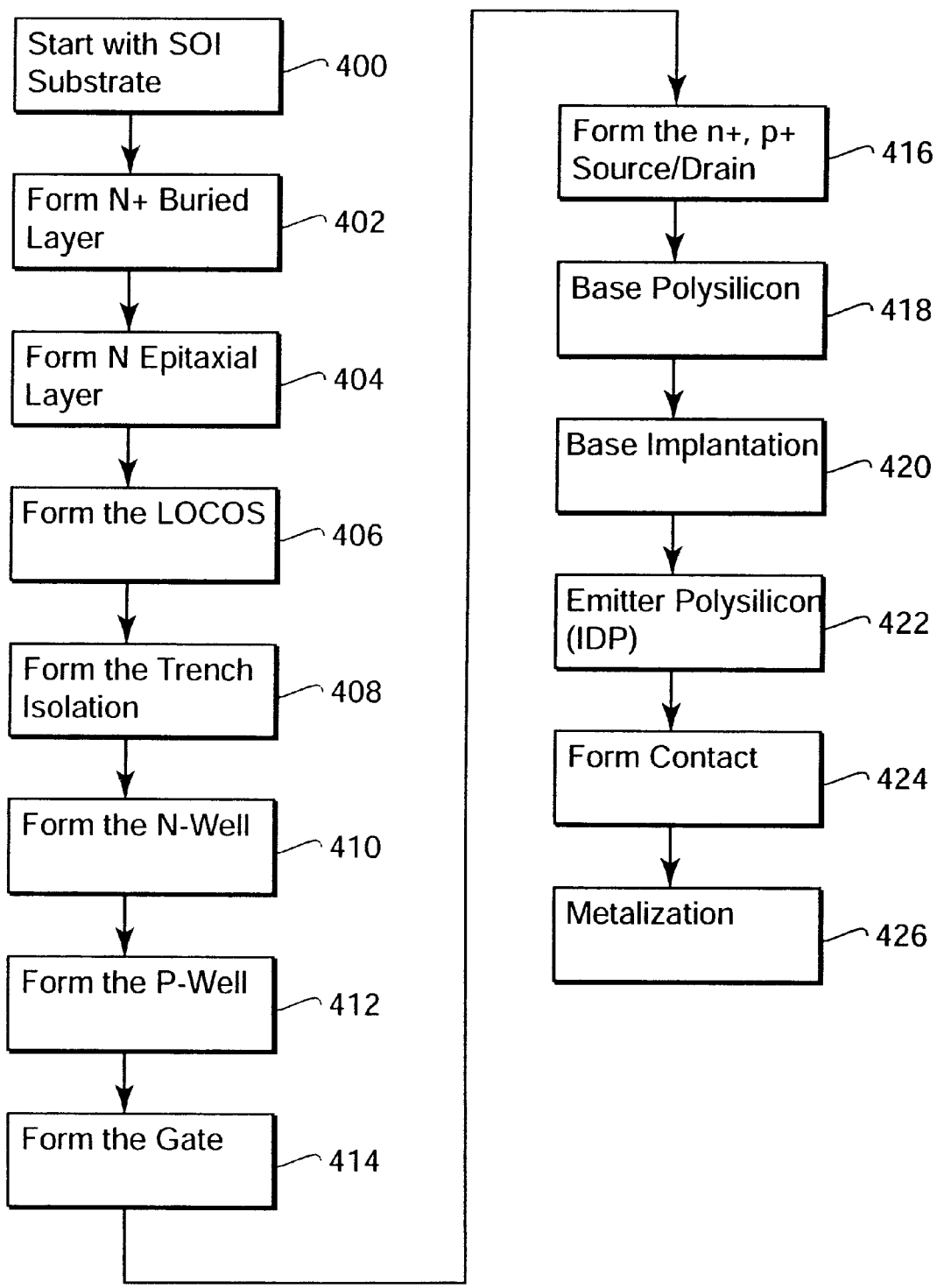
FIG. 35 is a flow diagram illustrating the process steps used to fabricate the semiconductor devices shown in FIG. 34.

As mentioned above, bonded SOI BiCMOS processes are well-known to those of ordinary skill in the art and are believed to be currently available. For example, FIG. 34 illustrates a published cross-sectional view of a 0.35 μm ECL-CMOS device implemented in bonded SOT. FIG. 35 illustrates a published set of process steps that may be used to fabricate the device. Specifically, a bipolar transistor 430, a p-channel MOS transistor 432, an n-channel MOS transistor 434, and a poly resistor 436 are shown. Three technologies adopted for this device are an SOI substrate, trench isolation and the IDP (In-situ phosphorus doped polysilicon) emitter technology. The bipolar transistor 430 includes double polysilicon self-aligned structure with an IDP emitter 438, the pedestal collector 440, and a base 442. IDP can avoid the plug effects which causes $f_r$ degradation in a small size emitter. To reduce the CMOS device size and to achieve a latch-up free configuration, an n+ buried layer for the Vcc line 444 and a trench isolation 446 combined with LOCOS 448 are used. A buried oxide layer 450 forms the insulator.

Referring to FIG. 35, the fabrication process begins in step 400 with the SOI substrate. The starting material is an SOI substrate with 1.51 μm thick Si layer and 0.5 μm buried oxide layer 450. The buried layer is formed in step 402, and the epitaxial layer is formed in step 404. An n+ region is prepared for a buried layer. The voltage drop of the buried Vcc line is made small by reducing sheet resistance of the n+ layer down to about 45 Ω/square. A 0.7 μm thick epitaxial layer is grown. The LOCOS is formed in step 406, and the trench isolation 446 is formed in step 408. The thickness of the LOCOS oxidation 448 is 0.4 μm. The trench 446 is formed after LOCOS oxidation. The width of the trench 446 is 0.4 μm. It is filled and planarized with CVD oxide film. The N-well 452 and P-well 454 are formed in steps 410, 412, respectively. The N-well 452 and P-well 454 are formed by high-energy implantation through LOCOS with two masks. Channel implantation is performed simultaneously to control threshold voltage Vth of the NMOS and PMOS. The gate is formed in step 414, and the source and collector is formed in step 416. Gate electrodes are formed by Wsi$_2$/ polysilicon structure. The thickness of the gate oxide is 9 nm. After the gate patterning, the source and drain region is formed. The base is formed in steps 418, 420, and the emitter is formed in step 422. The base and emitter of the bipolar are fabricated by the self-aligned process. Base polysilicon is deposited and a hole is formed in the emitter region. Then, intrinsic base implantation and pedestal collector implantation are carried out. After sidewall spacer of polysilicon is formed, the emitter electrode and shallow emitter are fabricated simultaneously using IDP technology with rapid thermal annealing (RTA) at 950° C. An SOG etch-back technique is used for planarization after PSG deposition and a contract hold formation is followed in step 424. Finally, six layers of metalization is performed in step 426.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. An apparatus for receiving Radio Frequency (RF) signals, comprising:
   a low noise amplifier (LNA) configured to receive a radio frequency (RF) signal;
   an I/Q direct down converter coupled to the LNA, the I/Q direct down converter configured to split the RF signal into real and imaginary components and to down convert the real and imaginary components directly to baseband signals, wherein the baseband signals have associated I and Q components, and wherein the I components are generated at a first output of the I/Q down converter, and wherein the Q components are generated at a second output of the I/Q down converter;
   a local oscillator (LO) coupled to the I/Q direct down converter that is configured to drive the I/Q direct down converter;
   first and second filters coupled directly to the first and second outputs, respectively, of the I/Q direct down converter, the first and second filters configured to filter the down converted real and imaginary components, respectively; and
   first and second wide dynamic range analog-to-digital converters (ADCs) coupled directly to the first and second filters, respectively, the first and second ADCs configured to convert the real and imaginary components into digital signals, the first and second ADCs having a dynamic range that is sufficiently wide to directly convert the filtered, down converted real and imaginary components to digital signals without first amplifying the filtered and down converted real and imaginary components, wherein the dynamic range of the ADCs is equal to or greater than approximately 74 dB.

2. An apparatus in accordance with claim 1, wherein the LNA, the I/Q direct down converter, the LO, the first and second filters, and the first and second ADCs are integrated onto a single integrated circuit chip.

3. An apparatus in accordance with claim 2, wherein the single integrated circuit chip comprises a silicon-on-insulator (SOI) integrated circuit.

4. An apparatus in accordance with claim 1, wherein the first and second ADCs comprise delta-sigma converters.

5. An apparatus in accordance with claim 1, wherein the first and second ADCs comprise pipelined ADCs.

6. An apparatus in accordance with claim 1, wherein the LO is configured to drive the I/Q direct down converter at a frequency substantially equal to a frequency of the received RF signal.

7. An apparatus in accordance with claim 1, further comprising:
   a digital DC offset cancellation stage configured to turn off the LNA during idle periods, measure a DC offset, and compensate for the DC offset.

8. An apparatus in accordance with claim 1, further comprising:
   first and second DC offset cancellation circuits, coupled to the I/Q direct down converter, configured to perform DC offset correction by successive approximation of an analog-to-digital converter.

9. An apparatus in accordance with claim 1, further comprising:
   a digital receive filter configured to filter outputs of the first and second ADCs.

10. An apparatus for receiving and transmitting signals, comprising:
    a local oscillator (LO);
    a direct conversion transmitter coupled to the LO that is configured to up-convert baseband signals directly to transmit radio frequency (RF) signals for transmission; and
    a direct conversion receiver coupled to the LO that is configured to down-convert a received RF signal directly to In-phase (I) and Quadrature (Q) baseband signals, the direct conversion receiver including:
    a low noise amplifier (LNA) configured to receive the received RF signal;
    an I/Q direct down converter coupled to the LNA, the I/Q direct down converter configured to split the RF signal into real and imaginary components and to down convert the real and imaginary components directly to the I and Q baseband signals, wherein the I baseband signals are generated at a first output of the I/Q down converter, and wherein the Q baseband signals are generated at a second output of the I/Q down converter;
    first and second filters coupled directly to the first and second outputs, respectively, of the I/Q direct down converter, the first and second filters configured to filter the down converted respective I and Q baseband signals; and
    first and second wide dynamic range analog-to-digital converters (ADCs) coupled directly to the first and second filters, respectively, the first and second ADCs configured to convert the respective filtered I and Q baseband signals into digital signals, the first and second ADCs having a dynamic range that is sufficiently wide to directly convert the filtered I and Q baseband signals to digital signals without first amplifying the filtered I and Q baseband signals, and wherein the dynamic range of the ADCs is equal to or greater than approximately 74 dB.

11. An apparatus in accordance with claim 10, wherein the LO, the direct conversion transmitter and the direct conversion receiver are integrated onto a single integrated circuit chip.

12. An apparatus in accordance with claim 11, wherein the single integrated circuit chip comprises a silicon-on-insulator (SOI) integrated circuit.

13. An apparatus in accordance with claim 10, wherein the first and second ADCs comprise delta-sigma converters.

14. An apparatus in accordance with claim 10, wherein the first and second ADCs comprise pipelined ADCs.

15. An apparatus in accordance with claim 10, wherein the LO is configured to drive the direct conversion receiver at a frequency substantially equal to a frequency of the received RF signal.

16. An apparatus in accordance with claim 10, further comprising:
    a DC offset cancellation stage configured to turn off the LNA during idle periods, measure a DC offset, and compensate for the DC offset.

17. An apparatus in accordance with claim 10, further comprising:
    a digital receive filter configured to filter respective outputs of the first and second ADCs; and
    a digital transmit filter configured to filter an input for the direct conversion transmitter.

18. An apparatus for use in a wireless communication system having a plurality of radio links, wherein information is communicated by operating the radio links in accordance with predefined communication protocols defined by a system specification, and wherein the protocols define at least one protocol action that must be performed by the apparatus when communicating in the system, comprising:

> a radio having a receiver for receiving data and a transmitter for transmitting data wherein the radio includes a plurality of individually-controlled radio blocks;
>
> a modem, coupled to the radio, configured to demodulate received data and modulate data for transmission; and
>
> a controller, coupled to the modem and the radio, including a digital interface for external communications through which received data and data for transmission is sent, wherein the controller controls the radio and modem to perform a protocol action specified by commands received through the digital interface, and wherein the controller includes:
>> (a) a connection state machine responsive to the received commands, wherein the connection state machine controls operation of the radio and the modem to implement the protocol action specified by the received commands; and
>>
>> (b) a receive/transmit state machine, responsive to the connection state machine, wherein the receive/transmit state machine controls the radio by sequencing operation of the radio blocks in accordance with a pre-determined sequence;
>
> wherein the radio, modem and controller are integrated onto a single integrated circuit (IC).

19. An apparatus in accordance with claim 18, wherein the modem comprises a frequency hopping sequencer configured to store data needed by radio to perform frequency hopping and to perform frequency hopping number generation.

20. An apparatus in accordance with claim 18, wherein the modem comprises a sliding correlator configured to perform address screening to identify and discard received data that is addressed to a different unit so that received data that is addressed to a different unit is not sent through the digital interface.

21. An apparatus in accordance with claim 18, wherein the controller comprises an error correction stage configured to identify and discard bad received data so that bad received data is not sent through the digital interface.

22. An apparatus in accordance with claim 18, wherein the controller comprises a receive buffer to provide storage for received data so that received data is not sent through the digital interface during times that the radio is receiving data.

23. An apparatus in accordance with claim 18, wherein the controller comprises a transmit buffer to provide storage for data to be transmitted so that data to be transmitted can be received through the digital interface during times that the radio is not transmitting data.

24. An apparatus in accordance with claim 18, wherein the controller comprises parameters storage for storing parameters for the radio.

25. An apparatus in accordance with claim 18, wherein the radio comprises a direct conversion transceiver.

26. An apparatus in accordance with claim 18, wherein the radio comprises a superhetrodyne transceiver.

27. An apparatus in accordance with claim 18, wherein the receiver comprises a local oscillator that operates at a frequency substantially equal to a frequency of a received radio frequency (RF) signal.

28. An apparatus in accordance with claim 18, wherein the receiver comprises an analog-to-digital converter (ADC) that is configured to convert a down-converted received RF signal into a digital signal, the ADC having a dynamic range that is wide enough to convert the down-converted received RF signal to a digital signal without using variable gain on the down-converted received RF signal.

29. An apparatus in accordance with claim 18, wherein the IC comprises an insulating layer that separates the radio, modem and controller from a solid silicon substrate.

30. An apparatus in accordance with claim 18, wherein the IC is manufactured according to a silicon-on-insulator (SOI) process.

31. A method of performing wireless communications in a communication system having a plurality of radio links, wherein communication on the links complies with communication protocols defining at least one protocol action, the method comprising:

> receiving commands from an external processor through a digital interface, the digital interface being integrated onto a single integrated circuit (IC), wherein the received commands specify a selected protocol action to be performed by a communications apparatus when communicating on a radio link;
>
> initiating a sequence of connection state control steps in response to the received commands, wherein the sequence of connection state control steps controls operation of a radio and a modem in the communications apparatus to implement the selected protocol action, and wherein the radio includes a plurality of individually-controlled radio blocks;
>
> sequentially controlling operation of the plurality of radio blocks in accordance with a pre-determined sequence, and in response to the initiated sequence of connection state control steps; and
>
> communicating data with the radio.

32. A method in accordance with claim 31, further comprising:

> receiving through the digital interface data needed by the radio to perform frequency hopping;
>
> storing the data needed by the radio to perform frequency hopping in circuitry included on the single IC; and
>
> performing a frequency hopping number generation based on the stored data.

33. A method in accordance with claim 31, further comprising:

> screening addresses of data received by the radio to identify received data that is addressed to a different unit; and
>
> discarding the received data that is addressed to the different unit.

34. A method in accordance with claim 31, further comprising:

> identifying data received by the radio that is bad; and
>
> discarding the bad data.

35. A method in accordance with claim 31, further comprising:

> storing data received by the radio in a receive buffer that is included on the single IC; and
>
> halting communications through the digital interface while the radio is receiving data.

36. A method in accordance with claim 31, further comprising:

> storing data received through the digital interface for transmission in a transmit buffer that is included on the single IC; and
>
> halting transmission by the radio while data is being transferred through the digital interface.

37. A method in accordance with claim 31, wherein the step of communicating data with the radio comprises:

converting received signals directly to baseband.

38. A method in accordance with claim 31, wherein the step of communicating data with the radio comprises:

operating a local oscillator at a frequency substantially equal to a frequency of a received radio frequency (RF) signal.

* * * * *